United States Patent

Ogawa

[11] Patent Number: 5,831,745
[45] Date of Patent: Nov. 3, 1998

[54] GRAVURE ENGRAVING SYSTEM USING TWO SIGNALS OUT OF PHASE WITH EACH OTHER FOR ENGRAVING A PLURALITY OF CELLS ON A SURFACE OF A GRAVURE CYLINDER

[75] Inventor: Hideaki Ogawa, Kyoto, Japan

[73] Assignee: Dainippon Screen Mfg. Co., Ltd., Japan

[21] Appl. No.: 586,258

[22] Filed: Jan. 16, 1996

[30] Foreign Application Priority Data

| Jan. 19, 1995 | [JP] | Japan | 7-006523 |
| Feb. 8, 1995 | [JP] | Japan | 7-020742 |
| Jun. 22, 1995 | [JP] | Japan | 7-156550 |
| Nov. 8, 1995 | [JP] | Japan | 7-289933 |

[51] Int. Cl.⁶ .......................................... B41C 1/04
[52] U.S. Cl. ................................................. 358/299
[58] Field of Search ............................ 358/299, 443, 358/448

[56] References Cited

U.S. PATENT DOCUMENTS

| 3,770,888 | 11/1973 | de Vos et al. | 358/299 |
| 4,012,584 | 3/1977 | Gascoigne | 358/299 X |
| 4,057,838 | 11/1977 | Doelves et al. | 358/299 |
| 4,451,856 | 5/1984 | Buechler | 358/299 |
| 5,029,011 | 7/1991 | Fraser | 358/299 |
| 5,416,597 | 5/1995 | Mubaslat | 358/299 |
| 5,438,422 | 8/1995 | Holowko et al. | 358/299 |
| 5,440,398 | 8/1995 | Holowko et al. | 358/299 |

Primary Examiner—Eric Frahm
Attorney, Agent, or Firm—Ostrolenk, Faber, Gerb & Soffen, LLP

[57] ABSTRACT

An adding portion superposes a density signal (a signal having its level changing in accordance with a density of a printed image) from a density signal generator with a carrier signal (a signal in the form of a sine wave having a prescribed frequency and a prescribed amplitude) from a carrier signal generator to generate an engraving signal. A stylus included in an engraving head 21 reciprocates according to the applied engraving signal to engrave cells on a gravure cylinder rotating in the main scanning direction. A sub-scanning motor moves the engraving head in a sub-scanning direction perpendicular to the main scanning direction every time cells for one line in the main scanning direction of the gravure cylinder have been engraved. The movement of the engraving head 21 in the sub-scanning direction is controlled so that cells adjacent in the sub-scanning direction partially overlap with each other in every other line.

12 Claims, 45 Drawing Sheets

FIG. 1 (a) PRIOR ART
FIG. 1 (b) PRIOR ART
FIG. 1 (c) PRIOR ART
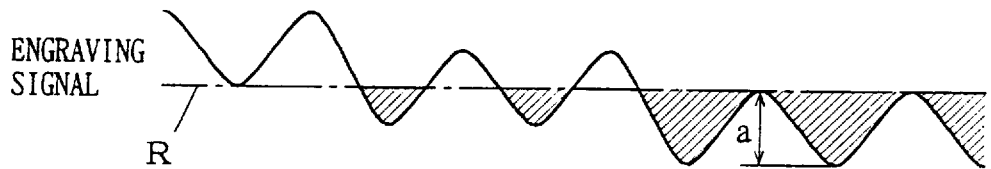

MAIN SCANNING DIRECTION n  n+1 n  n+1 n  n+1

CARRIER SIGNAL

DENSITY SIGNAL

HIGHER DENSITY

MAXIMUM DENSITY

ENGRAVING SIGNAL

CARRIER SIGNAL

DENSITY SIGNAL

ENGRAVING SIGNAL

CARRIER SIGNAL

DENSITY SIGNAL

ENGRAVING SIGNAL

F I G. 34 (a)

| TONE | | CELL AREA |
|---|---|---|
| $r=29$ | → | A ( 2 9 ) |
| $r=30$ | → | A ( 3 0 ) |
| ⋮ | | ⋮ |
| $r=228$ | → | A ( 2 2 8 ) |

F I G. 34 (b)

| TONE | | IDEAL CELL AREA |
|---|---|---|
| $r=29$ | → | A' ( 2 9 ) |
| $r=30$ | → | A' ( 3 0 ) |
| ⋮ | | ⋮ |
| $r=228$ | → | A' ( 2 2 8 ) |

F I G. 34 (c)

| ORIGINAL TONE | | TONE AFTER CORRECTION |
|---|---|---|
| $r=29$ | → | $r=$ ☐ |
| $r=30$ | → | $r=$ ☐ |
| ⋮ | | ⋮ |
| $r=228$ | → | $r=$ ☐ |

FIG. 35(a)  FIG. 35(b)
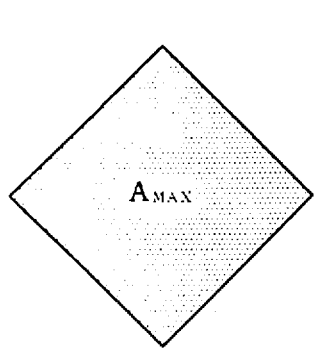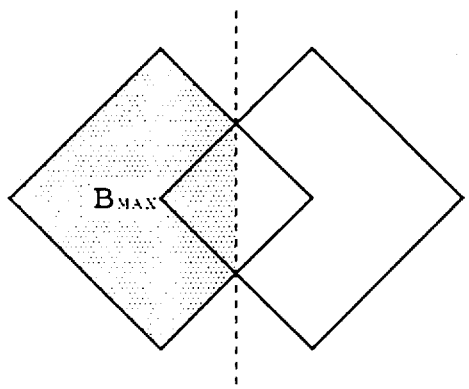
FIG. 36
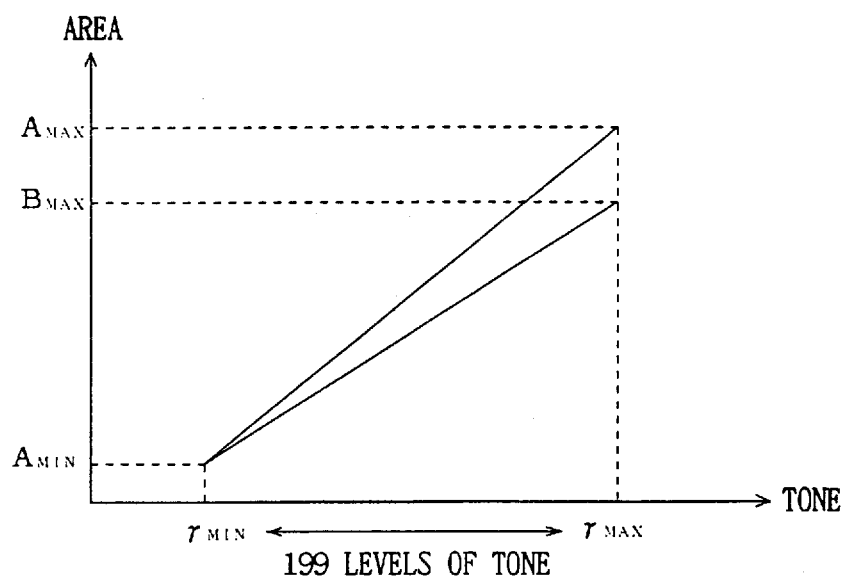

ENGRAVING DIRECTION
(MAIN SCANNING
DIRECTION)

(MAIN SCANNING DIRECTION)

(MAIN SCANNING DIRECTION)

5,831,745

GRAVURE ENGRAVING SYSTEM USING TWO SIGNALS OUT OF PHASE WITH EACH OTHER FOR ENGRAVING A PLURALITY OF CELLS ON A SURFACE OF A GRAVURE CYLINDER

RELATED ART STATEMENT

1. Field of the Invention

The present invention relates to gravure engraving systems and methods, and more particularly to a gravure engraving system and a method for making intaglios for gravure printing by engraving a plurality of cells on a surface of a gravure cylinder.

2. Background of the Invention

The gravure engraving system is a system for manufacturing an intaglio for gravure printing by engraving fine depressions called cells on a surface of a tube-like gravure cylinder coated with copper on its surface while the gravure cylinder is rotated. The amount of ink with which the cells are charged is controlled with depth and size (area) of the cells to represent the printing density. An engraving head is used to form the cells on the surface of the gravure cylinder. The engraving head is equipped with a stylus having a needle (bite) made of diamond at its tip, which is vibrated at a frequency of several KHz for engraving.

FIG. 1(c) shows a waveform of an engraving signal applied to the engraving head in the conventional gravure engraving system, which corresponds to a displacement waveform of the stylus. The signal waveform is obtained by superposing a density signal waveform as shown in FIG. 1(b) on a carrier signal waveform of a high frequency as shown in FIG. 1(a) (i.e., by modulating the carrier signal with the density signal). Application of such an engraving signal to the engraving head allows cells with depth and size corresponding to the density signal to be engraved on the surface of the gravure cylinder. The dot dash line R in FIG. 1(c) corresponds to the surface of the gravure cylinder and the portion shown by hatching corresponds to engraved cells.

FIG. 2 is a diagram showing the top configuration and arrangement of cells engraved by the conventional gravure engraving system. As shown in FIG. 2, the conventional cells are regularly arranged. The form of each cell, for example, approximates an oblong rhombus, as shown in FIG. 3, in the case of a compressed arrangement (where the vertical to horizontal pitch ratio of a cell is 2 to 3).

In gravure printing, as the volume of a cell is increased, a larger amount of ink is transferred to a printing medium so as to increase the printing density. As a result, the contrast of an image becomes clearer to improve the clearness of the image. For example, when gravure printing is applied to soft packing materials such as vinyl, it is preferred to have the printing density as high as possible because a low printing density results in the printing being almost transparent. Accordingly, in gravure printing, it is a present subject to increase the cell volume to increase the printing density.

It is assumed in the conventional gravure engraving system that enlarging the amplitude of the engraving signal, shown in FIG. 1(c), deepens the engraved cells for the purpose of increasing the cell volume. If a cell is made deeper, however, its width in the sub-scanning direction (the direction parallel to the axis of the gravure cylinder) increases proportionally. This results in larger intercell pitch in the sub-scanning direction reducing the resolution of the image, which is not a preferred situation. It is possible to engrave cells deeper with small cell widths by making the apex angle of the diamond bite of the stylus more acute, but making the diamond bite more acute will result in a shorter life time for the diamond bite, which is also not a preferred situation. Hence, a method is required to thoroughly resolve these problems.

It is also assumed in the conventional gravure engraving system to make the frequency of the carrier signal higher to increase the number of cells arranged in the main scanning direction (the circumferential direction of the gravure cylinder) for the purpose of increasing the resolution of the image in the main scanning direction. That is to say, if the frequency of the carrier signal is increased, then the lengths of the cells in the main scanning direction are reduced proportionally, thus reducing the intercell pitch in the main scanning direction. However, such a method is not preferred because it reduces the volume of each cell and reduces the printing density. Moreover, the device must be driven at high frequency, which will require high accuracy and thus result in increased costs.

It is also assumed in the conventional gravure engraving system to reduce the amplitude of the carrier signal to increase the number of lines of cells arranged per unit distance for the purpose of improving the resolution of image in the sub-scanning direction (the direction parallel to the axis of the gravure cylinder). That is to say, if the amplitude of the carrier signal is reduced, then the widths of cells in the sub-scanning direction are proportionally reduced, and thus the intercell pitch in the sub-scanning direction can be reduced. However, such a practice will also reduce the volume of each cell to reduce the printing density.

Accordingly, it is also a problem in gravure printing to improve resolution without reducing cell volume.

SUMMARY OF THE INVENTION

Accordingly, it is an object of the present invention to provide a gravure engraving system and method which are capable of increasing the cell volume without reducing resolution of the image.

It is another object of the prevent invention to provide a gravure engraving system and method which can increase image resolution without reducing the printing density or incurring an increase in cost of the device.

A first aspect of the present invention is directed to a gravure engraving system for engraving a plurality of cells on a surface of a gravure cylinder to manufacture an intaglio for gravure printing, which includes:

a rotating device for rotating the gravure cylinder in a main scanning direction;

a carrier signal generating device for generating a carrier signal in the form of a sine wave having a prescribed frequency and a prescribed amplitude;

a density signal generating device for generating a density signal having its level varying in accordance with a tone of provided image data;

an engraving signal generating device for generating an engraving signal by superposing the density signal on the carrier signal;

a stylus reciprocating in accordance with the engraving signal to engrave cells to the gravure cylinder rotating in the main scanning direction;

a stylus moving device for moving the stylus in a sub-scanning direction perpendicular to the main scanning direction every time cells for one line in the main scanning direction have been engraved on the gravure cylinder; and a control device for controlling an amount of movement of the stylus by the stylus moving device so that a first pitch and a second pitch alternately appear in every other line in a plurality of cell lines formed along the main scanning direction;

wherein two cells adjacent in the sub-scanning direction are partially overlapped with each other which define said first pitch and whose total width in the sub-scanning direction is larger than a prescribed threshold.

In the above first aspect of the present invention, cells are engraved having an engraving signal with an amplitude smaller than a conventional signal, but the cells in each line formed along the main scanning direction are engraved to partially overlap with cells adjacent in the sub-scanning direction in every other line. As a result, an opening area of each cell is smaller than an opening area of a conventional cell, but the two overlapping cells communicate with each other to unit their volumes, so that the cell volume is substantially equal to the volume of the conventional cell. Furthermore as the number of cells in the sub-scanning direction increases as compared with the conventional one, resolution of image is increased.

In a preferred embodiment of the prevent invention, the stylus is controlled so that the first pitch is smaller than the second pitch. This increases an overlapping amount of adjacent cells and also increases the cell volume. Accordingly, printing density can be increased.

In the preferred embodiment, when a cell with the maximum printing density is engraved, the stylus engraves the gravure cylinder with a portion corresponding to part of a full amplitude of the engraving signal and cells for one line arranged along the main scanning direction are formed by two interleaved scannings. That is to say, cells engraved in the second main scanning are arranged between cells engraved in the first main scanning. Since each cell has a wall steeper than that of a cell engraved by a conventional gravure engraving machine, it also has a volume larger than that of the conventional cell, which provides increased resolution without decreasing the cell volume.

In the preferred embodiment, cells adjacent in the sub-scanning direction with the first pitch defined by the two cells are engraved on the basis of different image data. This doubles the resolution of the image in the sub-scanning direction as compared with the conventional engraving system.

Also, when engraving two cells that are adjacent in the sub-scanning direction and partially overlapping, the level of the engraving signal for the two cells is corrected in accordance with a decrease in cell area caused by the overlap. This allows the tone indicated on the original image data to be faithfully reproduced.

Further, the tone of the original image data is corrected so that an area of a cell is in linear proportion to a tone change of the original image data. This allows the tone indicated on the original image data to be faithfully reproduced.

A second aspect of the present invention is directed to a gravure engraving system for engraving a plurality of cells on a surface of a gravure cylinder to manufacture an intaglio for gravure printing, which includes:

a rotating device for rotating the gravure cylinder in a main scanning direction;

a carrier signal generating device for generating a carrier signal in the form of a sine wave having a prescribed frequency and a prescribed amplitude;

a density signal generating device for generating a density signal having its level varying in accordance with a tone of the image data;

an engraving signal generating device for generating an engraving signal by superposing the density signal on the carrier signal;

a stylus reciprocating in accordance with the engraving signal to engrave cells on the gravure cylinder rotating in the main scanning direction; and a stylus moving device for moving the stylus in a sub-scanning direction perpendicular to the main scanning direction every time cells for one line in the main scanning direction have been engraved on the gravure cylinder;

wherein the amplitude of the carrier signal and the level of the density signal are adjusted in a prescribed relation so that the stylus engraves the gravure cylinder on the basis of part of a full amplitude of the engraving signal, the gravure engraving system further includes a double engraving control device for applying a first engraving signal set at a reference phase, to the stylus to form a first cell group in the main scanning direction of the gravure cylinder and subsequently applying a second engraving signal, having its phrase shifted by a prescribed amount from the reference phase, to the stylus to form a second cell group having a prescribed relation with the first cell group on the same line in the main scanning direction, thereby forming cells for one line arranged in the main scanning direction by two interleaved scans.

As stated above, in the second aspect, the gravure cylinder is engraved with a portion corresponding to part of the full amplitude of the engraving signal and cells for one line arranged in the main scanning direction are formed by two interleaved scans. Thus, each cell is smaller than a cell formed by a conventional gravure engraving machine but its wall is steeper than a wall of the conventional cell. As a result, when two cells adjacent in the main scanning direction are engraved being partially overlapped, the united volume of the two cells becomes larger than the volume of the conventional cell. This increases the printing density as compared with the conventional engraving system. Furthermore, as a width in the sub-scanning direction of each cell can be almost equal to that of the conventional cell, resolution of image in the sub-scanning direction is not decreased. Moreover, the area of the wall of each cell decreases as compared with the wall area of the conventional cell, thus providing improved transfer efficiency of ink.

In a preferred embodiment, two cells adjacent in the main scanning direction in the first and second cell groups are engraved on the basis of the same image data. That is to say, the two cells substantially represent a tone value for one conventional cell. Accordingly, when the two cells are engraved they overlap, and the cell volume corresponding to one image data can be increased as compared with the conventional cell, thus improving the printing density.

Also, in a preferred embodiment, when two cells adjacent in the main scanning direction are engraved, the two cells are engraved so that they will not overlap when the tone value represented by image data is small. When the tone value represented by the image data is large, the two cells are engraved so that they partially overlap. In accordance with the magnitude of the tone value represented by the image data, engraving is achieved in an appropriate relation.

Two cells adjacent in the main scanning direction in the first and second cell groups are engraved on the basis of different image data. This increases resolution in the main scanning direction as compared with the conventional engraving system.

When two cells adjacent in the main scanning direction are engraved, various conditions are possible according to the relationship of the image data between the two cells. That is to say, in a first condition, the two cells are engraved so that they will not overlap. In a second condition, the two cells are engraved so that they will overlap. In a third condition, they are engraved so that one of the cells will contain the other cell. Accordingly, corresponding to the relationship of the image data, cells can be engraved in various conditions.

When two cells adjacent in the main scanning direction are engraved, if the two cells partially overlap, or if one of the cells contains the other cell, tones of image data corresponding to the two cells are corrected according to a decrease area caused by the overlap or the containing. This allows the tone indicated on the original image data to be faithfully reproduced.

When a cell pair in which one cell contains the other cell inside, the other cell is forced to protrude from the one cell to place them into a partially overlapping relation. This enables the tone of the other cell, lost by being contained by the one cell, to be faithfully represented.

When a cell with the maximum printing density is engraved using a portion corresponding to an amplitude of the engraving signal, a second engraving signal having its phase shifted by 60° from the first engraving signal is provided to the stylus. This allows adjacent cell lines to be arranged closest to maximize an opening area of each cell. As a result, a volume of each cell is also maximized.

When a cell with the maximum printing density is engraved using a portion corresponding to the amplitude of the engraving signal, a second engraving signal having its phase shifted by 60° from the first engraving signal is provided to the stylus. This allows adjacent cell lines to be arranged closest to maximize an opening area of each cell. As a result, the volume of each cell is also maximized. Furthermore, when engraving two cells adjacent in the main scanning direction, the stylus starts engraving cells always from the surface of the gravure cylinder, so that the resistance at the start of engraving is equal for the two cells, causing no disorder of balance of cell forms.

The tone of original image data is corrected so that an area of a cell in linear proportion to a tone change of the original image data. This allows the tone indicated on the original image data to be faithfully reproduced.

In accordance with a third aspect of the invention, there is provided a method of engraving a plurality of cells on a surface of a gravure cylinder, which method includes the steps of:

superposing a density signal on a carrier signal to generate an engraving signal;

causing a stylus to reciprocate in accordance with the engraving signal to engrave cells in the gravure cylinder rotating in a main scanning direction; and moving the stylus in a sub-scanning direction perpendicular to the main scanning direction every time cells for one line in the main scanning direction have been engraved to the gravure cylinder, and controlling movement of the stylus so that a first pitch and a second pitch alternately appear in every other line in a plurality of cell lines formed along the main scanning direction, thereby to partially overlap those two cells adjacent in the sub-scanning direction which define the first pitch and whose total width in the sub-scanning direction is larger than a prescribed threshold.

In accordance with a fourth aspect of the prevent invention, there is provided a method of engraving a plurality of cells on a surface of a gravure cylinder, which method includes the following steps:

superposing a density signal on a carrier signal to generate an engraving signal;

causing a stylus to reciprocate in accordance with the engraving signal to engrave cells to the gravure cylinder rotating in a main scanning direction; and moving the stylus in a sub-scanning direction perpendicular to the main scanning direction every time cells for one cell line in the main scanning direction have been engraved in the gravure cylinder;

wherein an amplitude of the carrier signal and a level of the density signal are adjusted in a prescribed relation so that the stylus engraves the gravure cylinder according to part of a full amplitude of the engraving signal, and with respect to the step of causing the stylus to reciprocate a first engraving signal, set to a reference phase, is applied to the stylus to form a first cell group in the main scanning direction of the gravure cylinder and subsequently a second engraving signal, having its phrase shifted by a prescribed amount from the reference phrase, is applied to the stylus to form a second cell group having a prescribed relation with the first cell group on the same line in the main scanning direction, thereby forming cells for one line arranged in the main scanning direction by two interleaved scans.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1(a) through 1(c) are waveform diagrams of signals used in the conventional engraving system, as described above.

FIGS. 34(a) through 34(c) are diagrams showing the procedure of creating a conversion table of tone data in the third embodiment.

FIGS. 35(a) and 35(b) are diagrams illustrating that an effective are of a cell differs when it does not overlap with a cell adjacent in the sub-scanning direction and when it does overlap.

FIG. 36 is a diagram showing the inclination of a line of change of the cell area with respect to the tone of image data in the third embodiment.

FIGS. 60(a) and 69(b) are diagrams describing that an effective cell area differs when a certain cell does not overlap with a cell adjacent in the main scanning direction and when it does overlap.

DETAILED DESCRIPTION OF THE PREFERRED EMBODIMENT

(1) First Embodiment

Figure 2:
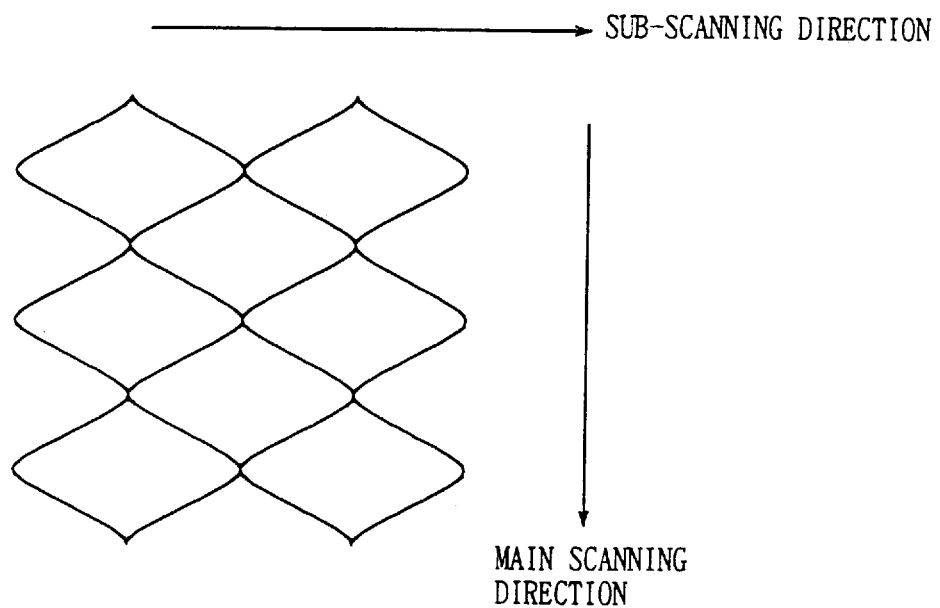
FIG. 2 is a diagram showing the top configuration and arrangement of cells engraved by the conventional gravure engraving system, as described above.
Figure 3:
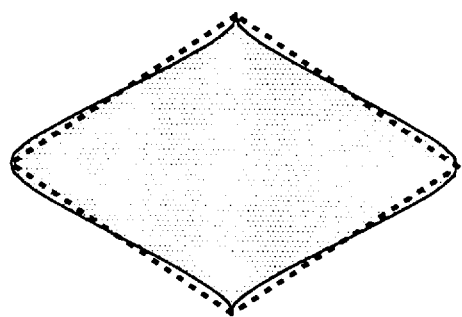
FIG. 3 is a diagram showing the pseudo equivalent of the top configuration of the cell engraved by the conventional gravure system with another geometrical figure.
Figure 4:
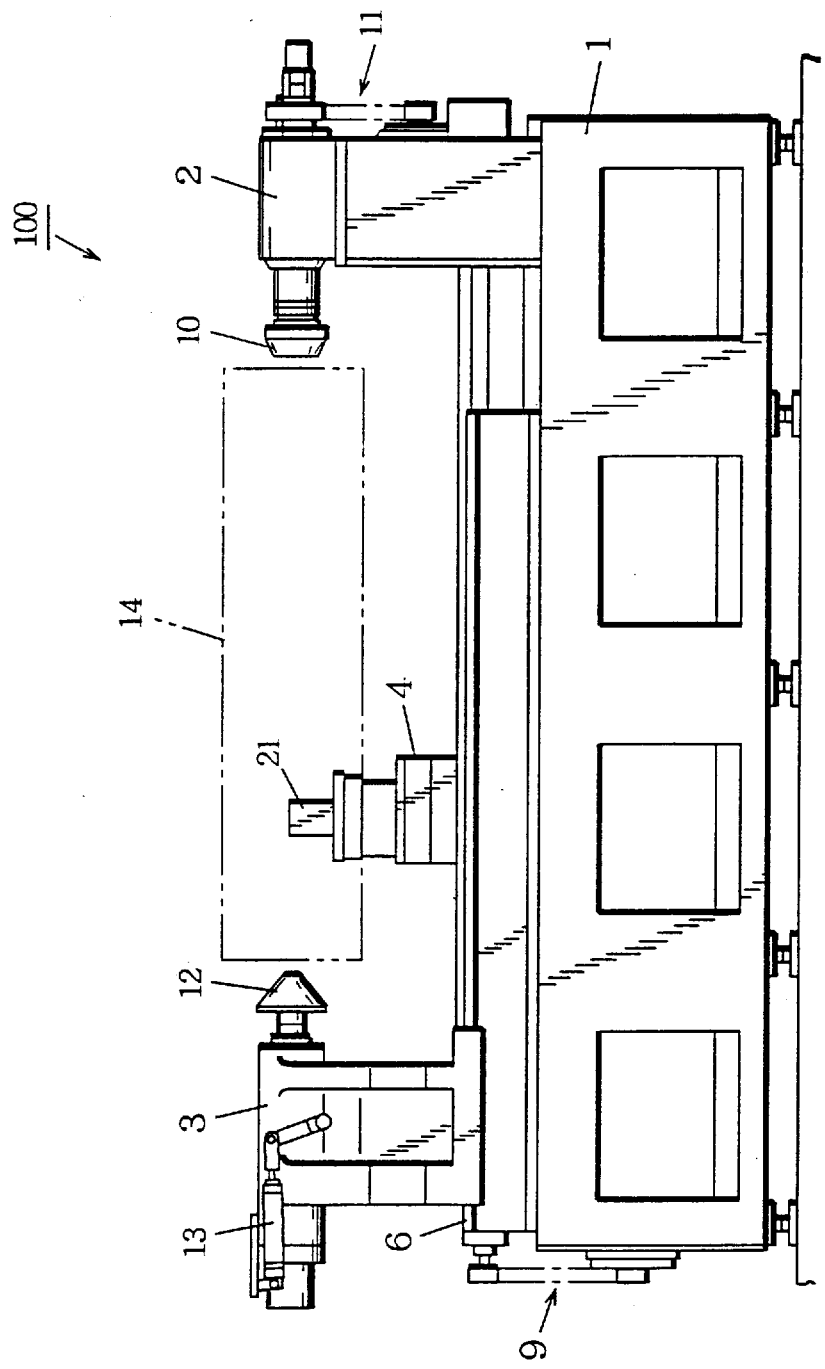
FIG. 4 is a front view of a gravure engraving machine used in a gravure engraving system of the present invention.
Figure 5:
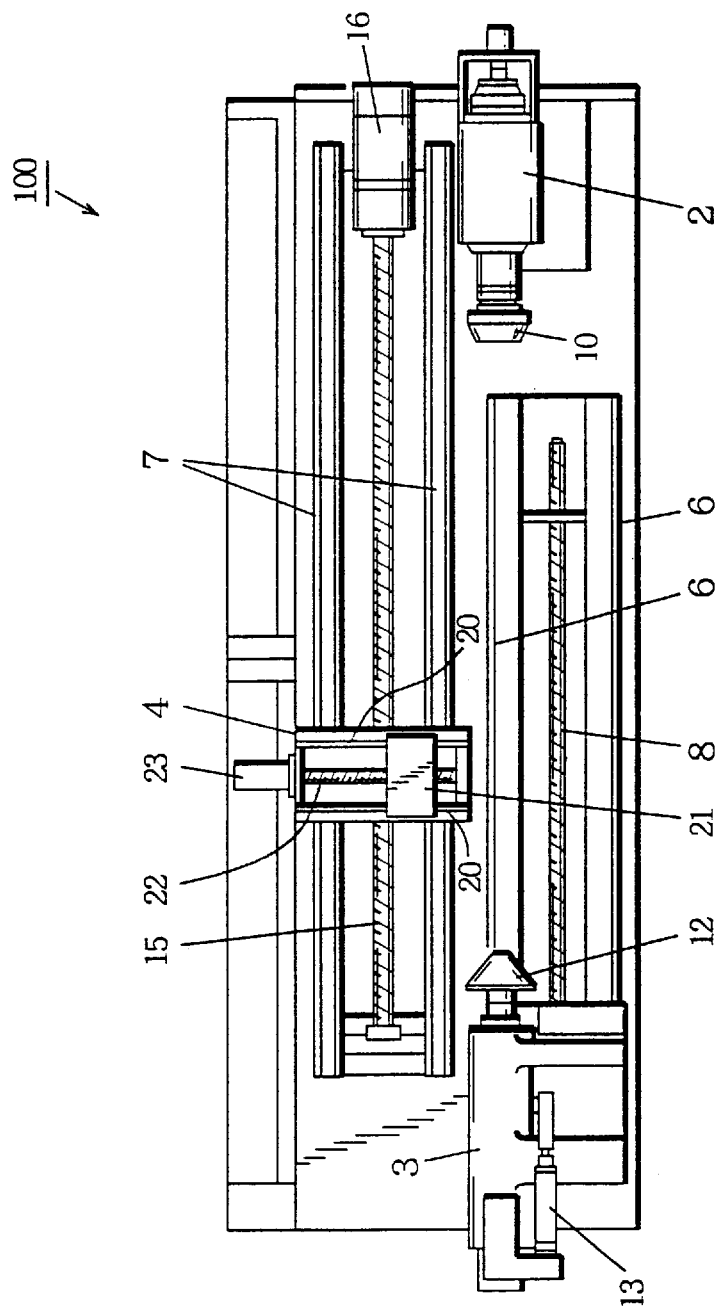
FIG. 5 is a plan view of the gravure engraving machine used in the gravure engraving system of the present invention.

FIG. 4 and FIG. 5 are a front view and a plane view of a gravure engraving machine used in a gravure engraving system according to a first embodiment of the present invention. In FIG. 4 and FIG. 5, this gravure engraving machine 100 includes a bed 1, a headstock 2 fixed on the upper surface of the bed 1, a tall stock 3 arranged facing to the headstock 2, and a table 4. The tail stock 3 is movable in the left and right direction of the apparatus along a pair of guide rails 6 disposed on the top surface of the bed 1. The tail stock 3 can be moved closer to or away from the headstock 2 by a driving mechanism 9 formed of a motor, a belt, etc. provided on the side of the bed. The center 12 of the tail stock 3 is retractable by a cylinder 13. The table 4 is movable in the left and right directions along a pair of guide rails 7 disposed on the top surface of the bed 1. The table 4 is movable along the guide rails 7 by a ball thread 15 disposed between the pair of guide rails 7 and a driving motor 16 for driving the ball thread 15. The main spindle 10 of the headstock 2 can be rotated by a driving mechanism 11 including a driving motor, belt, etc. In such a structure, a gravure cylinder 14 is supported between the main spindle 10 and the center 12, as shown by the dot-dot-dash line of FIG. 4.

The table 4 is equipped with an engraving head 21 movable in the front and rear directions of the apparatus (the direction perpendicular to the paper of FIG. 4). That is, guide rails 20 are provided on the top surface of the table 4, and the engraving head 21 can be moved by a driving mechanism including a ball thread 22 and a driving motor 23.

Figure 6:
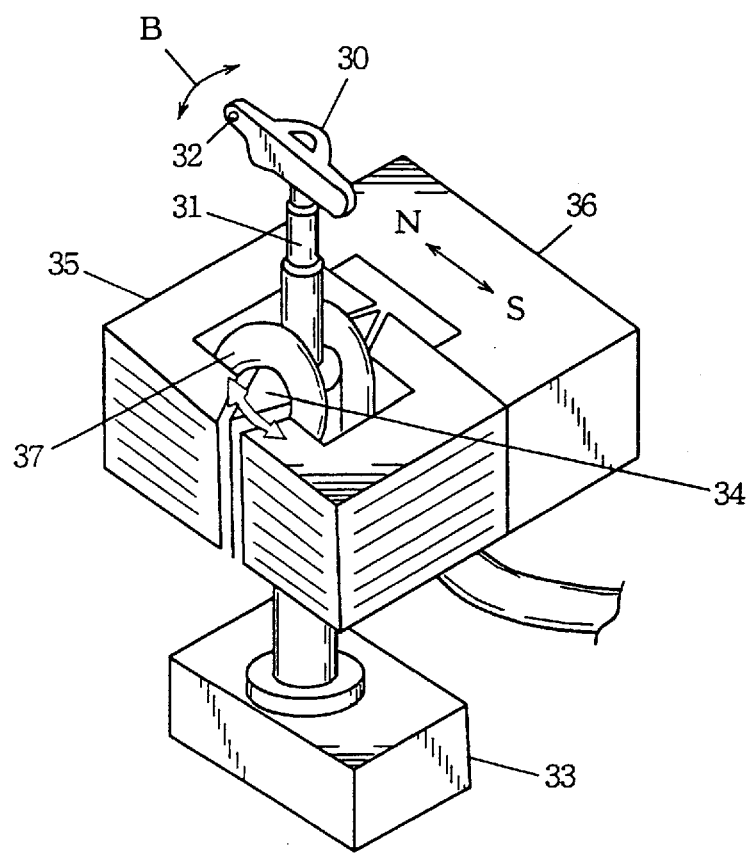
FIG. 6 is a perspective view showing a stylus provided for the engraving head of FIG. 4 and a driving mechanism thereof.

FIG. 6 is a perspective view showing a stylus provided to the engraving head 21 and its driving mechanism. In FIG. 6, the stylus 30 is fixed to the end of a return shaft 31 and is equipped with a diamond bite 32 at its one end. The other end of the return shaft 31 is fixed to a fixed portion 33. A rotor 34 of a rhombus shape in a plane view thereof is fixed to the middle portion of the return shaft 31. A laminated magnetic material (stator) 35 is disposed around the rotor 34 to enclose the rotor 34, and a permanent magnet 36 for providing the stator 35 with a magnetic force is disposed on the side of the stator 35. A coil 37 is disposed around the rotor 34, between the rotor 34 and the stator 35. In such a structure, by applying an engraving signal to the coil 37, the stylus 30 vibrates in accordance with the frequency of the engraving signal in the direction shown by the arrow B in FIG. 6.

Figure 7A:
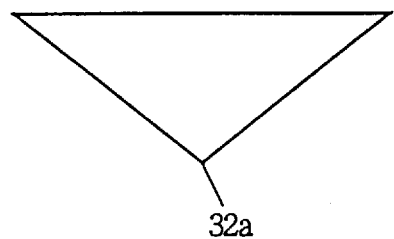
FIGS. 7(a) through 7(c) are external views of the diamond bite of FIG. 6, with FIG. 7(a), FIG. 7(b), and FIG. 7(c) being a front view, left view, and bottom view, respectively.
Figure 7B:
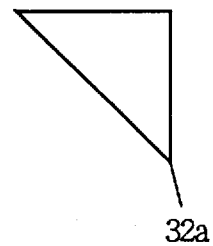
Figure 7C:
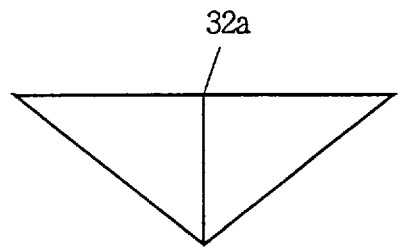

FIGS. 7(a) through 7(c) are external views of the diamond bite 32 of FIG. 6. Specifically, FIG. 7(a), FIG. 7(b) and FIG. 7(c) are a front view, left view, and bottom view of the bite 32 of FIG. 6, respectively. As shown in FIGS. 7(a) through 7(c), the diamond bite 32 is of a trigonal pyramid shape, and it engraves the surface of the gravure cylinder 14 at the apex 32a of the trigonal pyramid.

Figure 8:
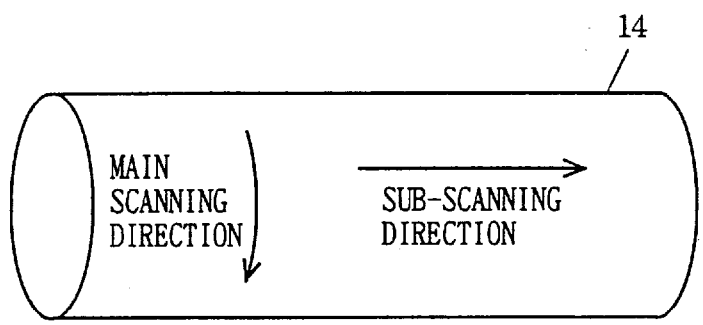
FIG. 8 is a diagram illustrating a main scanning direction and a sub-scanning direction with respect to the gravure cylinder.

The gravure engraving machine of the first embodiment constructed as described above engraves cells along the main scanning direction shown in FIG. 8 (the circumferential direction of the gravure cylinder 14), and when it has finished engraving one line, the engraving head 21 is moved by a certain pitch in the sub-scanning direction (the direction parallel to the rotation axis of the gravure cylinder 14) to engrave cells in the next line. Repeating this operation forms an intaglio formed of a plurality of cells on the surface of the gravure cylinder 14.

Figure 9:
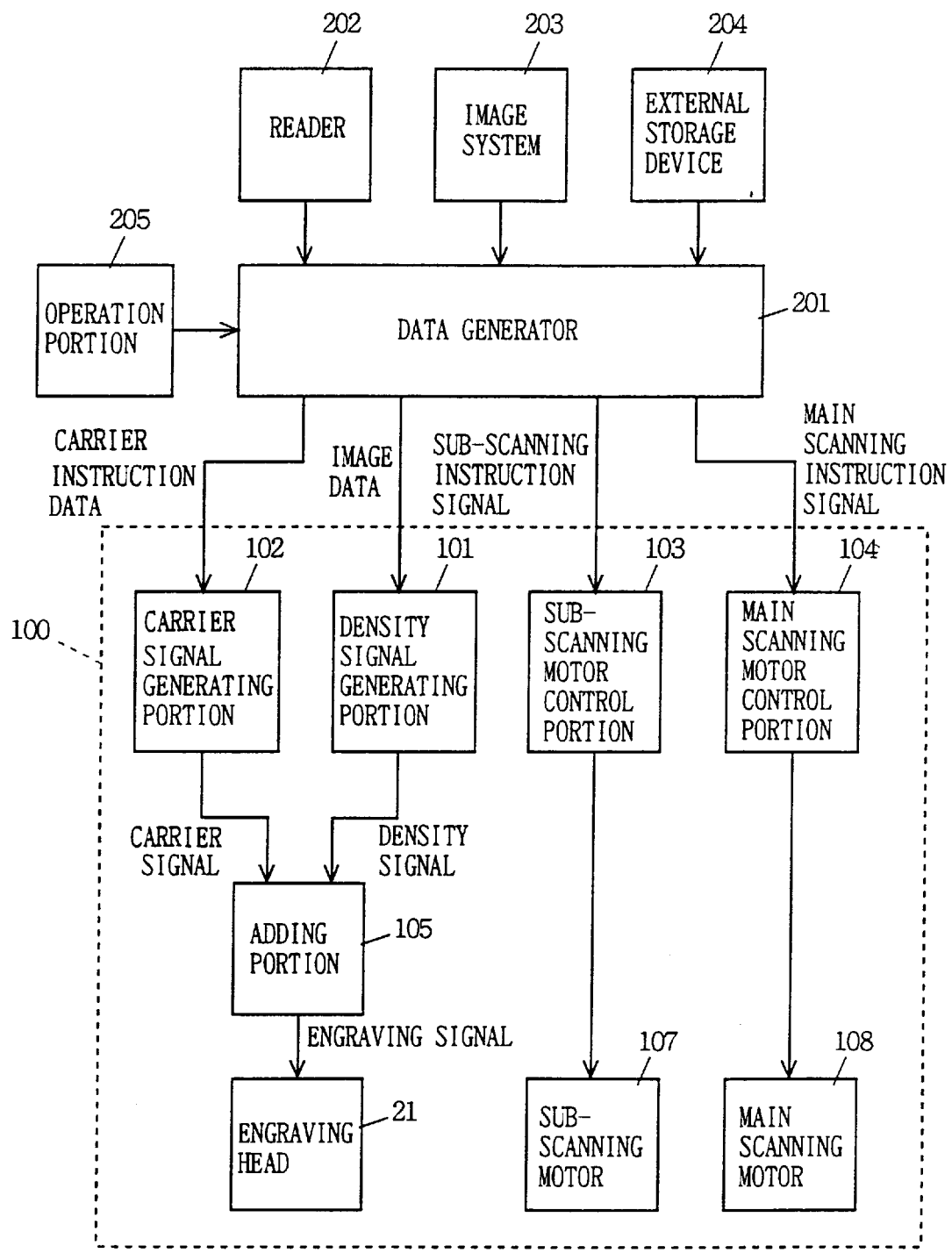
FIG. 9 is a block diagram showing the electric structure of the gravure engraving system using the gravure engraving machine shown in FIG. 4 and FIG. 5.

FIG. 9 is a block diagram showing the electric structure of a gravure engraving system using the gravure engraving machine 100 shown in FIG. 4 and FIG. 5. In FIG. 9, a data generator 201, such as a personal computer and the like, is connected to the gravure engraving machine 100. Connected to this data generator 201 are a reader 202 such as a scanner, an other image system 203, an external storage device 204 such as a hard disk device, and an operation portion 205 such as a key board, a mouse, and the like. The data generator 201 creates image data for gravure prepress on the basis of data read from certain originals by the reader 202 and data obtained from the other image system 203. For example, the data generator 201 obtains image data for offset from the other image system and performs offset/gravure conversion to create image data. An operator operates the operation portion 205 to input various data or instructions (e.g., ruling (the number of lines per inch which are formed by the cells), cell pattern (elongated, compressed, etc.), engraving conditions (including single engraving/double engraving, etc.) into the data generator 201. On the basis of the input data or instruction from the operation portion 205, the data generator 201 generates carrier instruction data, a sub-scanning instruction signal and a main scanning instruction signal together with the image data. These data and signals are provided to the gravure engraving machine 100.

The gravure engraving machine 100 includes a density signal generating portion 101, a carrier signal generating portion 102, a sub-scanning motor control portion 103, a main scanning motor control portion 104, an adding portion 105, an engraving head 21, a sub-scanning motor 107, and a main scanning motor 108. The density signal generating portion 101 generates a density signal on the basis of image data provided from the data generator 201. The carrier signal generating portion 102 determines amplitude and an offset amount on the basis of the carrier instruction data provided from the data generator 201 to generate a carrier signal. The density signal from the density signal generating portion 101 and the carrier signal from the carry signal generating portion 102 are added in the adding portion 105 and then applied to the engraving head 21 as an engraving signal. The sub-scanning motor 107 is a motor for moving the engraving head 21 in the sub-scanning direction. The main scanning motor 108 is a motor for rotating the gravure cylinder 14. The sub-scanning motor control portion 103 controls the sub-scanning motor 107 on the basis of the sub-scanning instruction signal from the data generator 201 to change the amount of moving the engraving head 21 in the sub-scanning direction in accordance with the ruling, single engraving/double engraving, etc. The main scanning motor control portion 104 controls the main scanning motor 108 on the basis of the main scanning instruction signal from the data generator 201 to change the rotation speed of the gravure cylinder 14 in accordance with the cell pattern and ruling.

Before describing detailed operation of the gravure engraving system of the first embodiment described above, its principle will be described.

Figure 10A:
FIGS. 10(a) through 10(c) are waveform diagrams of signals used in the gravure engraving system of a first embodiment.
Figure 10B:
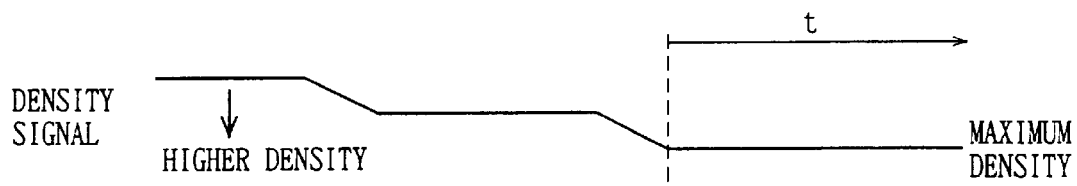
Figure 10C:
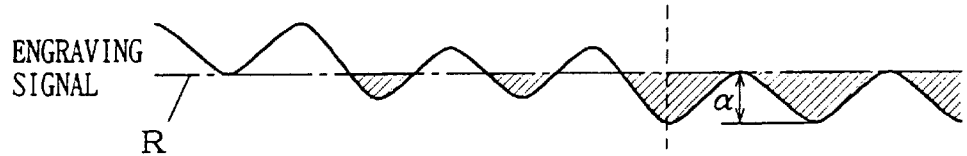

FIG. 10(c) shows a waveform of an engraving signal applied to the engraving head in the gravure engraving system of the first embodiment, which corresponds to a displacement waveform of the stylus. The signal waveform is obtained by superposing the density signal waveform as shown in FIG. 10(b) on the carrier signal wave form with a high frequency as shown in FIG. 10(a) (that is, by modulating the carrier signal with the density signal). By applying such an engraving signal to the engraving head, cells with depth and size (area) corresponding to the density signal can be engraved on the surface of the gravure cylinder 14. The dot-dash line in FIG. 10(c) corresponds to the surface of the gravure cylinder 14, and the portion shown by the hatching in the figure corresponds to cells.

In the first embodiment, the full amplitude α of the carrier signal, shown in FIG. 10(a), is set smaller than the full amplitude a (FIG. 1(a)) of the conventional gravure engraving machine (α<a), and cells with the maximum printing density (referred to as maximum density cells, hereinafter) are engraved by using the entirety of the full amplitude α of the engraving signal as shown in FIG. 10(c) (the period t in FIGS. 10(a) through 10(c)). Accordingly, in the first embodiment, cells of smaller size than conventional engraving systems are engraved. In the first embodiment, cells of smaller size than conventional engraving systems are engraved to overlap each other in the sub-scanning direction. That is to say, the first line of cells are first engraved in the main scanning direction of the gravure cylinder 14, and then the engraving head 21 is moved by a certain pitch $P_1$ in the sub-scanning direction, and the second line of cells are engraved to partially overlap with the first line of cells. Next, the engraving head 21 is moved a certain pitch $P_2$ in the sub-scanning direction, and the third line of cells is engraved so that they do not overlap with the second line of cells. Next, the engraving head 21 is moved by the certain pitch $P_1$ in the sub-scanning direction, and then the fourth line of cells are engraved to partially overlap with the third line of cells. Subsequently, the same operations are repeated.

Since in the first embodiment, the full amplitude of the carrier signal is smaller than in the conventional engraving system, an opening area of one cell is smaller than the opening area of a conventional cell. In this embodiment, however, since two cells adjacent in the sub-scanning direction are engraved to partially overlap with each other, the two adjacent cells communicate with each other, which can be regarded as one cell in regard to the cell volume. Accordingly, as the cell volume is maintained at the same level as in the conventional system, a printing density at the same level as that of the conventional gravure engraving machine can be obtained. Concerning resolution of image, the two adjacent cells can be regarded as separate cells and engraving the respective two adjacent cells with different image data doubles the resolution of the image in the sub-scanning direction, as compared with the conventional system.

Figure 11:
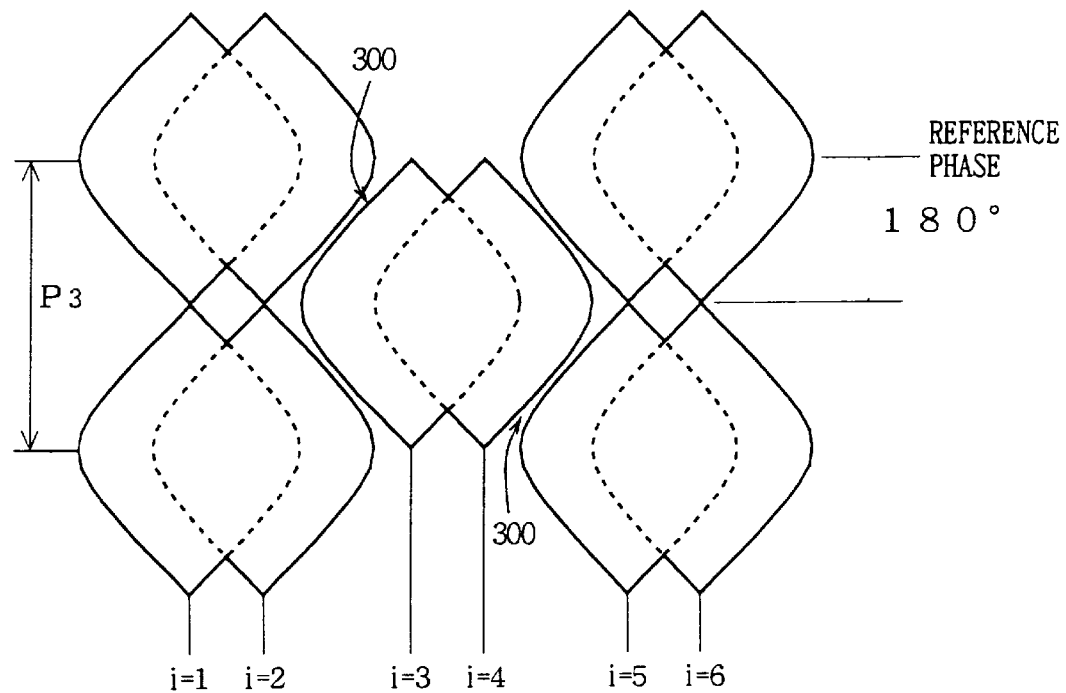
FIG. 11 is a diagram showing the top configuration and arrangement of cells engraved by the gravure engraving system of the first embodiment.
Figure 12:
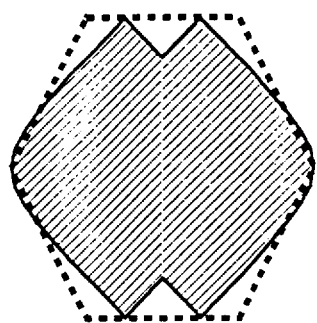
FIG. 12 is a diagram showing a pseudo equivalent to the top configuration of a cell engraved by the gravure engraving system of the first embodiment with another geometrical figure.

FIG. 11 is a diagram showing top configuration and arrangement of cells engraved by the gravure engraving system of the first embodiment. As shown in FIG. 11, the cells engraved in the first embodiment are regularly arranged analogous to the conventional cells. The shape of each cell approximates a hexagon, as shown in FIG. 12.

Figure 13:
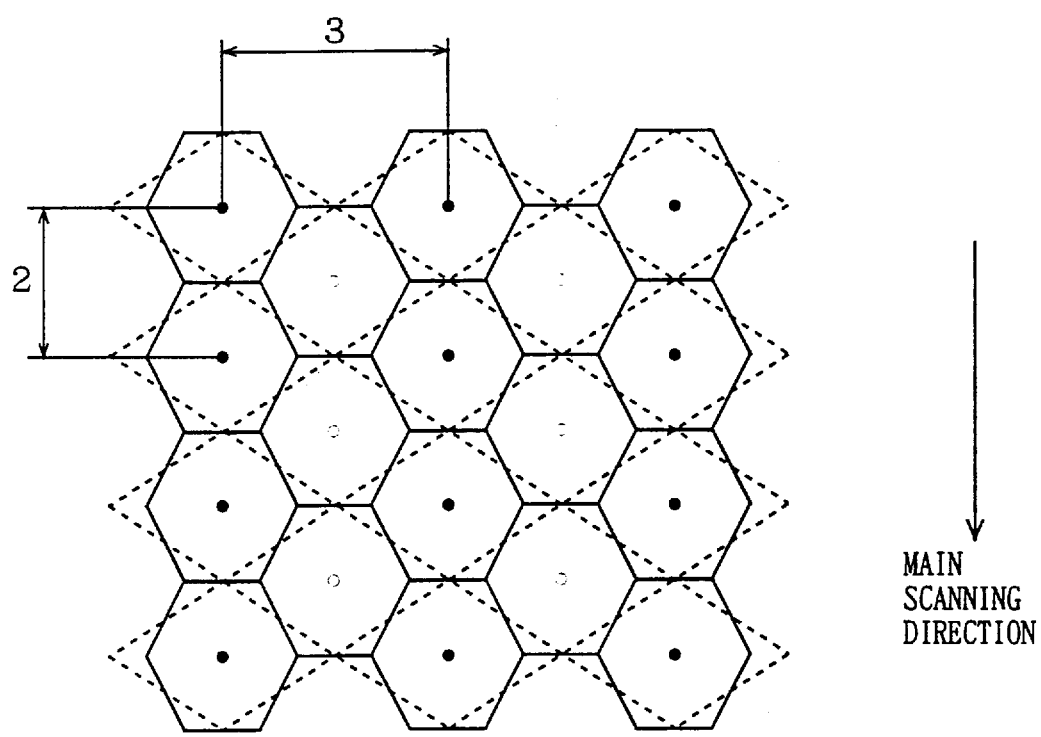
FIG. 13 is a diagram showing in comparison an arrangement of cells engraved by the gravure engraving system of the first embodiment and an arrangement of cells engraved by a conventional gravure engraving system.

FIG. 13 is a diagram comparing the arrangement of cells engraved by the gravure engraving system of the first embodiment and the arrangement of cells engraved by the conventional gravure engraving system. In FIG. 13, the solid lines represent pseudo hexagonal cells of the first embodiment and the dotted lines represent the conventional pseudo rhombic cells. Referring to FIG. 13, the pseudo hexagonal cells of the first embodiment are regularly arranged according to a predetermined vertical to horizontal pitch ratio of cells (3 to 2 in the case of the elongated, 2 to 3 in the compressed, and FIG. 13 shows the case of the compressed), analogous to the conventional pseudo rhombic cells.

Figure 14:
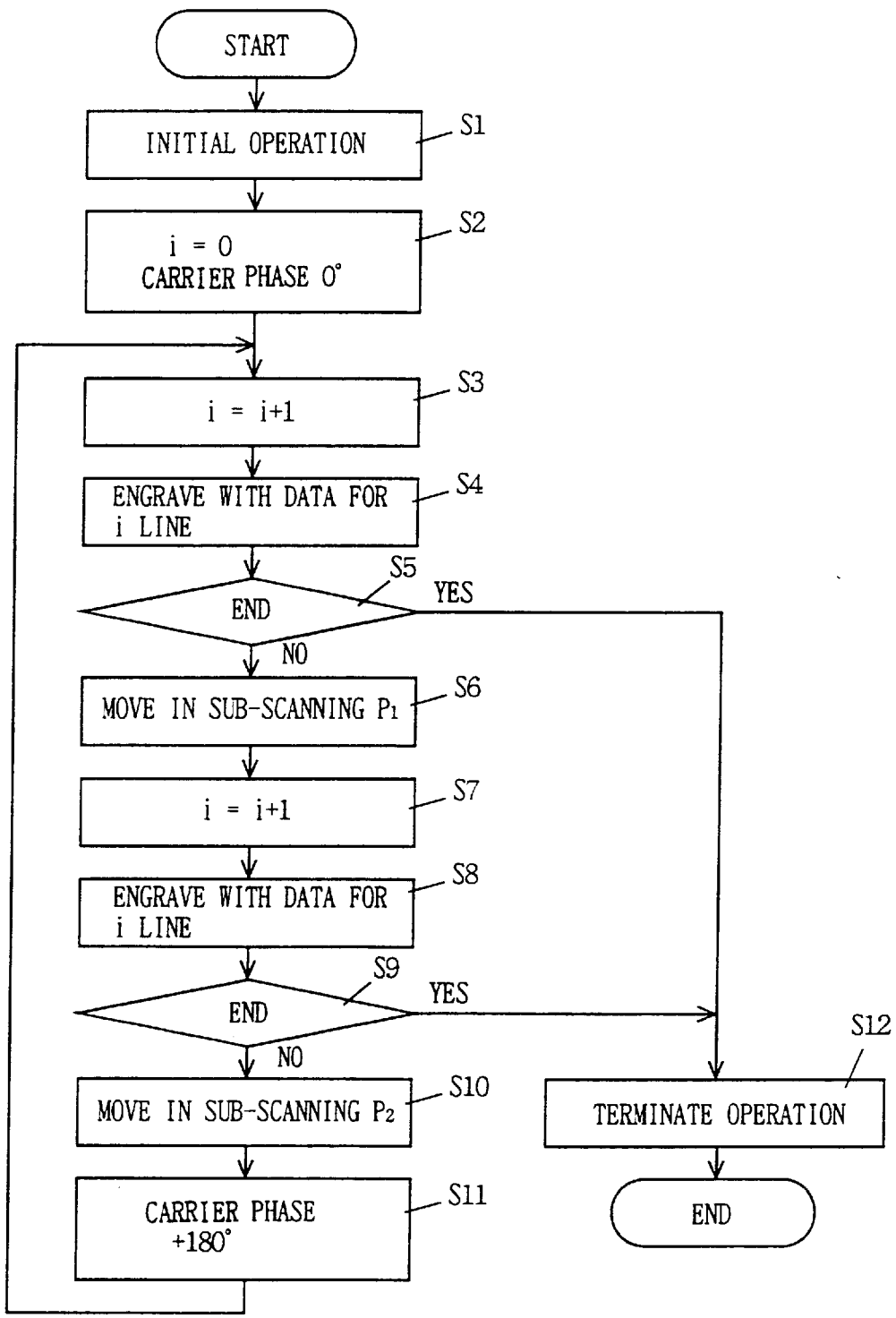
FIG. 14 is a flow chart showing the operation of the gravure engraving system of the first embodiment.

FIG. 14 is a flow chart showing operations of the gravure engraving system of the first embodiment. Referring to FIG. 14, the operation of the first embodiment will be described in more detail. First, a certain initial operation is carried out (Step S1). In this initial operation, the data generator 201 generates carrier instruction data, a sub-scanning instruction signal and a main scanning instruction signal on the basis of instructions inputted from the operation portion 205. In response, the carrier signal generating portion 102 generates a carrier signal (refer to FIG. 10(a)) with predetermined frequency and amplitude. The carrier signal is provided to the engraving head 21 through the adding portion 105. In response, the stylus 30 of the engraving head 21 reciprocates in the direction of the arrow B in FIG. 6. At this time since no image data is outputted from the data generator 201, the diamond bite 32 provided at the end of the stylus 30 is not abutting the gravure cylinder 14. Accordingly, engraving is not performed. The main scanning motor control portion 104 rotates the main scanning motor 108 on the basis of the main scanning instruction signal from the data generator 201. In response, the gravure cylinder 14 is rotated at a speed corresponding to the cell pattern and ruling set in the operation portion 205. The sub-scanning motor control portion 103 drives the sub-scanning motor 107 on the basis of the sub-scanning instruction signal from the data generator 201. In response, the engraving head 21 is moved to a start position (a position where the first cell line is to be engraved) in the sub-scanning direction.

Next, the data generator 201 clears an internal counter i (a counter for, counting a line number of cells to be engraved next; not shown) and outputs carrier instruction data, for setting the phase of a carrier signal to the reference phase 0° to the carrier signal generating portion 102 (Step S2). In response, the carrier signal generating portion 102 generates a carrier signal set to the reference phase 0°. Next, the data generator 201 increments the counter i by 1 (Step S3). Next, the data generator 201 outputs image data for a cell line corresponding to the count value "1" of the counter i. The image data is converted into a density signal in the density signal generating portion 101 and added to the carrier signal in the adding portion 105. Thus, an engraving signal for the first line of cells is outputted from the adding portion 105 and applied to the engraving head 21. In response, the engraving head 21 engraves the first line of cells (Step S4).

Next, the data generator 201 determines whether all lines of cells have been engraved (Step S5). If unengraved lines of cells exist, the data generator 201 outputs a sub-scanning instruction signal for moving the engraving head 21 by a certain pitch and provides it to the sub-scanning motor control portion 103. The sub-scanning motor control portion 103 drives the sub-scanning motor 107 in response to the provided sub-scanning instruction signal. The engraving head 21 is thus moved in the sub-scanning direction by the second pitch $P_2$ shown in FIG. 11 (Step S10). Next, the data generator 201 outputs the carrier instruction data for advancing the phase of the carrier signal by 180° ahead of the reference phase 0° to the carrier signal generating portion 102. In response, the carrier signal generating portion 102 generates a carrier signal having its phase advanced by 180° ahead of the reference phase (Step S11). Subsequently, it returns to the operation of the Step S3, and the third and fourth lines of cells are engraved in positions shifted by 180° in phase from the cell line engraved in the Step S8 on the gravure cylinder 14. (Steps S3–S8) The $P_2$ is selected so that the cells in third line engraved in the Step S8 will not overlap with adjacent cells in the second line of cells engraved in the Step S4. Thus, an unengraved portion 300 (FIG. 11) called a cell wall is formed between a cell in the second line and a cell in the third line. Formation of such cell walls 300 removes excessive ink from the surface of the gravure cylinder after each cell is charged with ink.

Subsequently, the data generator 201 determines whether all cell lines have been engraved (Step S9), and if unengraved cells exist, it repeats the operations in the Steps S10, S11, and S3–S9. Then, cells in the n-th line (n is an odd number) and cell sin the (n+1)th line are engraved being partially superposed. And, cells in the (n+1)th line and cells in the (n+2)th line are engraved so that they do not overlap. Furthermore, cells in the (n+2)th line and the (n+3_th line are engraved in positions where the phase is shifted by 180° from cells in the n-th line and the (n+1)th line.

Figure 15A:
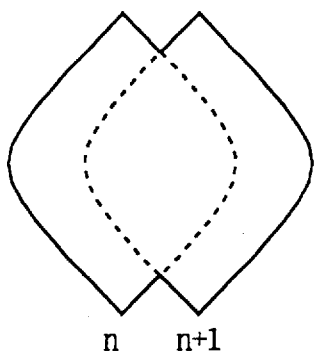
FIGS. 15(a) through 15(c) are diagrams showing various conditions of two adjacent cells engraved on the basis of different image data.
Figure 15B:
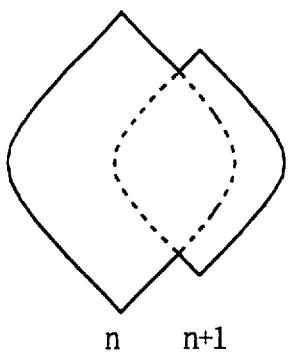
Figure 15C:
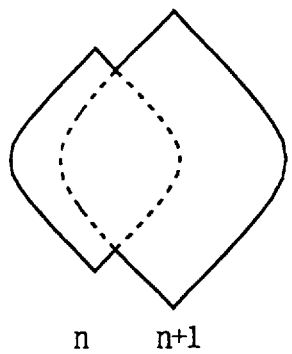

In the first embodiment discussed above, engraving the partially overlapping adjacent cells in the n-th line and (n+1)th line with different image data allows the adjacent cells to independently differ in size, as shown in FIGS. 15(a) through 15(c). As stated above, since the two adjacent cells can be regarded as different cells in regard to resolution of the image, the image resolution in the sub-scanning direction can be doubled in the first embodiment as compared with the conventional engraving system.

When the above-described operations are repeated and it is determined that all cell lines have been engraved (Step S5 or S9), then the data generator 201 executes a certain termination operation (Step S12). In this termination operation, the rotation of the gravure cylinder 14 is stopped and the engraving head is returned to the home position, for example.

(2) Second Embodiment

Next, a second embodiment of the present invention will be described. As a basic structure of the gravure engraving system of the second embodiment is the same as that of the gravure engraving system of the first embodiment (refer to FIG. 4 through FIG. 9), the structure of the first embodiment is incorporated here and detailed description thereof is not repeated.

Figure 16A:
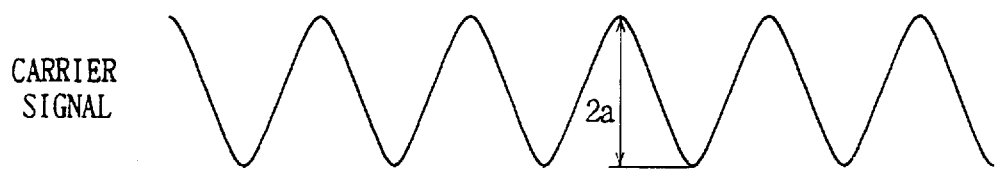
FIGS. 16(a) through 16(c) are waveform diagrams of signals used in a gravure engraving system of a second embodiment of the present invention.
Figure 16B:
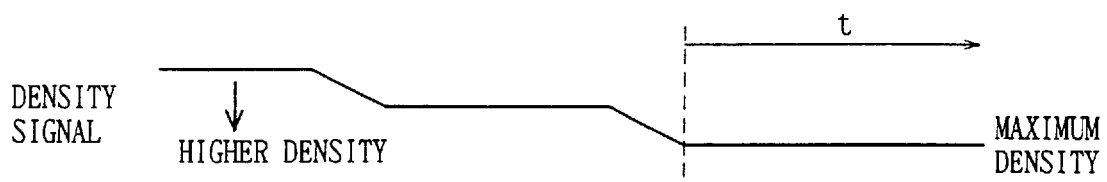
Figure 16C:
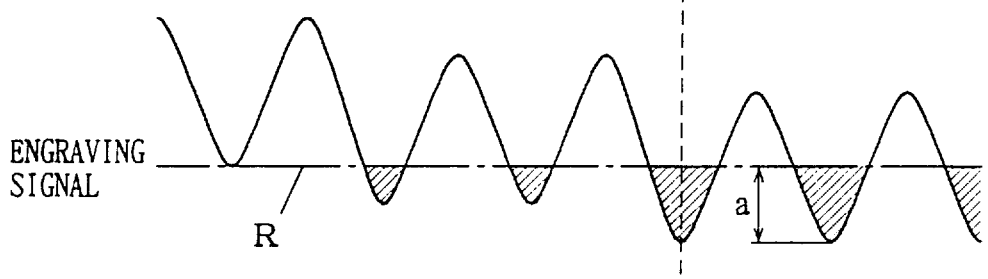

FIG. 16(c) shows a waveform of an engraving signal applied to the engraving head in the gravure engraving system of the second embodiment, which corresponds to a displacement waveform of the stylus. This signal waveform is obtained by superposing a density signal waveform as shown in FIG. 16(b) on a carrier signal waveform with high frequency as shown in FIG. 16(a) (i.e., by modulating the carrier signal with the density signal). By applying such an engraving signal to the engraving head, cells with depth and size (area) corresponding to the density signal can be engraved on the surface of the gravure cylinder. The dot-dash line R in FIG. 16(c) corresponds to the surface of the gravure cylinder, and the portions shown by the hatching in the figure correspond to cells.

In the second embodiment, as shown in FIG. 16(a), a full amplitude of the carrier signal is set to 2a, twice the full amplitude in the conventional gravure engraving machine, and a maximum density cell is engraved with half of the full amplitude of the engraving signal, i.e., with a portion corresponding t*o the amplitude a (the period t in FIGS. 16(a) through 16(c)). Hence, in the second embodiment, cells are alternately engraved in the main scanning direction, in contrast with the conventional ones. That is to say, in the second embodiment, a line of cells are engraved in the main scanning direction by two interleaved scans, and lines of cells adjacent in the sub-scanning direction are engraved to overlap in alternate lines.

Figure 17:
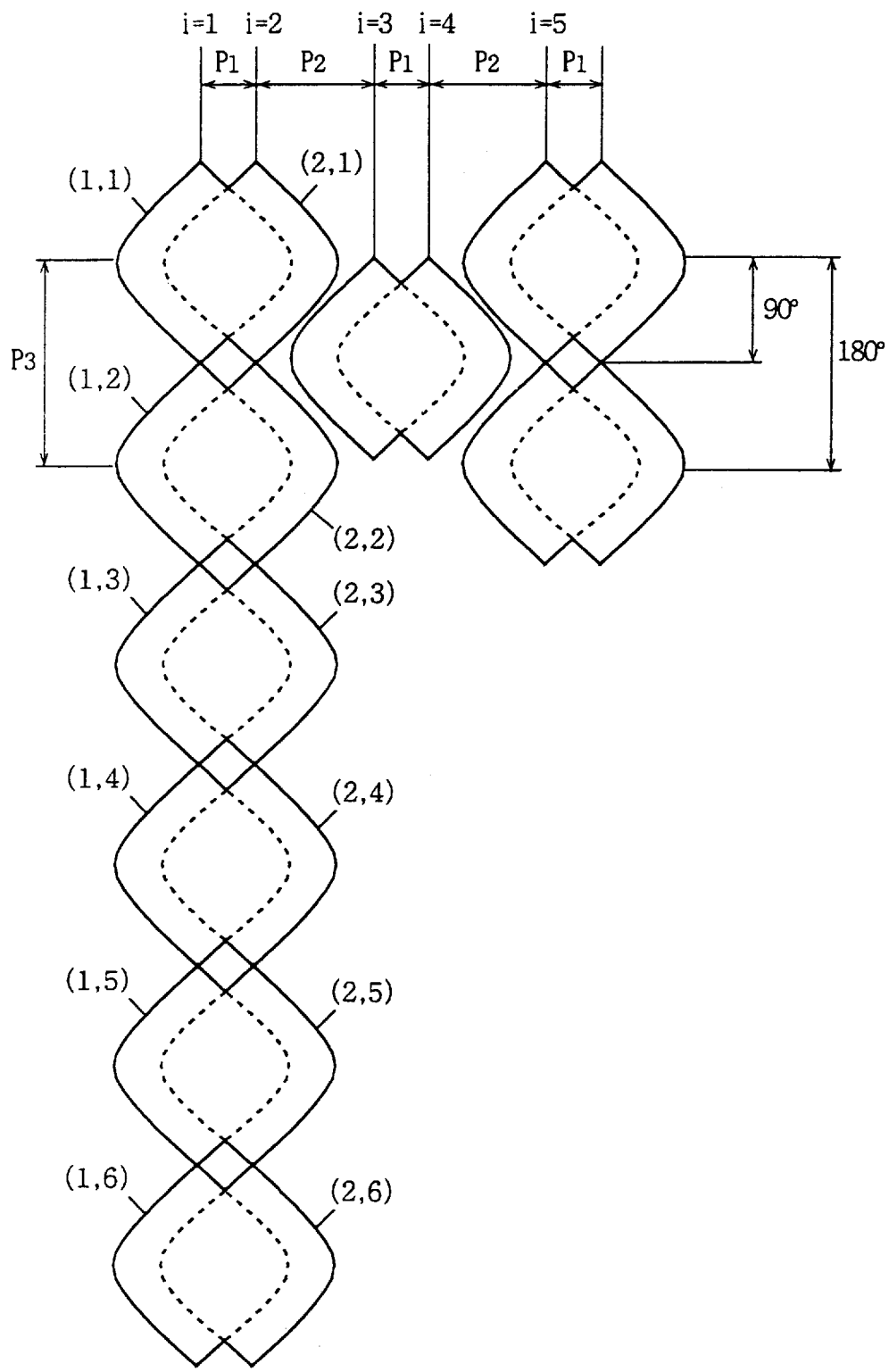
FIG. 17 is a diagram illustrating the order of engraving cells in the second embodiment.

Referring to FIG. 17, the order of engraving cells in the second embodiment will be described. First, in the first line (i=1), cells are engraved in the first rotating as (1,1)→(1,3) →(1,5) .... In the second rotation, cells are engraved as (1,2)→(1,4)→(1,6) .... Next, the engraving head 21 is moved by the pitch $P_1$ in the sub-scanning direction. Then, in the second line (i=2), cells are engraved as (2,1)→(2,3) →(2,5) ... in the first rotation. In the second rotation, cells are engraved as (2,2)→(2,4)→(2,6) .... At this time, they are engraved so that cells in the first line and cells in the second line overlap.

As stated above, in the second embodiment, since the full amplitude of the carrier signal is doubled as compared with the conventional one and a maximum density cell is engraved with a portion corresponding to the amplitude of the engraving signal, its wall is steeper than the conventional cell. Hence, the volume of the cell can be increased as compared with the first embodiment.

Figure 18:
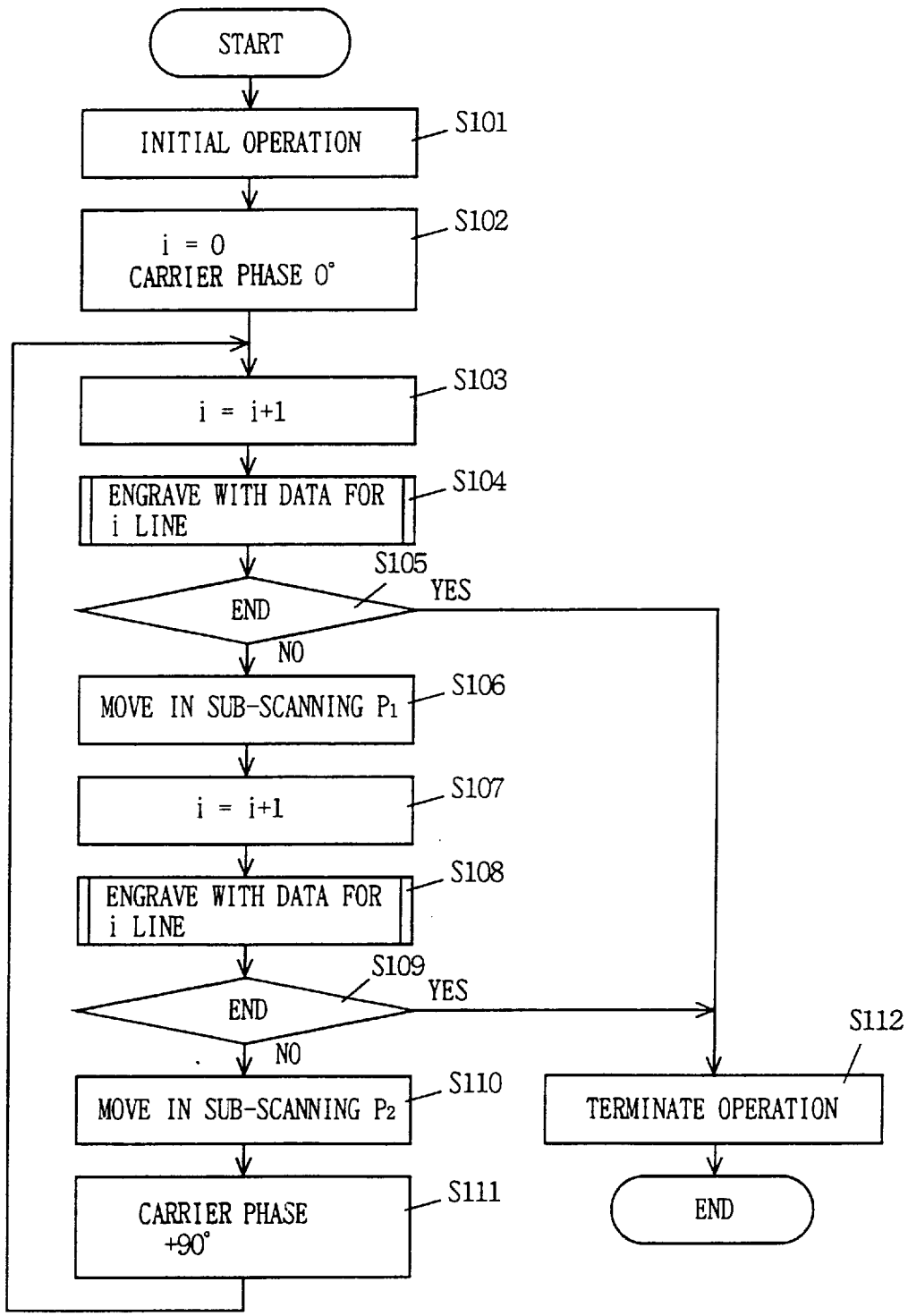
FIG. 18 is a flow chart showing operations of the gravure engraving system of the second embodiment.

FIG. 18 is a flow chart showing the operation of the engraving system of the second embodiment. The operations in Steps S101–S112 in this flow chart correspond to the operations in the Steps S1–S12 in the flow chart of the first embodiment (FIG. 14), respectively. As the operation steps other than the Steps S1–4, S108 and S111 are the same as those in the above-described first embodiment, detailed description thereof is not repeated.

Figure 19:
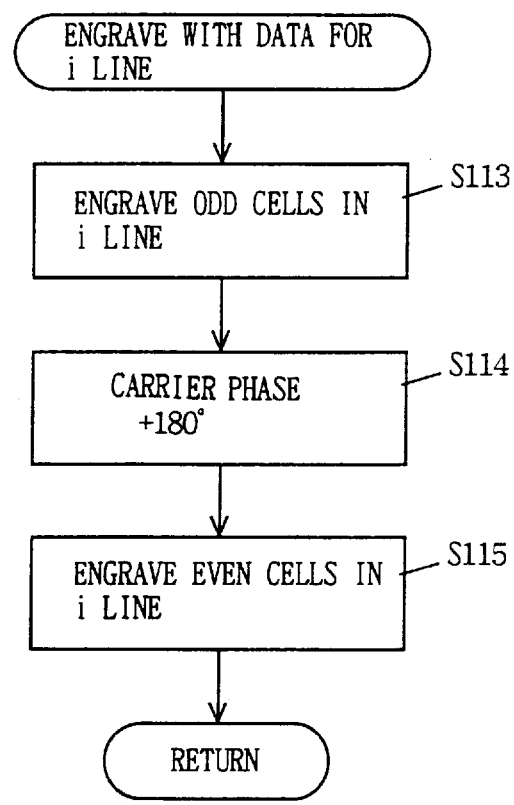
FIG. 19 is a flow chart showing the process of engraving the I line.

In the Step S104, data engraving for the i line is performed as shown in the flow chart of FIG. 19. First, in Step S113, cells numbered with odd numbers in the i line in the main scanning direction, e.g., the cells shown by (1,1), (1,3), (1,5) ... in FIG. 17, are engraved. In this way, cells in one line are engraved by repeating main scanning twice. In the step S108, data engraving of an i line as shown in FIG. 19 is performed in the same way, and cells in one line are engraved by two main scannings. In the Step S111, unlike the first embodiment, the carrier signal is set to +90°.

In the embodiments described above, the first and second pitches $P_1$ and $P_2$ are selected to the most appropriate values considering values considering various engraving conditions (the number of lines per inch, the apex angle of the diamond bite, frequency and amplitude of the carrier signal, etc.). If the first pitch $P_1$ is large and the second pitch $P_2$ is small, as the cell wall 300 (refer to FIG. 11) must be secured so that the cells will not overlap in the second pitch $P_2$, and then the cells can not be made large and the volume of cells can not be made large, either. If the first pitch $P_1$ is small and the second pitch $P_2$ is large, it is easy to secure the cell wall 300 (refer to FIG. 11) in the second pitch $P_2$, and then the cells can be made large and the volume of cells can also be made large. Accordingly, it is preferred that the first pitch $P_1$ is smaller than the second pitch $P_2$. Considering uniformity of the image, it is preferred that the first and second pitches $P_1$ and $P_2$ have a as small difference as possible.

Although the maximum density cells are engraved using the portion corresponding to half of the full amplitude of the engraving signal in the second embodiment, the present invention is not restricted to the same, and the maximum density cells may be engraved by using a portion corresponding to a half or less of the full amplitude of the engraving signal.

Although the embodiments described above show cells arranged by the compressed arrangement, it is a matter of course that the present invention can also be applied to cells arranged at other pitch ratios (elongated, normal, etc.).

Although the primary objectives aforementioned are satisfactorily met according to the embodiments described above, cases may occur in which the following question is recognized as technical deficiency or insufficiency in the printing density, and the resolution of the image depend upon the level or degree required in the industry.

Figure 20A:
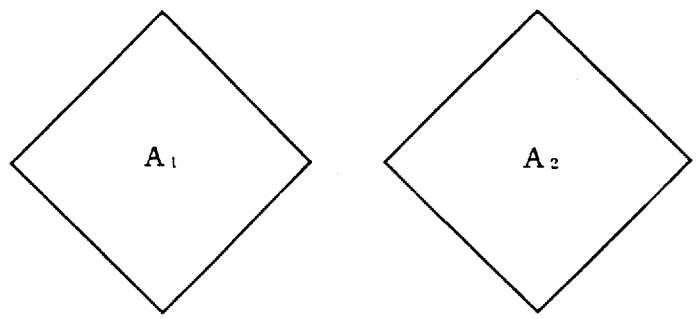
FIGS. 20(a) through 20(c) are diagrams for illustrating a problem in engraving overlapping cells.

More specifically, as cells arranged in the main scanning direction are engraved so that they will partially overlap with cells adjacent in the sub-scanning direction in the above-described embodiments, a problem arises about areas of cells. This problem is described referring to FIGS. 20(a) through 20(c). As shown in FIG. 20(a), for example, when a cell with an area $A_1$ and a cell with an area $A_2$ are to be engraved, faithful representation of the tone represented with image data, i.e., the printing density requires $A_1+A_2$ as a united area of the two cells. A shown in FIG. 20(b), however, if the two cells partially overlap, the united area of the two cells is $A_1+A_2-\beta$, where the area $A_1+A_2$ is reduced by the area $\beta$ of the overlapping portion. This can not accurately represent the tone represented with image data.

Figure 20B:
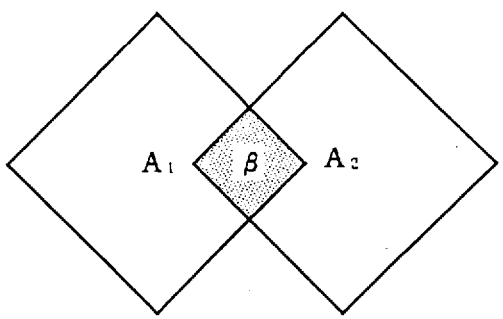
Figure 20C:
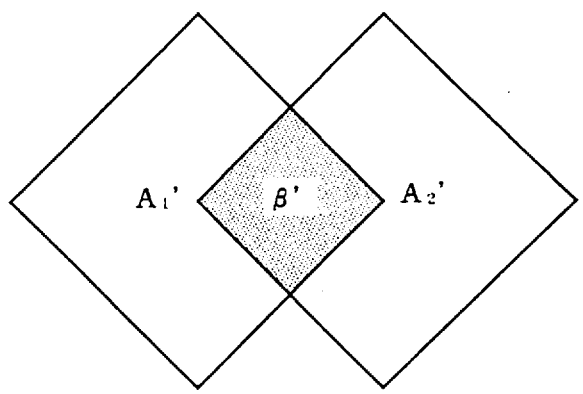

Accordingly, in the third embodiment described later, when two cells overlap, the tone of image data is corrected to enlarge the area of each cell as shown in FIG. 20(c) so that the united area of cells after engraving almost corresponds to the initially supposed areas of the cells. That is to say, if areas of respective cells after correction are taken as $A_1$ and $A_2$ and the area of an overlapping portion thereof as $\beta'$, then correction is applied to the image data to satisfy $$A_1+A_2-\beta=A_1+A_2$$

in the third embodiment. When one or both of two cells adjacent in the sub-scanning direction is small, the correction is not made because the cells do not overlap.

Figure 21:
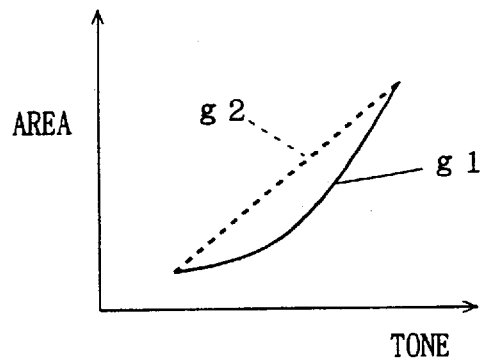
FIG. 21 is a diagram showing that the tone of image data and the cell area is in a non-linear relation.

In the embodiments above, a tone specified by image data, i.e., a printing density, appears as a width of a cell (a width in the sub-scanning direction). Thus, a change of a tone on the image data corresponds to a width of a cell, and an area of the cell is in proportion to almost a square of the cell width, so that the relation between the tone change on the image data and the cell area is non-linear as shown by the solid line g1 in FIG. 21, which is, more specifically, a relation like a quadratic function. In this way, the embodiments described above in which the tone change on the image data is not in linear proportion to the cell area have a problem that the density of printed matters can not be controlled correctly. Hence, in the third embodiment described below, the tone representation of image data is corrected so that the relation between the tone change on the image data and the cell area will become linear as shown by the dotted line g2 in FIG. 21.

(3) Third Embodiment

A gravure engraving system according to the third embodiment of the present invention is configured to solve the above-described two problems, but its basic structure is the same as that of the gravure engraving system of the first embodiment (refer to FIG. 4 through FIG. 9), so that the structure of the first embodiment is incorporated here and its detailed description thereof is not repeated.

In the third embodiment, the data generator 201 of FIG. 9 corrects the tone of the image data provided to the density signal generating portion 101. This enables faithful reproduction of the tone represented by the original image data captured from the reader 202 or the other image system 203. Operations of the gravure engraving machine 100 based on corrected image data may be the same as those in the above-described first or second embodiment.

Figure 22:
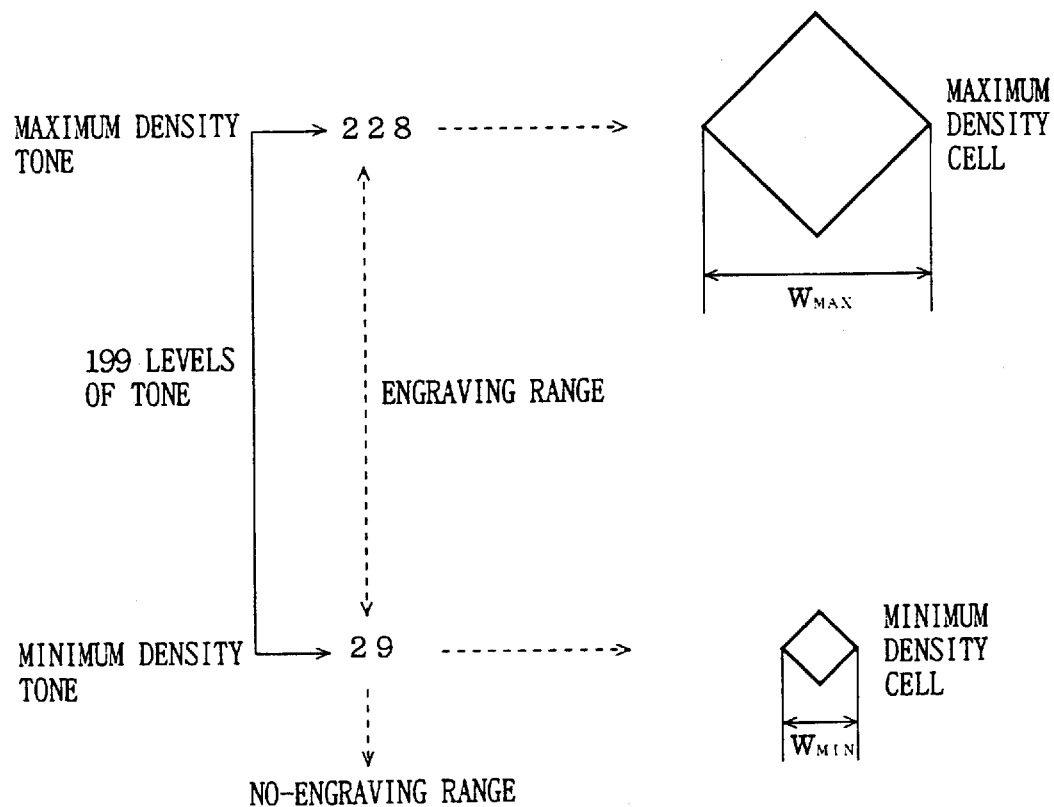
FIG. 22 is a diagram showing tone representation of image data in a gravure engraving system of a third embodiment.

As shown in FIG. 22, in the third embodiment, values 29–228 within, in the values 0–256 represented by 8 bits, are used to represent the tone. The value 29 corresponds to a minimum density tone and the value 228 corresponds to a maximum density tone. Accordingly, the minimum density tone, the maximum density tone and intermediate density tones are represented with tone values at these 199 levels.

Figure 23A:
FIGS. 23(a) through 23(c) are waveform diagrams of signals used when the third embodiment is applied to the first embodiment.
Figure 23B:
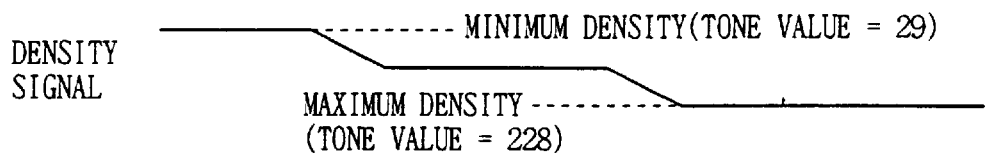
Figure 23C:
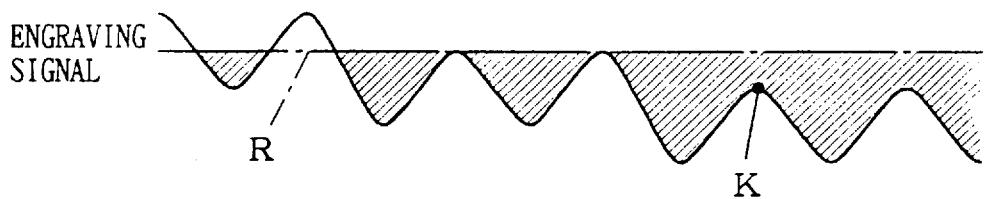
Figure 24A:
FIGS. 24(a) through 24(c) are waveform diagrams of signals used when the third embodiment is applied to the second embodiment.
Figure 24B:
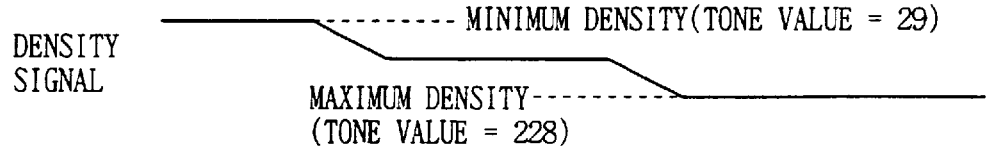
Figure 24C:
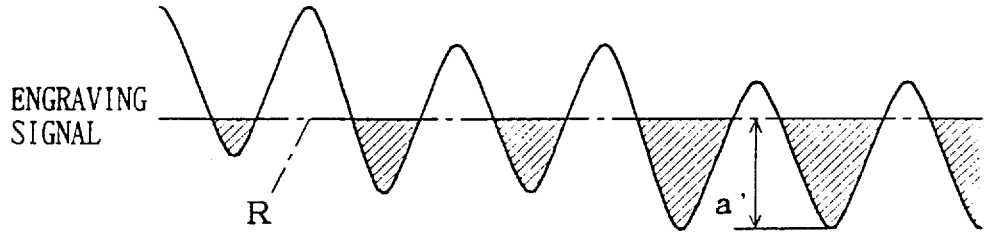
Figure 27A:
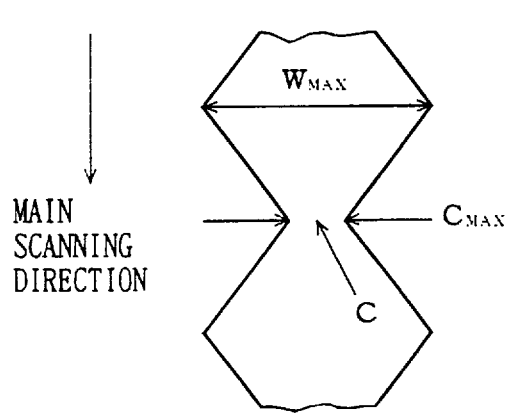
FIGS. 27(a) and 27(b) are diagrams showing the relation between a channel formed between cells adjacent in the main scanning direction and cell width.

Furthermore, in the third embodiment, when a cell of a large size is engraved, a portion communicating with each other, i.e., a channel C (refer to FIG. 27(a)) is formed between cells adjacent in the main scanning direction. Formation of a channel C facilitates flow of ink in the main scanning direction to enhance the charging efficiency of ink into cells. To form the channel C when the third embodiment is applied to the first embodiment, as shown in FIGS. 23(a) through 23(c), the level of the apex portion K of the engraving signal corresponding to a maximum density cell is set lower than the reference level R corresponding to the surface of the gravure cylinder. This enlarges sizes of cells and channels appear between cells adjacent in the main scanning direction. To form the channel C when the third embodiment is applied to the second embodiment, as shown in FIGS. 24(a) through 24(c), a maximum density cell is engraved with a portion larger than half of the full amplitude 2a of the carrier signal, i.e., the amplitude a' (a'>a). Then, a cell engraved in the first rotation of the gravure cylinder 14 and a cell engraved in the second rotation overlap and a channel appears between the cells adjacent in the main scanning direction.

Figure 25:
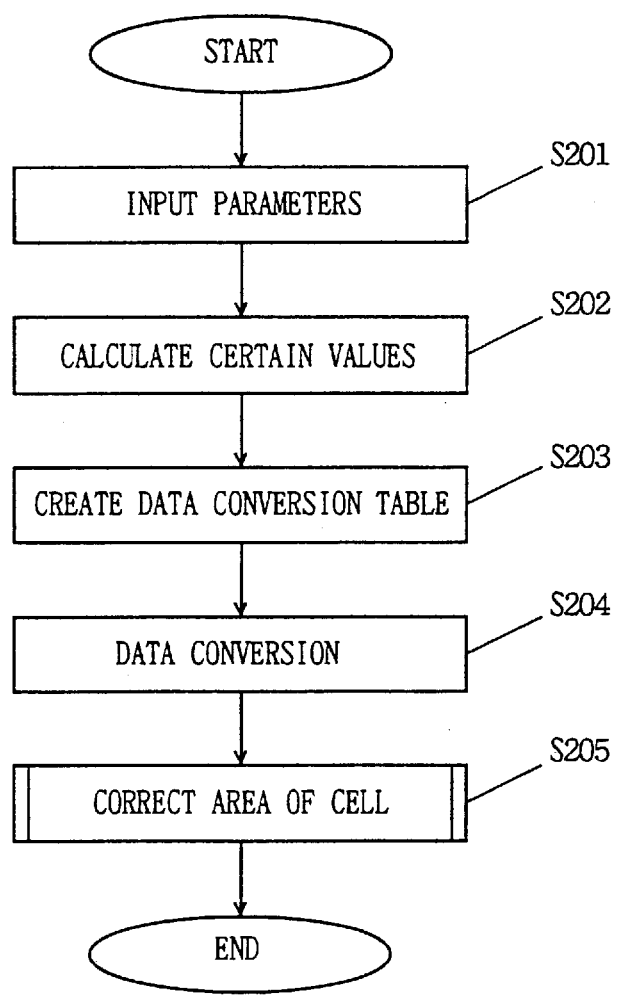
FIG. 25 is a flow chart showing operations of the gravure engraving system of third embodiment.

FIG. 25 is a flow chart showing operations of the gravure engraving system according to the third embodiment of the present invention. The operations of FIG. 25 are executed mainly by the data generator 201 of FIG. 9. Referring to FIG. 25, the operations in the third embodiment are described. Note that operations will be described in an example in which this embodiment is applied to the first embodiment.

First, the data generator 201 selects parameters required for correction from previously set parameters and inputs them (Step S201). The parameters inputted this time include a maximum cell width $W_{MAX}$, a minimum cell width $W_{MIN}$, a maximum channel width $C_{MAX}$, a cell pitch $P_3$ in the main scanning direction (refer to FIG. 11) and a cell pitch $P_1$ in the sub-scanning direction (refer to FIG. 11). The maximum cell width $W_{MAX}$ is a width in the sub-scanning direction of a cell corresponding to the maximum density tone 228, i.e., of the maximum density cell (refer to FIG. 22). The minimum cell width $W_{MIN}$ is a width in the sub-scanning direction of a cell corresponding to the minimum density tone 29, i.e., the minimum density cell (refer to FIG. 22). The maximum channel width $C_{MAX}$ indicates a width in the sub-scanning direction of the channel C formed when the maximum density cell is engraved (the maximum width of the channel C).

Next, the data generator 201 calculates certain values required in area correction described later on the basis of the parameters inputted in the Step S201 (Step S202). The certain values calculated are described in detail below.

1. Calculation of $\gamma_c$

Figure 27B:
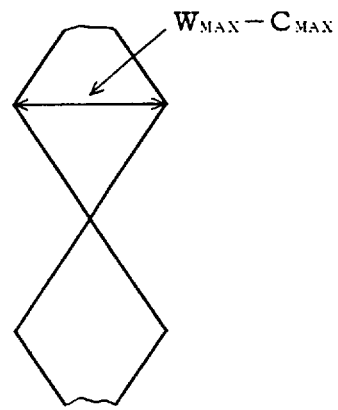

The $\gamma_c$ is a tone of a minimum cell with which a channel C appears. FIG. 27(*a*) shows a top form of a maximum density cell. In this case, the cell form has the maximum cell width $W_{MAX}$ and the maximum channel width $C_{MAX}$. FIG. 27(*b*) shows the top form of a minimum cell when the channel C appears. The cell width in this case is $W_{MAX}-C_{MAX}$. Since the cell width W ($W_{MAX} \geq W \geq W_{MIN}$) is generally in proportion to the tone $\gamma$ ($228 \geq V \geq 29$), the cell width W is obtained by the equation (1) shown below. In the equation (1), $W_{MAX}-W_{MIN}/199$ indicates an increment of the cell width per unit tone.

$$W = \frac{W_{MAX} - W_{MIN}}{199} (\gamma - 29) + W_{MIN} \qquad (1)$$

The width of the minimum cell $W_{MAX}-C_{MAX}$ with which the channel C appears is obtained by the equation (2) shown below by inserting $\gamma_c$ (the tone of the minimum cell when the channel C appears) into the equation (1) shown above.

$$W_{MAX} - C_{MAX} = \frac{W_{MAX} - W_{MIN}}{199} (\gamma c - 29) + W_{MIN} \qquad (2)$$

The equation (2) can be rearranged to obtain the tone $\gamma_c$ as shown in equation (3) which follows.

$$\gamma c = \frac{199}{W_{MAX} - W_{MIN}} (W_{MAX} - W_{MIN} - C_{MAX}) + 29 \qquad (3)$$

2. Calculation of f/e

This value f/e is frequently used in calculation of area correction performed later. Accordingly, the value f/e is obtained in advance to simplify the following correction operations. Now, f is ½ of a cell width W in the case where the channel C does not appear (in the case of $\gamma < \gamma_c$) which is obtained by the equation (4) which follows.

$$f = \frac{W}{2} \qquad (4)$$
$$= \frac{1}{2} \left\{ \frac{W_{MAX} - W_{MIN}}{199} (\gamma - 29) + W_{MIN} \right\}$$

The e is ½ of the full amplitude $\alpha$ of the carrier signal (refer to FIG. 23(*a*)), which is obtained by the equation (5) below.

$$e = \frac{\alpha}{2} \qquad (5)$$
$$= \frac{W_{MAX} - C_{MAX}}{4}$$

Accordingly, f/e is obtained by the equation (6), which follows, from the equations (4) and (5).

$$\frac{f}{e} = \frac{2(W_{MAX} - W_{MIN})}{199(W_{MAX} - C_{MAX})} (\gamma - 29) + \frac{2W_{MIN}}{W_{MAX} - C_{MAX}} \qquad (6)$$

3. Operation Equation of Cell Area A

Figure 28:
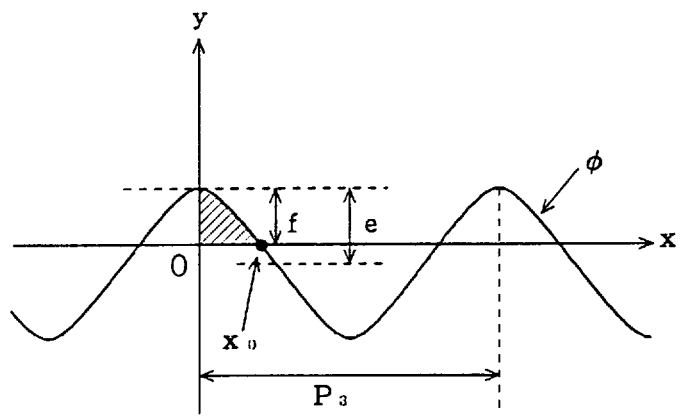
FIG. 28 is a diagram for illustrating how to obtain an area of a cell when the channel C is not formed.

First, description is made on an area of a cell when a channel C will not appear (in the case of $\gamma_c > \gamma \geq 29$). Now, considering an area of a cell having a cell width W (=2f), an area A of that cell is four times the hatched part in FIG. 28. In FIG. 28, an equation of the external form curve $\Phi$ is represented by the equation (7), which follows.

$$y = e * \cos \frac{2\pi x}{P_3} - (e - f) \qquad (7)$$

The coordinates of the point $x_0$ in FIG. 28 are obtained as a value of x when y=0 in the equation (7), which is represented by the following equation (8).

$$x_0 = \frac{P_3}{2\pi} \cos^{-1}\left( \frac{e - f}{e} \right) \qquad (8)$$

Accordingly, the cell area A is obtained by the equation (9), which follows.

$$A = 4 * \int_0^{X_0} \left\{ e * \cos \frac{2\pi x}{P_3} - (e - f) \right\} dx \qquad (9)$$
$$= \frac{2eP_3}{\pi} \left\{ \sqrt{\frac{2f}{e} - \left(\frac{f}{e}\right)^2} - \left(1 - \frac{f}{e}\right) \cos^{-1}\left(1 - \frac{f}{e}\right) \right\}$$

Figure 29:
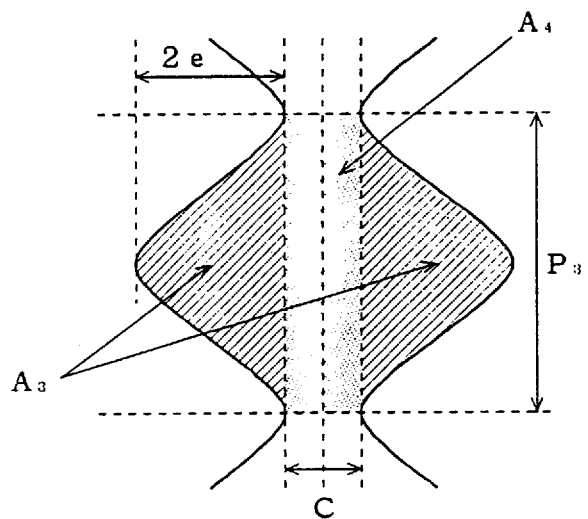
FIG. 29 is a diagram for illustrating how to obtain an area of a cell when the channel C is formed.

Next, an area of a cell when a channel C appears (when $228 \geq \gamma \geq \gamma_c$) will be described. As shown in FIG. 29, the area A of a cell is a sum total of an original area of the cell (the area of the hatched region) $A_3$ and the area of the channel portion (the area of the dotted rectangular region) $A_4$. The area $A_3$ is obtained by inserting f=2e into the equation (9), as $$A_3 = 2eP_3.$$

The channel portion has a rectangular form having its one side of length $P_3$ and the other side of length C, and then its area $A_4$ is $$A_4 = P_3 C.$$

Then, the entire cell area A is obtained by the equation (10), which follows.

$$A = A_3 + A_4 \qquad (10)$$
$$= 2eP_3 + P_3 C$$
$$= P_3 \left( W - \frac{W_{MAX}}{2} + \frac{C_{MAX}}{2} \right)$$

An area A of a cell with a certain cell width W (=2f) is obtained by the equations (9) and (10). As the cell width W is determined by the tone $\gamma$, the cell area A can be determined by the tone $\gamma$.

4. Calculation of Increment ΔA of Area per Unit Tone

If the maximum cell area is taken as $A_{MAX}$ and the minimum cell area as $A_{MIN}$, then an increment $\Delta A$ of area per unit tone is obtained by the equation (11), as follows.

$$\Delta A = \frac{A_{MAX} - A_{MIN}}{199} \tag{11}$$

In the equation (11), the maximum cell area $A_{MAX}$ is obtained by the following equation (12) by inserting $W=W_{MAX}$ into the equation (10).

$$A_{MAX} = \frac{1}{2} P_3(W_{MAX} + C_{MAX}) \tag{12}$$

The minimum cell area $A_{MIN}$ is obtained by the equation (13), which follows by inserting $f = f_{MIN}$ into the equation (9).

$$A_{MIN} = \frac{2eP_3}{\pi} \left\{ \sqrt{\frac{2f_{MIN}}{e} - \left(\frac{f_{MIN}}{e}\right)^2} - \left(1 - \frac{f_{MIN}}{e}\right) \cos^{-1}\left(1 - \frac{f_{MIN}}{e}\right) \right\} \tag{13}$$

In the equation (13), $f_{MIN}/e$ is obtained by the equation (14).

$$\frac{f_{MIN}}{e} = \frac{W_{MIN}}{2} \cdot \frac{4}{W_{MAX} - C_{MAX}} \tag{14}$$
$$= \frac{2W_{MIN}}{W_{MAX} - C_{MAX}}$$

5. Calculation of Threshold th

Figure 30:
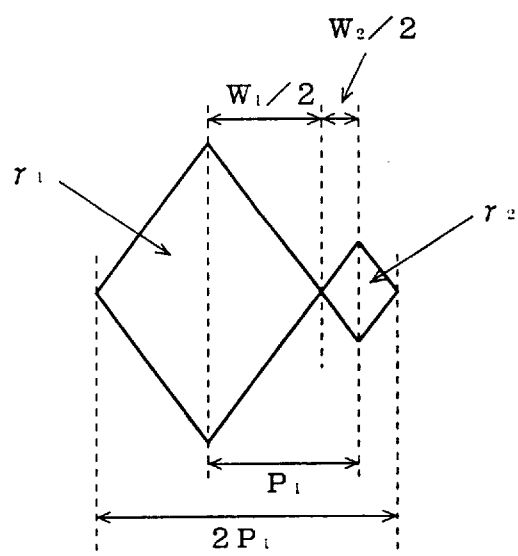
FIG. 30 is a diagram showing adjacent cells in contact in the sub-scanning direction.

Threshold th is a value used when it is determined whether two cells adjacent in the sub-scanning direction overlap each other. That is to say, if a sum total $\gamma_1 + \gamma_2$ of tones of the adjacent two cells $\gamma_1$ and $\gamma_2$ exceeds the threshold th, it is determined that the two cells overlap. Referring to FIG. 30, it is known that the condition under which adjacent two cells are in contact is $$(W_1/2) + (W_2/2) = P_1.$$

The width $W_1$ of one of the cells is obtained by the equation (15), as follows.

$$W_1 = \frac{W_{MAX} - W_{MIN}}{199} (\gamma_1 - 29) + W_{MIN} \tag{15}$$

The width $W_2$ of the other cell is obtained by the equation (16), as follows.

$$W_2 = \frac{W_{MAX} - W_{MIN}}{199} (\gamma_2 - 29) + W_{MIN} \tag{16}$$

Accordingly, the threshold th is obtained by inserting the equations (15) and (16) into the contact condition of adjacent cells and rearranging the equation, as shown in equation (17).

$$th = \gamma_1 + \gamma_2 \tag{17}$$
$$= \frac{398}{W_{MAX} - W_{MIN}} (P_1 - W_{MIN}) + 58$$

As described above, the Step S202, the tone $\gamma_c$ of the minimum cell with which the channel C appears, f/e, operation equation of the cell area A, the increment ΔA of area per unit tone and the threshold th are obtained.

Next, the data generator 201 creates a data conversion table for placing the tone of original data and the cell area in a linear relation (Step S203). The operation of creating the data conversion table will now be described with specific numerals. The numerals are shown only by way of example and the present invention is not restricted to these numerals.

Figure 31:
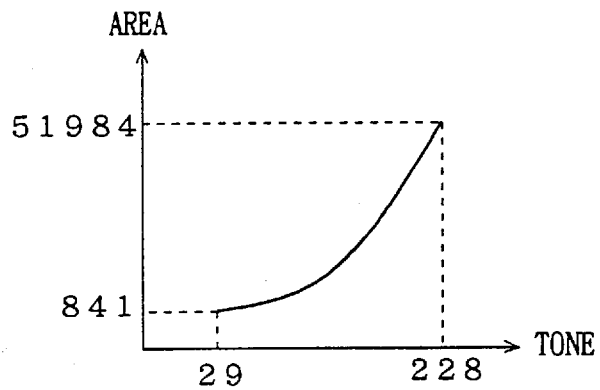
FIG. 31 is a diagram showing the cell area non-linearly changing in relation to the tone of image data before correction.
Figure 32:
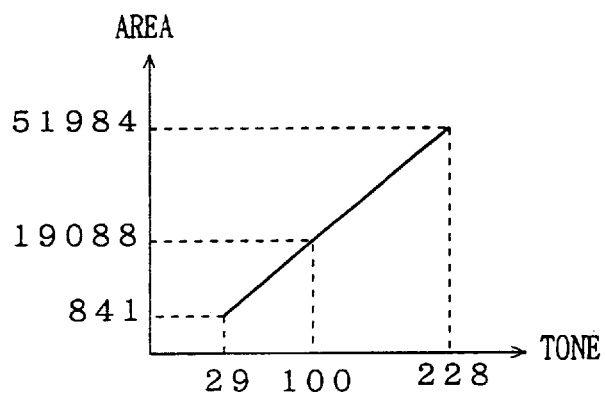
FIG. 32 is a diagram showing the cell area linearly changing in relation to the tone of image data after correction.

As shown in FIG. 31, the tone of the original data (data captured from the reader 202 or the other image system 203 (varies in 199 levels, i.e., 29–228. Accordingly, (if the cell area is in proportion to almost a square of the width of the cell), the cell area varies in the range from 841 ($=29_2$) to 51984 ($=228_2$). Hence, if the cell area increases/decreases per unit tone by $$(51984-841)/199=257,$$

then, as shown in FIG. 32, the cell area varies ideally, i.e., in linear proportion with respect to the tone of the original data. For example, if the tone of the original data is 100, then the ideal cell area is $$841+257 (100-29)=19088.$$

Figure 33:
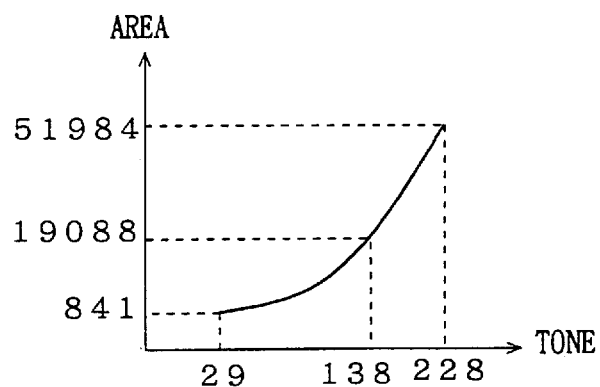
FIG. 33 is a diagram showing a method of obtaining a tone of image data after correction from the relation between the tone of image data before correction and the cell area.

The tone of the original data for this ideal area 19088 is 138, as shown in FIG. 33. A table for making such conversion is created in the Step S203.

In the Step S203, the data generator 201 first calculates the cell areas A (29) to A(228) for the tones of original data γ–29 to 228 using the equations (9) and (10), obtained in the above-described Step S202, to create a first list as shown in FIG. 34(a). Next, the data generator 201 calculates the ideal cell areas A' (29) to A' (228) for the tones of original data γ=29 to 228 using the following equation (18) to create a second list as shown in FIG. 34(b).

$$A' = \Delta A(\gamma-29) + A_{MIN} \tag{18}$$

Next, the data generator 201 retrieves tone values of original data corresponding to the ideal cell areas on the second list from the first list to create a conversion table of tone data as shown in FIG. 34(c).

Next, the data generator 201 converts the tone of the original data using the data conversion table (refer to FIG. 34(c)) created in the Step S203. Image data with corrected tone is thus provided from the data generator 201 to the density signal generating portion 101.

Figure 26:
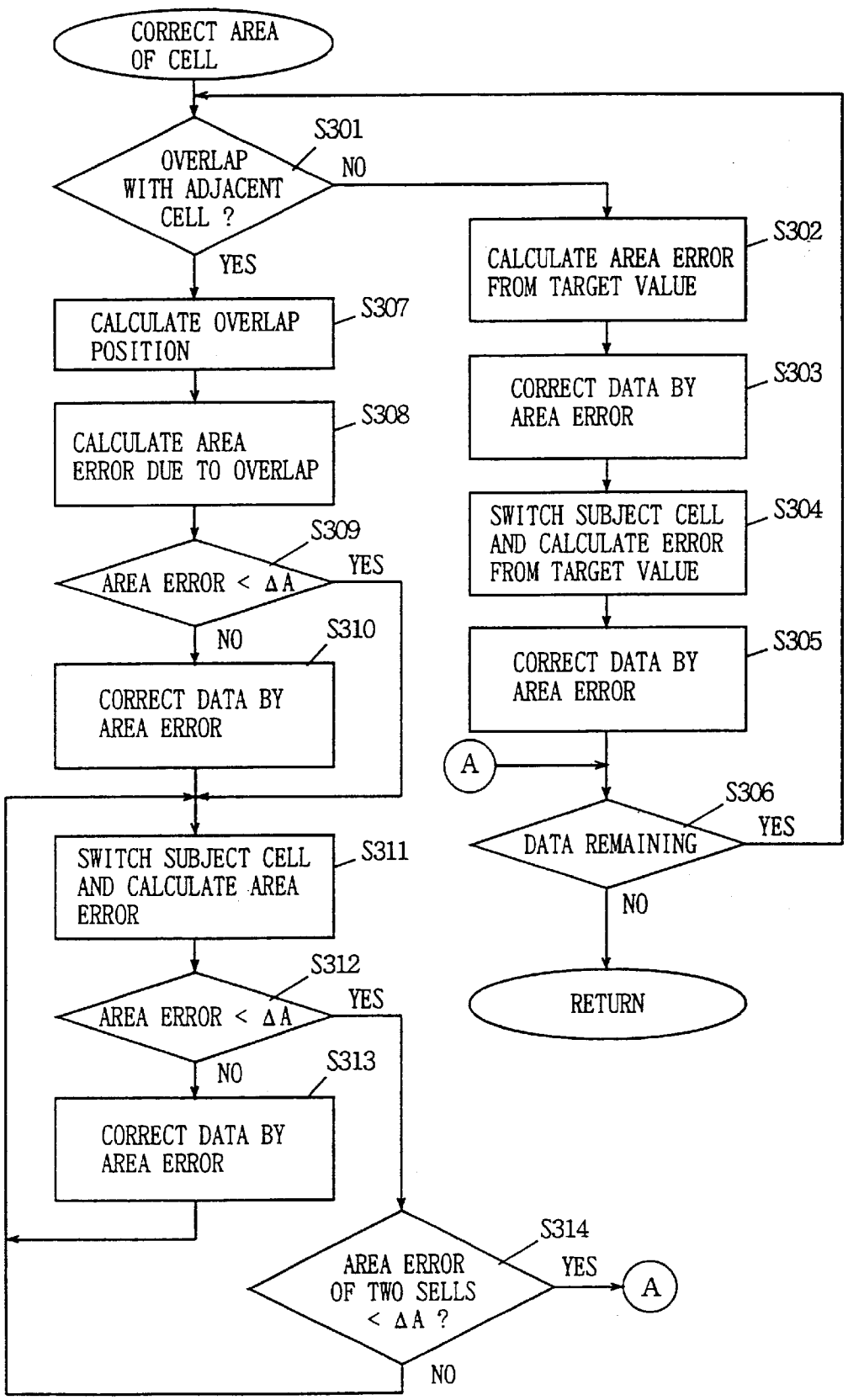
FIG. 26 is a flow chart showing details of the subroutine step S205 of FIG. 25.

Next, the data generator 201 corrects areas of cells which will now be engraved (Step S205). Details in the subroutine of this Step S205 are shown in FIG. 26. Referring to FIG. 26, the data generator 201 first selects one cell to be subject to correction (referred hereinafter to as a subject cell) from a plurality of cells included in one image and determines whether the subject cell overlaps with a cell adjacent in the sub-scanning direction (Step S301). At this time, if one of the subject cell and the cell adjacent thereto is not engraved, or if the sum total of widths of the two cells is smaller than the threshold th obtained by the above equation (17), it is determined that the two cells do not overlap with each other. That is to say, if the tone of the subject cell is taken as $\gamma_1$, and the tone of the adjacent cell as $\gamma_2$, when any of the conditions $$\gamma_1 < 29 \text{ or } \gamma_2 < 29 \text{ or}$$

$$\gamma_1 + \gamma_2 < th$$

is satisfied, then it is determined that the two cells adjacent in the sub-scanning direction do not overlap.

As a result of the determination made in the Step S301, if the two cells adjacent in the sub-scanning direction do not overlap, the data generator 201 calculates the area A of the subject cell using the equation (9) above and calculates an error Err between the cell area A obtained by the calculation and the target value q of the ideal area of the subject cell (Step S302).

$$Err = q - A$$

Referring to FIGS. 35(a) and 35(b) and FIG. 36, a method of obtaining the area target value q of a cell with a tone γ will be described. The maximum area of each cell is restricted under a certain value to secure the cell wall 300 of FIG. 11, i.e., to prevent coupling of different cell pairs. If this maximum area is set on the basis of the maximum area of a cell which does not overlap with an adjacent cell, a problem will arise, as discussed below. Referring to FIG. 35(a), the maximum area of a cell which can be engraved when it does not overlap with an adjacent cell is taken as $A_{MAX}$. Then, in the case where it overlaps with the adjacent cell, if a cell having the same size as that n FIG. 35(a) is engraved, its effective area (the dotted region) is decreased due to the overlap. Accordingly, a difference occurs in the effective area between the case where it overlaps with the adjacent cell and the case where it does not. Then, the effective tone differs in the case of overlap and in the case of non-overlap, resulting in the problem that the tone of the original image data is not faithfully reproduced. Accordingly, in this embodiment, the effective area $B_{MAX}$ of one of two cells with the area $A_{MAX}$ engraved being overlapped is taken as the maximum area of a cell which does not overlap with an adjacent cell (Refer to FIG. 36). Accordingly, the area target value q for a cell with the tone γ is obtained by the equation (19), as follows.

$$q = A_{MIN} \frac{B_{MAX} - A_{MIN}}{199} \times \gamma \qquad (19)$$

Next, the data generator 201 corrects the tone value of the subject cell by Err/ΔA (Step S303). The ΔA is the increment ΔA of the area per unit tone obtained in the Step S202 above, which is calculated by using the equation (11). Thus, the area of the subject cell becomes almost equal to the area target value q for the tone $\gamma_1$. The data generator 201 next switches the subject cell to a cell adjacent in the sub-scanning direction, and applies area correction to the switched subject cell (Steps S304 and S305) the same as in Steps S302 and S303 noted above.

Next, the data generator 201 determines whether there exist any uncorrected cells or not (Step S306), and if any, it returns to the operation of the above-described Step S301. If it is determined in the Step S301 that two cells adjacent in the sub-scanning direction overlap, the data generator 201 calculates an overlap position b of the subject cell with the adjacent cell (Step S307).

Figure 37:
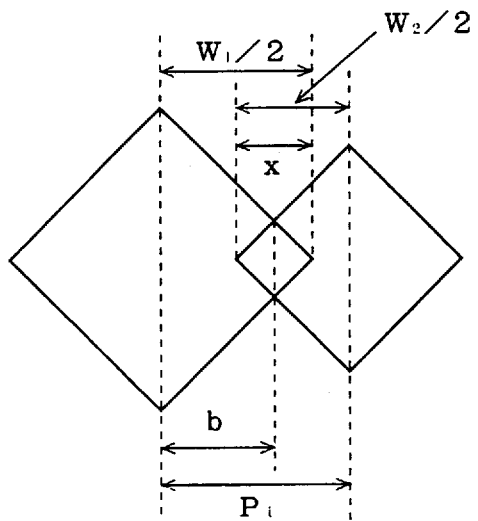
FIG. 37 is a diagram showing an overlap position b of a subject cell with an adjacent cell.

Referring to FIG. 37, the overlap position b is subsequently described. As shown in FIG. 37, the overlap position b is defined as a distance from the center of the subject cell to the center of the overlapping portion. If the width of the overlapping portion is taken as x, the following equations (20) and (21) result.

$$b + (x/2) = W_1/2 \qquad (20)$$
$$(W_1/2) - \{P_1 - (W_2/2)\} = x \qquad (21)$$

The x is eliminated from the equations (20) and (21) to obtain the overlap position b, as shown in the following (22).

$$b = \frac{W_1}{4} - \frac{W_2}{4} + \frac{P_1}{2} \qquad (22)$$

Figure 38:
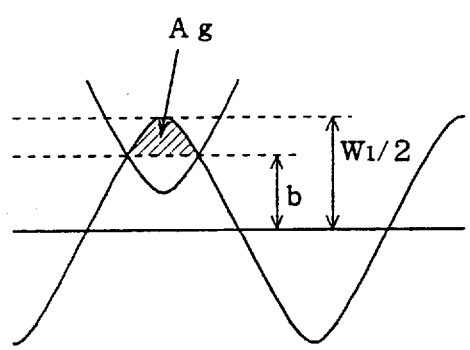
FIG. 38 is a diagram showing about the subject cell an area which is subtracted due to overlap with the adjacent cell.

Next, the data generator 201 calculates an area error caused by the overlap (Step S308). The data generator 201 first calculates a decrease area Ag which is caused by the overlap (refer to FIG. 38) to calculate this area error. This decrease area Ag is obtained by substituting g for f in equation (9) and multiplying it by ½, which results in equation (23) shown below. However, note that $$g = (W_1/2) - b \qquad (23)$$
$$= (W_1 + W_2 - 2P_1)/4$$

$$Ag = \frac{eP_3}{\pi} \left\{ \sqrt{\frac{2g}{e} - \left(\frac{g}{e}\right)^2} - \left(1 - \frac{g}{e}\right) \cos^{-1}\left(1 - \frac{g}{e}\right) \right\}$$

If an area of a cell before area correction is taken as A, then an actual area Az is obtained by the equation (24) as follows.

$$Az = A - Ag \qquad (24)$$

Figure 39:
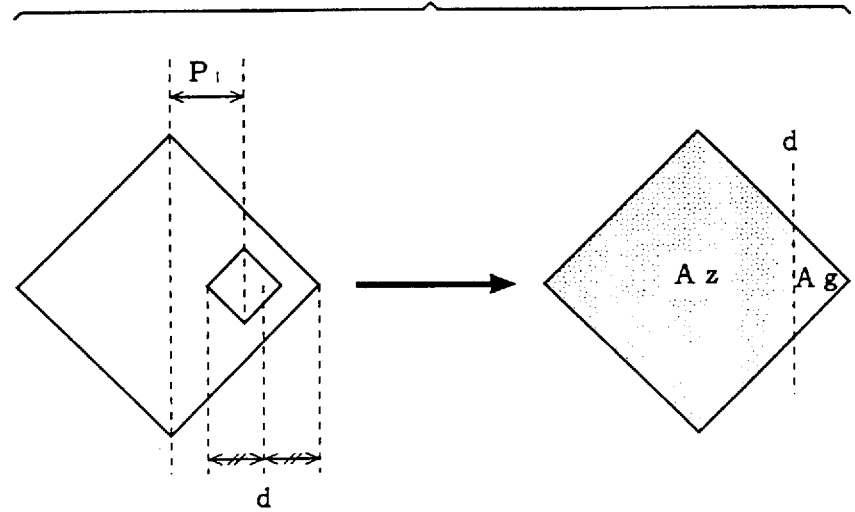
FIG. 39 is a diagram showing division in the case where one cell in a cell pair contains the other cell.

As shown in FIG. 39, it is also possible that one cell in a cell pair contains the other cell inside. In this case, the dividing line of the two cells is the dotted line d. If the larger cell is regarded as a subject cell, as the polarity of the overlap position b is positive (b≧0), its actual area is obtained by the equation (24) above. If the smaller cell is regarded as a subject cell, the polarity of the overlap position b is negative (b≧0), and then its actual area is the decrease area Ag seen from the larger cell side. That is to say, the larger cell is divided at the dotted line d and the area Az is allotted to the larger cell and the area Ag is allotted to the smaller cell.

Next, the data generator 201 calculates an error Err' of the subject cell between the ideal area target value q and the actual area Az when it overlaps, as obtained by the equation (24) above. The area target value q is calculated by using the above-described equation (19).

$$Err' = q - Az$$

The data generator 201 next determines whether the area error Err' obtained in the Step S308 is smaller than the ΔA (Step S309). The ΔA is the increment of area per unit tone obtained in the Step S202, which is calculated using the equation (11).

If the area error Err' is not less than the increment ΔA of area per unit tone (if Err'≧ΔA) as a result of the determination made in Step S309, the data generator 201 corrects the tone value of the subject cell by Err'/ΔA (Step S310). Thus, the area of the subject cell becomes almost equal to the area target value q for the tone $\gamma_1$. Subsequently, the data generator 201 performs the operation in Step S311. If it is determined in Step S309 that the area error Err' is smaller than the increment ΔA of area per unit tone (if Err'≦ΔA), then the data generator 201 goes directly to the operation in Step S311 without performing correction processing in the Step S310.

In Step S311, the data generator 201 switches the subject cell to a cell adjacent in the sub-scanning direction, and calculates for the switched subject cell an area error Err' caused by overlap in the same way as in Steps S307 and S308. Next, the data generator 201 determines whether the area error Err' obtained in Step S311 is smaller than ΔA (Step S312). As a result of the determination made in Step S312, if the area error Err' is not less than the increment ΔA of area per unit tone, the data generator 201 corrects the tone of the subject cell by Err'/ΔA (Step S313), and repeats the correcting operation in and after the Step S311. This is due to the fact that if an area of one cell comprising a cell pair is corrected, an area of the overlapping portion of the other cell changes to change the effective area of the other cell, then correction may be required again.

Figure 40:
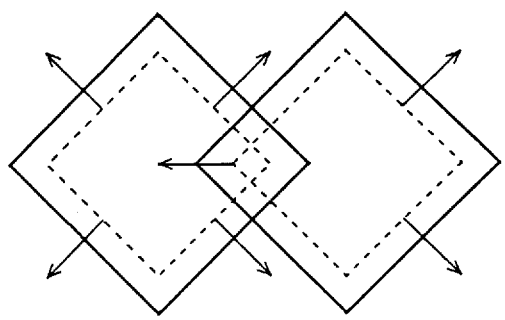
FIG. 40 is a diagram showing an example of correction of cell areas.

If a determination is made in the Step S312 that the area error Err' is smaller than the increment ΔA of area per unit tone (if Err'≦ΔA), then the data generator 201 determines whether the area error Err' of the other cell adjacent to the present subject cell is smaller than ΔA. (Step 314). If the area error Err' of the other cell is ΔA or more, the data generator 201 repeats the operations in and after the Step S311. Thus, the adjacent two cells are corrected as shown in FIG. 40, for example.

If it is determined in the Step S314 that the area error Err' of the other cell is smaller than ΔA, that is, if area errors Err' of both of the two cells comprising the cell pair are smaller than ΔA, the data generator 201 finishes correction of that cell pair and proceeds to the operation in the above-described Step S306. Then, if there remain any uncorrected cells, the data generator 201 repeats the operations in and after the Step S1. When the correction processing has finished for all the cells, then the data generator 201 ends its operation.

Although the tone of image data is corrected on the basis of the area so that a united area of cells resulting from overlap almost corresponds to the initially supposed cell area in the above-described third embodiment, the present invention is not restricted to the same, and the tone of image data may be corrected on the basis of the volume so that a united volume of cells resulting from overlap almost corresponds to the initially supposed cell volume.

(4) Fourth Embodiment

A fourth embodiment of the present invention is subsequently described. The basic structure of the gravure engraving system of the fourth embodiment is the same as that of the gravure engraving system of the first embodiment (refer to FIG. 4 to FIG. 9), and therefore the structure of the first embodiment is incorporated here, and its detailed description is not repeated.

Before describing detailed operations of the fourth embodiment, the principle of the fourth embodiment described.

Figure 41:
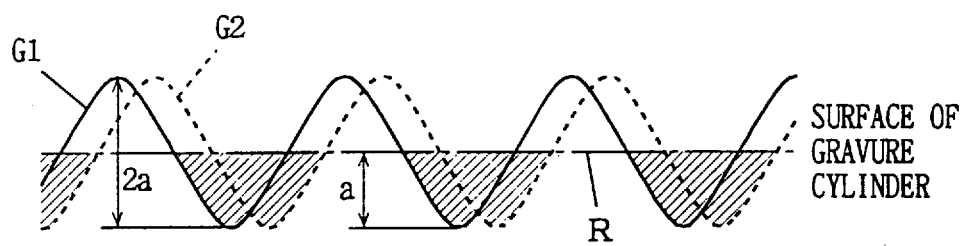
FIG. 41 is a diagram showing a waveform of an engraving signal when maximum density cells (cells for representing the maximum density) are engraved in a fourth embodiment.

FIG. 41 shows a waveform of an engraving signal for engraving a maximum density cell (a cell for representing the maximum density). Conventionally, as shown in FIG. 1(c), the full amplitude of the engraving signal was set to "a" and the maximum density cell was engraved using the full amplitude "a". On the other hand, in this fourth embodiment, as shown in FIG. 41, the full amplitude of the engraving signal is set to twice the conventional one, 2a, i.e., a portion corresponding to the amplitude "a". Furthermore, in the fourth embodiment, engraving in the main scanning direction of the gravure cylinder 14 is repeated twice. That is to say, first cells are first engraved in the main scanning direction of the gravure cylinder 14 with the engraving signal G1 of the solid line in FIG. 41. Next, the second engraving is applied to the gravure cylinder 14 with the engraving signal G2 shown by the dotted line which is shifted from the first engraving signal G1 by a certain angle. Accordingly, one cell is formed by double engraving, where the hatched parts in FIG. 41 correspond to respective cells.

Figure 42:
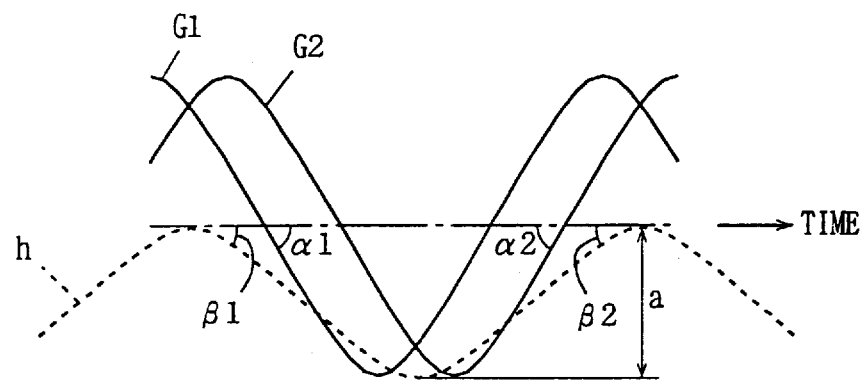
FIG. 42 is a diagram showing in comparison the engraving signal waveforms of the fourth embodiment and the conventional engraving signal waveform when a maximum density cell is engraved.

FIG. 42 is a diagram showing in comparison the engraving signal waveform of the fourth embodiment and the conventional engraving signal waveform for engraving a maximum density cell. In FIG. 42, the signal waveforms G1 and G2 shown by the solid lines indicate engraving signal waveforms of the fourth embodiment, and the signal waveform h defined by the dotted line shows a conventional engraving signal waveform. As is clear from FIG. 42, the depth of the deepest portions of the cells is "a" both in the fourth embodiment and the conventional one, but the angles of the walls of the cells differ between the fourth embodiment and the conventional engraving system. That is to say, the angle of the front wall of the cell is α1 in the fourth embodiment and is β1 in the conventional system. The angle of the rear wall of the cell is α2 in the fourth embodiment and is β2 in the conventional system. Also, α1>β1, and α2>β2 thus the cell engraved by the engraving machine of the fourth embodiment has stepper walls than those of the cell engraved by the conventional engraving machine. Therefore, the cell of the fourth embodiment has a volume larger than that of the conventional cell.

Figure 43:
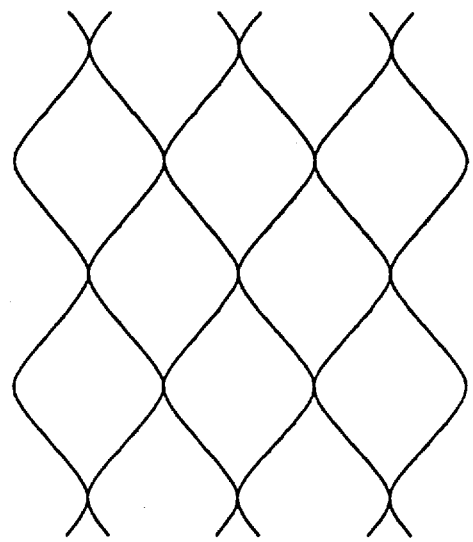
FIG. 43 is a diagram showing top configuration and arrangement of cells engraved by the conventional gravure engraving machine.
Figure 44:
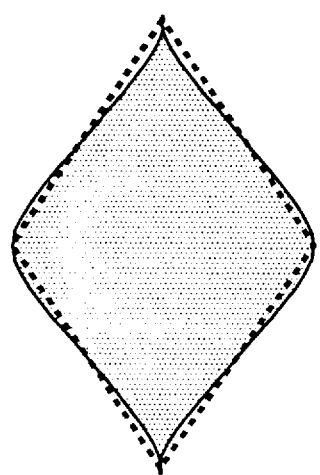
FIG. 44 is a diagram showing a pseudo equivalent to the top configuration of a cell engraved by the conventional gravure engraving machine with another geometrical figure.

FIG. 43 is a diagram showing top configuration and arrangement of cells engraved by the conventional gravure engraving machine (in the came of the elongated). A form of each of the conventional cells arranged in FIG. 43 is approximate to an elongated rhombus, as shown in FIG. 44.

Figure 45:
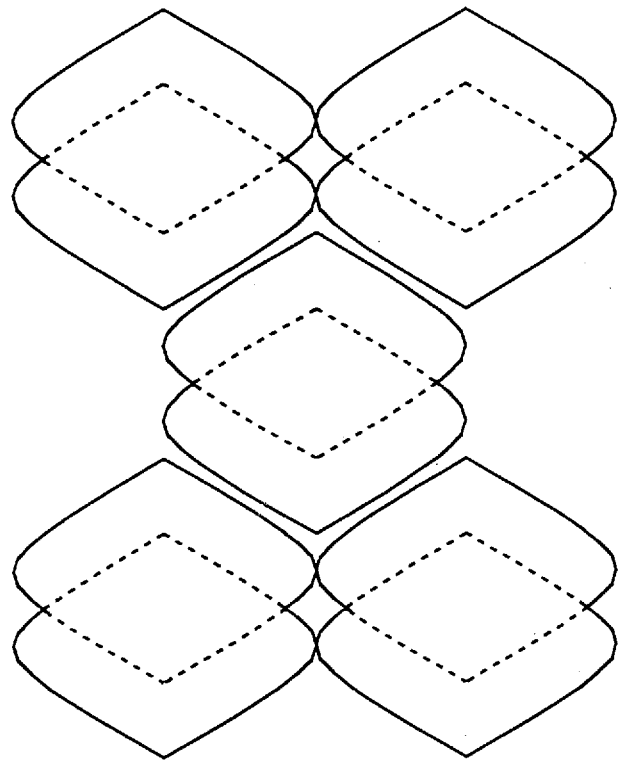
FIG. 45 is a diagram showing top configuration and arrangement of cells engraved by the gravure engraving machine of the fourth embodiment.
Figure 46:
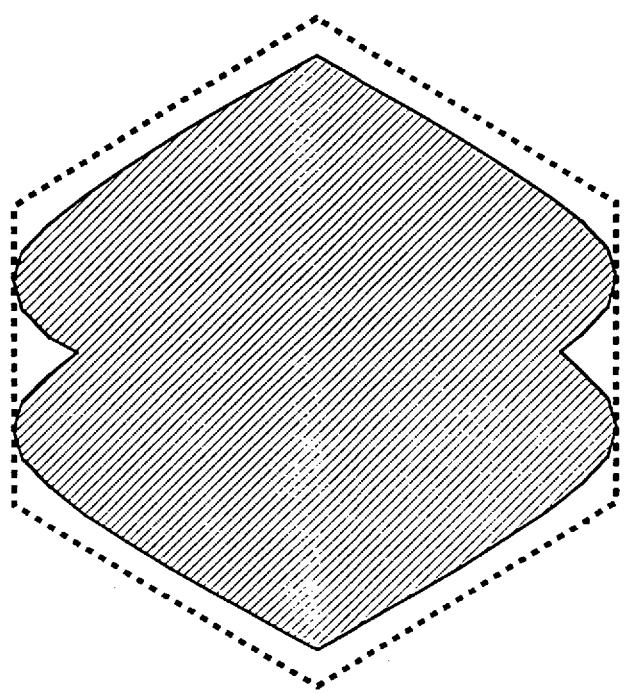
FIG. 46 is a diagram showing a pseudo equivalent of the top configuration of a cell engraved by the gravure engraving machine of the fourth embodiment with another geometrical figure.

FIG. 45 is a diagram showing top configuration and arrangement of cells engraved by the gravure engraving machine of the fourth embodiment. The cell of the fourth embodiment arranged in FIG. 45 each has its form approximate to a hexagon as shown in FIG. 46.

Figure 47:
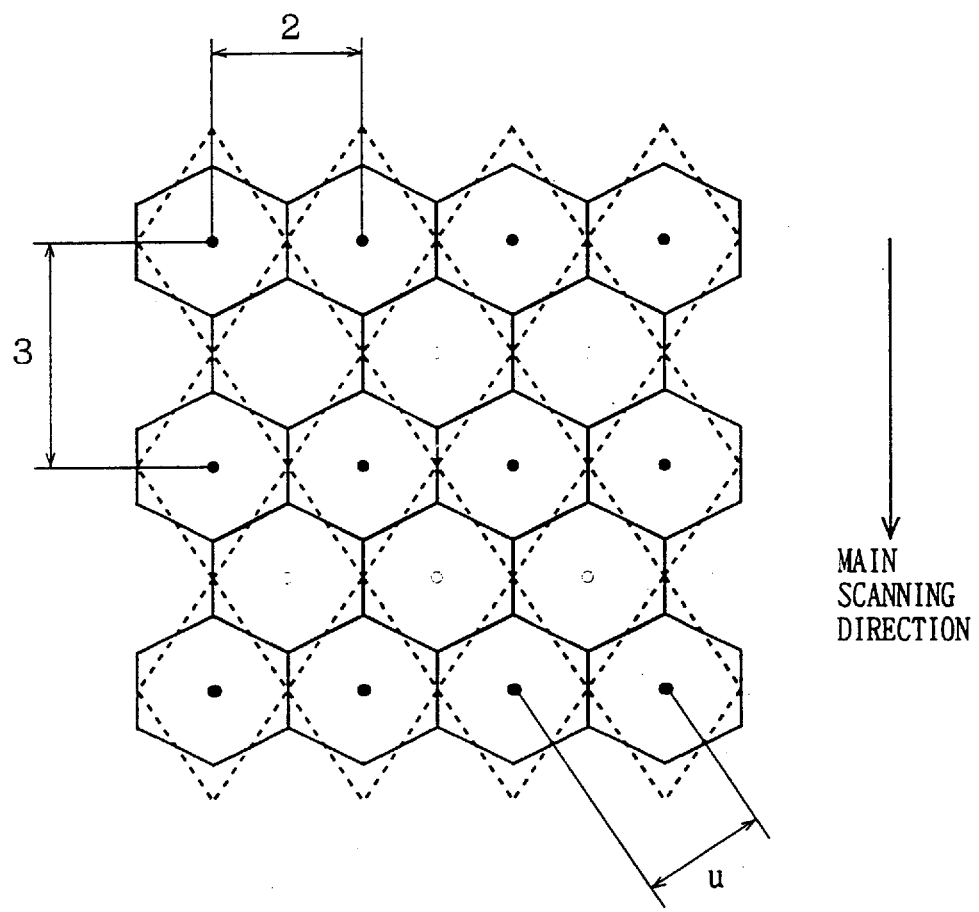
FIG. 47 is a diagram comparing the arrangement of cells engraved by the gravure engraving machine of the fourth embodiment and the arrangement of cells engraved by the conventional gravure engraving machine.

FIG. 47 is a diagram comparing the arrangement of cells engraved by the gravure engraving machine of the fourth embodiment and the arrangement of cells engraved by the conventional gravure engraving machine. In FIG. 47, the solid line shows the pseudo hexagonal cells by the fourth embodiment and the dotted line shows conventional pseudo rhombic cells. The pseudo hexagonal cells of the fourth embodiment can be arranged regularly according to a predetermined vertical to horizontal cell pitch ratio (which is 3 to 2 in the case of the elongated, and 2 to 3 in the case of the compressed, and FIG. 47 shows the case of the elongated), in the same way as the conventional pseudo rhombic cells.

A cell engraved by the gravure engraving machine of the fourth embodiment has steeper walls as compared with a conventional cell. Accordingly, a cell of the fourth embodiment has a larger volume than the conventional cell, which will be proved below using numerical expressions.

Figure 48:
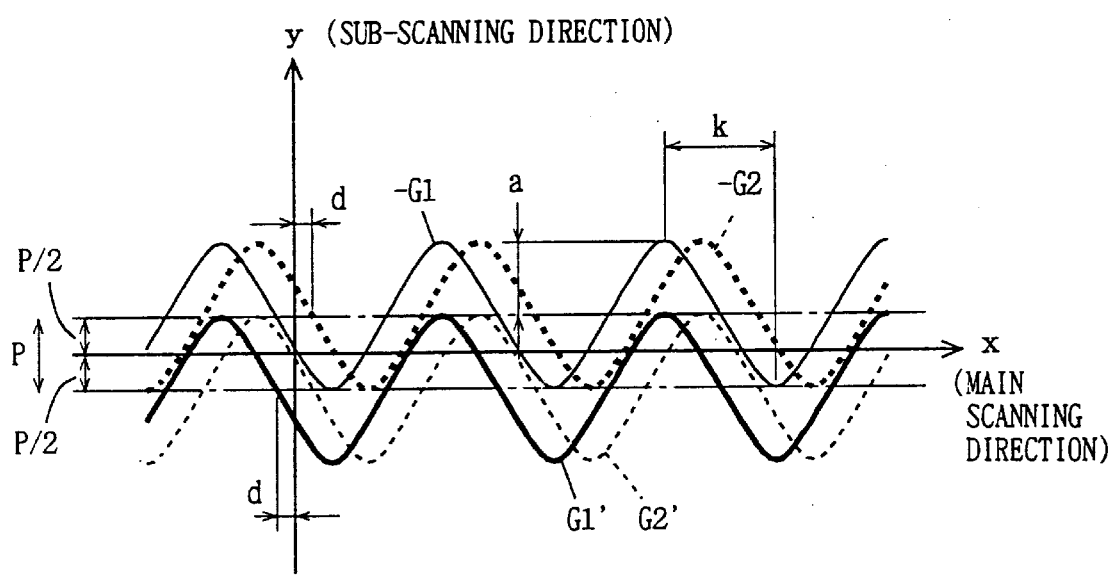
FIG. 48 is a diagram showing displacement of the outline of the opening of each cell line in a portion between adjacent cell lines formed by the gravure engraving machine of the fourth embodiment with the same sine waves as the engraving signal.

FIG. 48 is a diagram showing displacement of an outline of openings of each cell line in a portion between adjacent cell lines formed by the gravure engraving machine of the fourth embodiment with sine waves as the engraving signal. In FIG. 48, the first cell line is formed first by using a half stroke of the stylus driven in a sine wave form, and then the position of cell is shifted by the distance 2d in the main scanning direction, and the second cell line is formed in a position where it partially overlaps with the first cell line. That it is moved in the sub-scanning direction, and the same double engraving is performed with the phase of the sine wave shifted by 180°.

First, a value of an appropriate shift amount 2d for engraving as described above is obtained.

The equation (25), which follows, shows the outline (−G2) in the plus direction of y of the second cell line with y=p/2 in FIG. 48.

$$y = -a \cdot \sin\{\pi (x-d)/k\} + (p/2) \tag{25}$$

The equation (26) below shows the outline (G1') in the minus direction of y of the first cell line with y=p/2.

$$y = -a \cdot \sin\{\pi (x+d)/k\} - (p/2) \tag{26}$$

Next, y is eliminated from the equations (25) and (26) are in contact, the following equation (28) holds from the equation (27) above.

$$\cos(\pi x/k) = p/\{2a \cdot \sin(\pi d/k)\} \quad (27)$$

If the two curves of the equations (25) and (26) are in contact, the following equation (28) holds from the equation (27) above.

$$ABS\,[-p/\{2a \cdot \sin(\pi d/k)\}] = 1 \quad (28)$$

With a, p, k, d>0, and the following equation (29) is obtained from the equation (28) above.

$$a = p/\{2 \sin(\pi d/k)\} \quad (29)$$

If a=p to have the cell width as large as possible, then the equation (30) is obtained from the equation (29) above.

$$2 \sin(\pi d/k) = 1 \quad (30)$$

The equation (30) is changed as follows.

$$\sin(\pi d/k) = \tfrac{1}{2}$$

$$\pi d/k = \pi/6$$

$$d = k/6$$

Hence, the shift amount 2d in position between the first cell line and the second cell line is obtained as:

$$2d = 2 \times k/6 = k/3$$

Now, k is 180° by means of a phase angle, then the shift amount 2d is obtained as $$2d = 180°/3 = 60°$$

That is to say, when the full amplitude is set to twice the conventional amplitude 2a, and a cell with a maximum printing density is engraved with half, i.e., the amplitude a, the gap between the two cell lines adjacent in the sub-scanning direction is minimized if the second cell line is formed by being shifted by 60° in the main scanning direction from the first cell line. Accordingly, the cell volume is maximized.

Next, a volume V of a cell engraved in the fourth embodiment is calculated. In the calculation shown below, a cell volume is obtained about the elongated as an example. If the ratio between depth and width of a cell is taken as c and 2k=k', then the cell volume V of the fourth embodiment is given by the equation (31), which follows.

$$V = 2c \int_0^{K'/3} \left( \sin^2 \frac{2\pi x}{k'} \right) dx \quad (31)$$

$$= \frac{ck'(3\sqrt{3} + 8\pi)}{24\pi}$$

$$= 0.402 \times ck'$$

Next, a volume $V_s$ is calculated for a conventional cell engraved under the conditions of the same ruling. The volume $V_s$ of the conventional cell is given by the following equation (32).

$$V_S = c \int_0^{K'} \left( \frac{1}{2} \cos\left(\frac{2\pi x}{k'}\right) - \frac{1}{2} \right) dx \quad (32)$$

$$= \frac{3ck'}{8}$$

$$= 0.375 \times ck'$$

An increase ratio Z of the cell volume V of the fourth embodiment with respect to the conventional cell volume $V_s$ is calculated from equations (31) and (32) as follows.

$$Z = \{(V - V_S)/V_S\} \times 100$$

$$= \{(0.402 - 0.375)/0.375\} \times 100$$

$$= 7.2\,(\%)$$

This shows that the cell volume V of the fourth embodiment increases by 7.2% as compared with the conventional cell volume $V_s$.

The inventor of the present invention made an experiment to actually compare the printing density of cells engraved by the gravure engraving machine of the fourth embodiment and the printing density of cells engraved by the conventional gravure engraving machine. This experiment was carried out on elongated cells and under conditions of a phase difference of 60° between cells in the double engraving in the fourth embodiment, an apex angle of 130° of the diamond bite, and a ruling of 175 lines/inch. The ruling is determined on the basis of the width $\mu$ of FIG. 47.

The above experiment resulted in a printing density of 2.87 in the case of cells engraved by the gravure engraving machine of the fourth embodiment and a printing density of 2.40 in the case of cells engraved by the conventional gravure engraving machine. Accordingly, the density increase ratio of the fourth embodiment to the conventional one is $$\{(2.87-2.4)/2.4\} \times 100 = 19.6(\%).$$

That is to say, an increase in density of almost 20% is achieved in the fourth embodiment.

It is considered that the increase of the measured density value is much larger than the calculated increase of the cell volume because its shape also affects the density value as well as the volume. The pseudo hexagonal cell of the fourth embodiment has its wall steeper than that of the conventional cell. Therefore, the area of the wall in the cell is smaller in the pseudo hexagonal cell of the fourth embodiment than the conventional cell even with the same volume. Considering that the amount of ink which is not transferred to remain in the cell in printing depends on the wall area, this result is understood.

Figure 49:
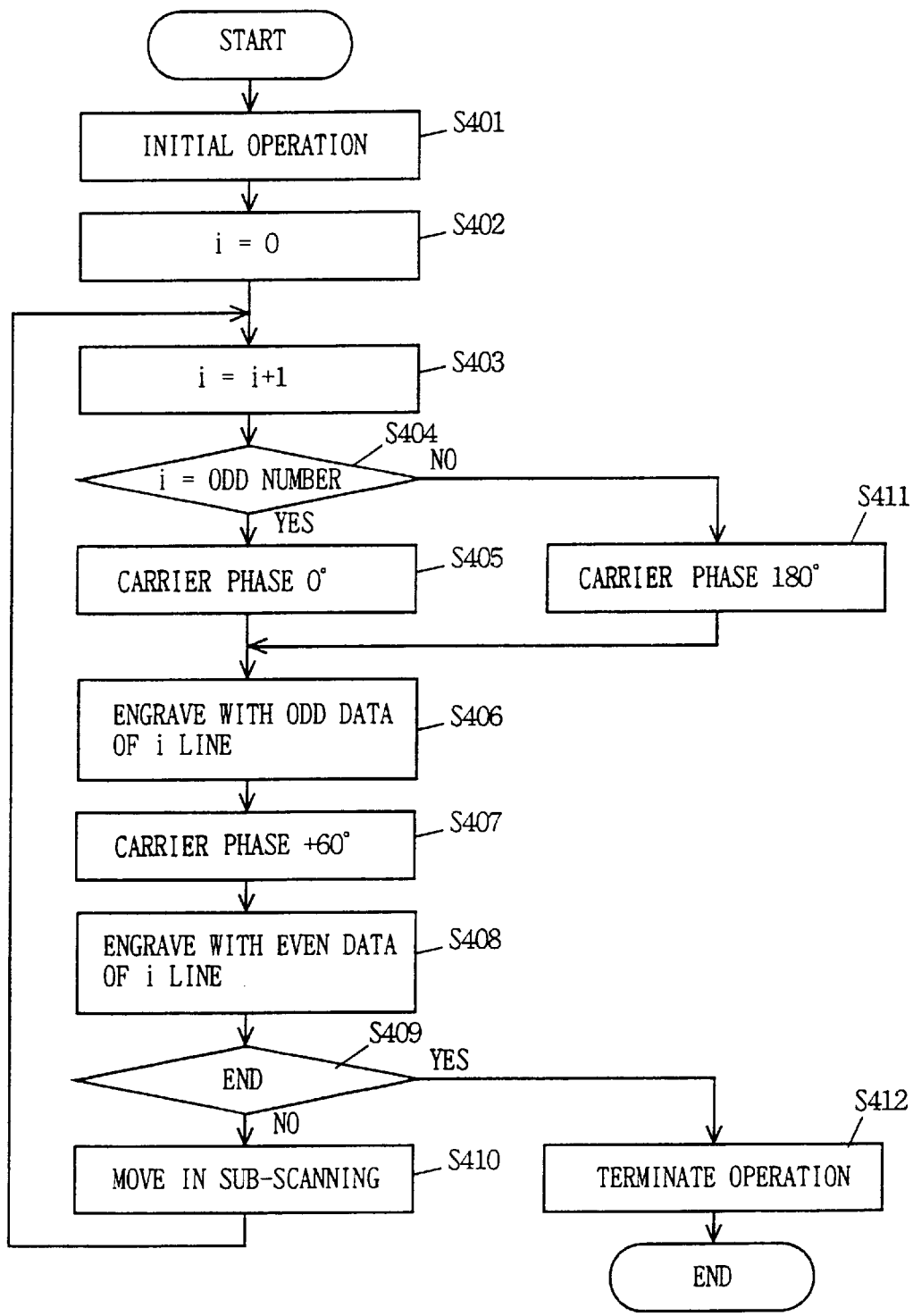
FIG. 49 is a flow chart showing operations of the fourth embodiment.
Figure 50:
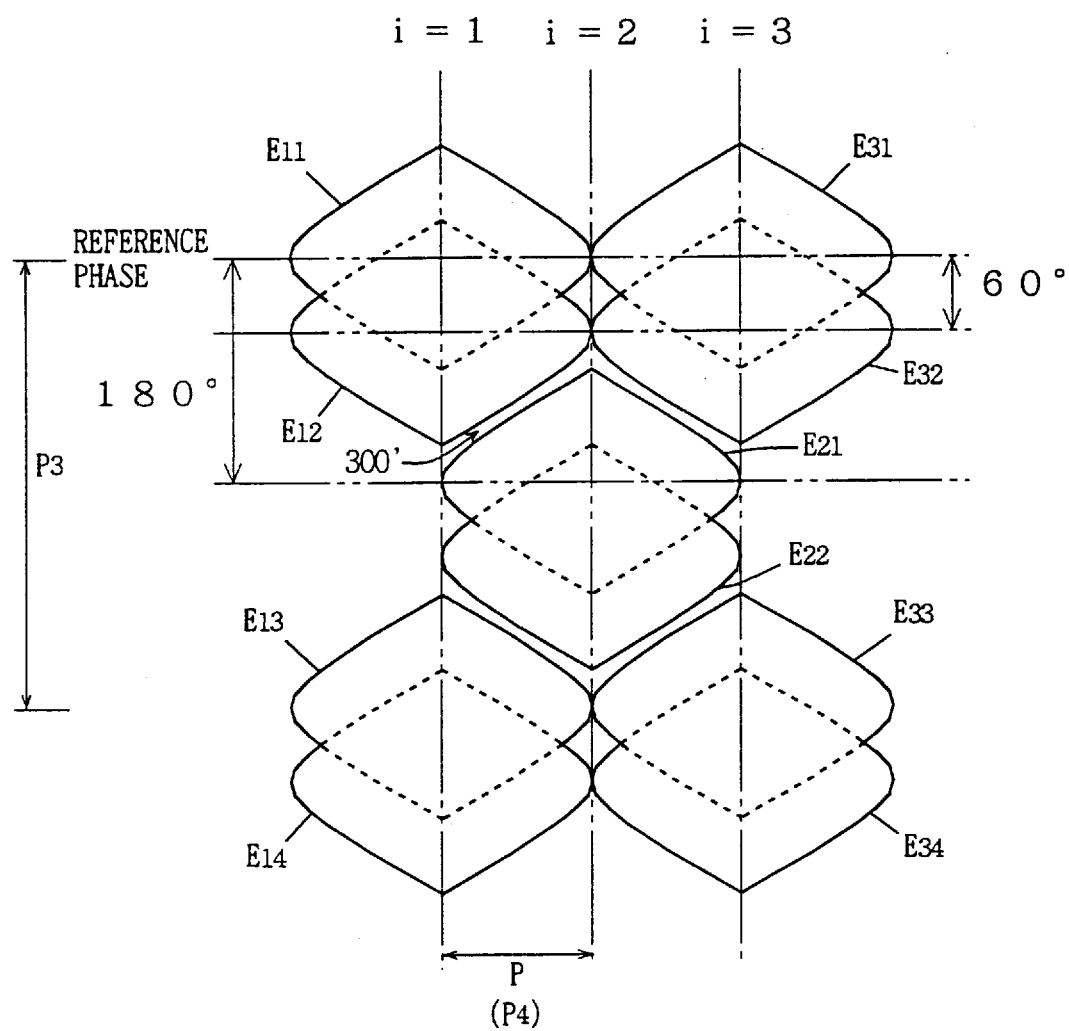
FIG. 50 is a diagram showing the arrangement and a phrase relation of cells engraved by the gravure engraving machine of the fourth embodiment.

FIG. 49 is a flow chart showing operations of the fourth embodiment. FIG. 50 is a diagram showing the arrangement and phase relation of cells engraved by the gravure engraving machine of the fourth embodiment. Referring to FIG. 49 and FIG. 50, operations of the fourth embodiment will now be described in more detail.

First, an initial operation is carried out (Step S401). In this initial operation, the data generator 201 generates carrier instruction data, a sub-scanning instruction signal and a main scanning instruction signal on the basis of instructions inputted from the operation portion 205. In response, the carrier signal generating portion 102 generates a carrier signal with predetermined frequency and amplitude. This carry signal is provided to the engraving head 21 through the adding portion 105. In response, the stylus 30 of the engraving head 21 rotatably reciprocates in the direction of the arrow B in FIG. 6. At this time no image data is outputted form the data programmer 201, and the diamond bit 32 provided at the end of the stylus 30 is not abutting on the gravure cylinder 14. Accordingly, engraving is not performed. The main scanning motor control portion 104 rotates the main scanning motor 108 on the basis of the main scanning instruction signal from the data generator 201. In response, the gravure cylinder 14 is rotated at a speed corresponding to the cell pattern and ruling set in the operation portion 205. The sub-scanning motor control portion 103 drives the sub-scanning motor 107 on the basis of the sub-scanning instruction signal from the data generator 201. In response, the engraving head 21 is moved to a start position (a position where the first cell is engraved) in the sub-scanning direction.

Next, the data generator 201 clears an internal counter i, not shown, (Step S402) and then increments the counter i by 1 (Step S403). Next, the data generator 201 determines whether a count value of the counter i is odd (Step S404). If the count value of the counter i is odd, the data generator 201 outputs to the carry signal generating portion 102 carrier instruction data for setting the phase of a carrier signal to the reference phase. In response, the carry signal generating portion 102 generates a carry signal set to the reference phase 0° (Step S405). Next, the data generator 201 outputs image data for odd cells in a cell line with a line number specified by the count value of the counter i (the i-th cell line). This image data is converted into a density signal in the density signal generating portion 101 and added to the carry signal in the adding portion 105. Thus, an engraving signal is outputted from the adding portion 105 and provided to the engraving head 21. In response, the engraving head 21 engraves odd cells in the i-th cell line (E11 and E13 in FIG. 50; Step S406).

The data generator 201 next outputs carrier instruction data for advancing the phase of the carrier signal by a certain angle (60° in this example) to the carrier signal generating portion 102. In response, the carry signal generating portion 102 generates a carrier signal having its phase advanced ahead of the reference phase by 60° (Step S407). Next, the data generator 201 outputs image data for even cells in the i-th cell line. This image data is converted into a density signal in the density signal generating portion 101 and is then added to the carrier signal in the adding portion 105 so as to become the engraving signal. The engraving head 21 engraves even cells in the i-th cell line (E12, E14 in FIG. 50) according to the engraving signal. (Step S408).

The data generator 201 next determines whether all cell lines have been engraved (Step S409). If there are any unengraved cell lines, the data generator 201 outputs a sub-scanning instruction signal for moving the engraving head 21 by 1 pitch and provides it to the sub-scanning motor control portion 103. The sub-scanning motor control portion 103 drives the sub-scanning motor 107 in response to the provided sub-scanning instruction signal. Thus, the engraving head 103 is moved in the sub-scanning direction by 1 pitch P, 795 shown in FIG. 50 (Step S410). Subsequently, it returns to the operation of the above-described Step S403 and the next cell line is engraved.

If the cell line to be engraved next is an even cell line, the data generator 201 detects that the count value of the counter i is an even number in the above-described Step S404 and proceeds to the Step S411. In the step S411, the data generator 201 outputs carrier instruction data for advancing the phase of the carrier signal by 180° ahead of the reference phase to the carry signal generating portion 102. In response, the carrier signal generating portion 102 generates a carrier signal with its phase advanced from the reference phase by 180°. Thus, an even cell line (E21 and E22 in FIG. 50) is engraved at a position shifted by 180° in phase from the odd cell line on the gravure cylinder 14 (Steps S406–S408).

The operations described above are repeated, and when all cell lines have been engraved, then the data generator 201 executes a predetermined termination operation in the Step S412. In this termination operation, the rotation of the gravure cylinder 14 is stopped and the engraving head 21 is returned to the home position, for example.

Although the maximum density cells are engraved with the portion corresponding to a half of the full amplitude of the engraving signal, i.e., with a portion corresponding to the amplitude in the fourth embodiment, the present invention is not restricted to the same, and the maximum density cells may be engraved with a part of the full amplitude of the engraving signal.

Furthermore, although cells arranged by the elongated arrangement are shown in the fourth embodiment, it is a matter of course that the present invention is applicable to cells arranged according to other pitch ratios (compressed, normal, etc.)

In the fourth embodiment described above, two cells overlapping in the main scanning direction are engraved using different image data (tone data). In this case, these two cells represent different tone values, and the resolution in the main scanning direction is doubled as compared with the conventional cells. Furthermore, concerning the cell volume, the two cells overlapping in the main scanning direction can be regarded as one cell because they communicate with each other. Accordingly, the printing density does not decrease as-compared with conventional cells.

The two cells may be engraved using the same image data. In this case, engraving is carried out repeatedly with the same image data regardless of odd and even numbers in the Steps S406 and S407 in FIG. 49, and then the overlapping cells will substantially constitute one cell which represents one tone value.

When two cells overlapping in the main scanning direction are engraved using different image data as in the fourth embodiment, the problem of cell area arises, as has been described in FIGS. 20(a) through 20(c). That is to say, although the primary objectives aforementioned are satisfactorily met according to the preceding embodiments described above, cases may occur in which the following question is likewise recognized as technological deficiency of insufficiency in the printing density and the resolution of the image depending upon the level or degree required in the industry.

Figure 51C:
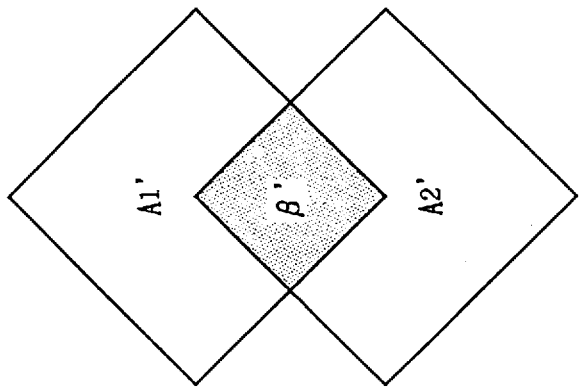
FIGS. 51(a) through 51(c) are diagrams describing a problem occurring when cells overlap.
Figure 51B:
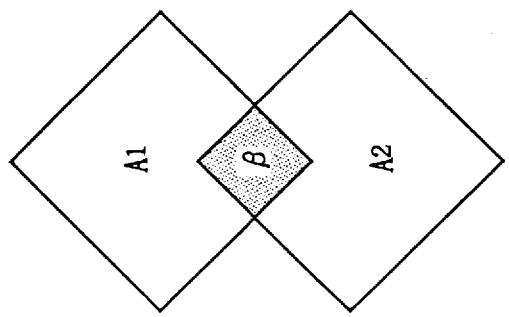
Figure 51A:
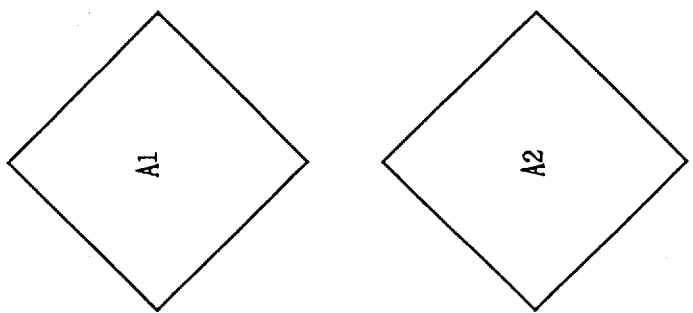

More specifically, as shown in FIG. 51(a), when a cell with an area $A_1$ and a cell with an area $A_2$ are engraved, $A_1+A_2$ is required as a united area of the two cells to faithfully reproduce a tone or a printing density represented by image data. As shown in FIG. 51(b), however, if the two cells partially overlap, the united are of the two cells is decreased by the area $\beta$, representing the overlapping portions of $A_1+A_2$, and thus the united area is $A_1+A_2-\beta$. This cannot correctly represent the tone represented by image data.

Accordingly, in the fifth embodiment described later, when two cells overlap, the tone of image data is corrected to enlarge areas of the cells as shown in FIG. 51(c) so that the united area of the cells after engraving will almost correspond to the initially supposed cell area. That is to say, if areas of the respective cells after corrected are taken as $A_1'$ and $A_2'$, and an area of their overlapping portion as $\beta'$, correction is applied to image data so that $A_1'+A_2'-\beta'=A_1+A_2$ in the fifth embodiment. If one or both of two cells adjacent in the main scanning direction is small, such correction is not made because they do not overlap.

In the above fourth embodiment, a tone is shown by image data, i.e., a printing density appears as a width of a cell (a width in the sub-scanning direction). Here, a change in tone on the image data corresponds to a width of a cell. Also, a cell area is in proportion to almost a square of the cell width, so that the relation between the tone change on the image data and the cell area is non-linear as shown by the solid line g1 in FIG. 21, and more specifically, it is a relation like a quadratic function. In this way, the fourth embodiment described above in which the tone change on the image data is not in linear proportion to the cell area has the problem that the density of printed matters cannot correctly be controlled. Hence, in the fifth embodiment described below, tone representation of image data is corrected so that the relation between the tone change on the image data and the cell area will become linear as shown by the dotted line g2 in FIG. 21.

(5) Fifth Embodiment

A gravure engraving system according to the fifth embodiment of the present invention is configured to solve the above-described two problems, but its basic structure is the same as that of the gravure engraving system of the first embodiment (refer to FIG. 4 to FIG. 9), so that the structure of the first embodiment is incorporated here and its detailed description is not repeated.

In the fifth embodiment, the data generator 201 of FIG. 9 applies certain corrections to the tone of image data provided to the density signal generating portion 101. This allows the tone represented by the original image data captured from the reader 202 or the other image system 203 to be faithfully reproduced. Operation of the gravure engraving machine 100 based on the corrected image data can be the same as those in the above-described fourth embodiment. That is to say, cells in one line arrange along the main scanning direction are formed by double interleaved scans. Note that two cells adjacent in the main scanning direction (one cell is formed by the first interleaved scan) are formed with different image data. This doubles the resolution in the main scanning direction as compared with the conventional engraving system.

Referring to FIG. 22 with respect to the fifth embodiment, values 29–228, within the values 0–256 representable with 8 bits, are used to represent the tone. The value 29 corresponds to a minimum density tone, and the value 228 corresponds to a maximum density tone. Accordingly, the minimum density tone, the maximum density tone and intermediate density tones are represented with tone values at 199 levels.

Figure 52:
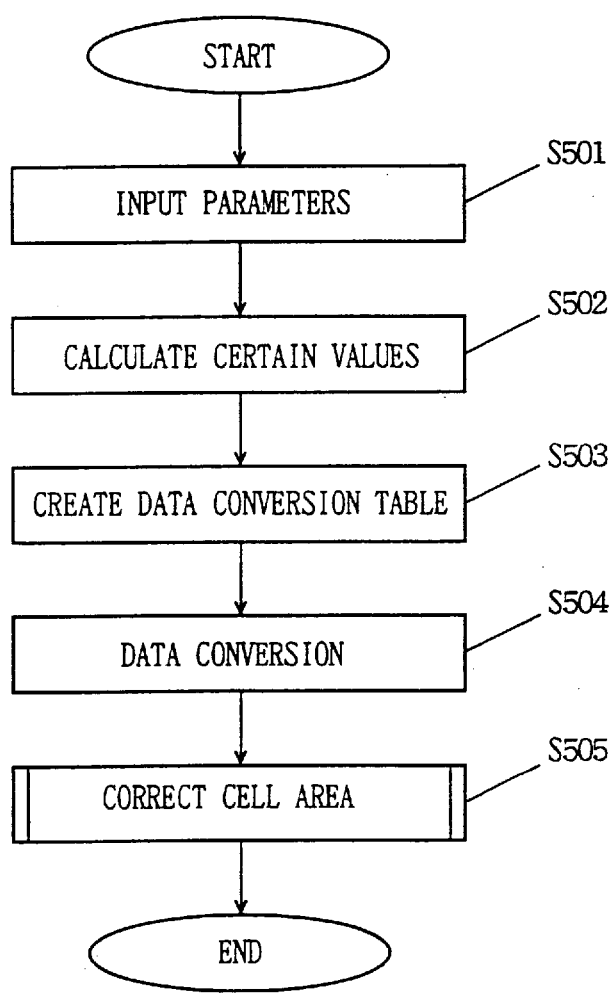
FIG. 52 is a flow chart showing operations of a gravure engraving system of a fifth embodiment.

FIG. 52 is a flow chart showing operations of the gravure engraving system according to the fifth embodiment of the present invention. The operations of FIG. 52 are executed mainly by the data generator 201 of FIG. 9. Referring to FIG. 52, operations in the fifth embodiment are subsequently described.

First, the data generator 201 selects parameters required in correction from among previously set parameters and inputs them (Step S501). The parameters inputted this time include a maximum cell width $W_{MAX}$, a minimum cell width $W_{Min}$, a cell pitch $P_3$ in the main scanning direction (refer to FIG. 50), and a cell pitch $P_4$ in the sub-scanning direction (refer to FIG. 50). The maximum cell width $W_{MAX}$ is a width in the sub-scanning direction of a cell corresponding to the maximum density tone 228, or of a maximum density cell (refer to FIG. 22). The minimum cell width $W_{MIN}$ is a width in the sub-scanning direction of a cell corresponding to the lowest density tone 29, i.e., of a minimum density cell (refer to FIG. 22).

The data generator 201 calculates certain values required in area correction described later on the basis of the parameters inputted in the Step S501 (Step S502). The certain values are described in detail below.

1. Calculation of Sine Wave Amplitude "a" of the Carrier Signal

The maximum cell width $W_{MAX}$ is equal to the full amplitude 2a of the carrier signal (refer to FIG. 41). Accordingly, the sine wave amplitude "a" of the carrier signal is obtained by multiplying the maximum cell width $W_{MAX}$ by ½. That is to say, the sine wave amplitude "a" is obtained by the equation (33), which follows:

$$a = 0.5 \times W_{MAX} \tag{33}$$

2. Calculation of Certain Value ω

The value ω is frequently used in calculation of area correction made later. Accordingly, the value ω is previously obtained to simplify the following correcting calculation. The value ω is obtained by the equation (34) below.

$$\omega = 2 \times P_3 \times a / \pi \tag{34}$$

3. Calculation Equation of Cell Area A

Figure 54:
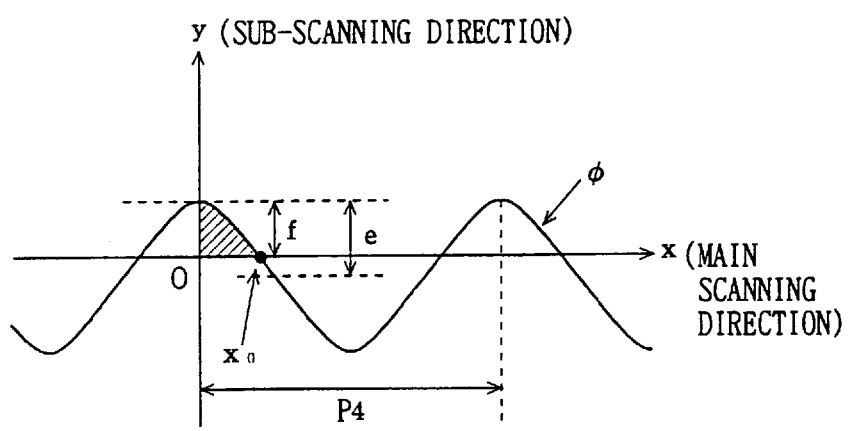
FIG. 54 is a diagram for describing a method of obtaining an area of a cell.

With respect to the area A of such a cell having a cell width W (=2f), an area A of cell is four times the hatched portion in FIG. 54. In FIG. 54, an equation of the external form curve Φ is represented by the following equation (35).

$$y = a * \cos \frac{2\pi x}{P_3} - (a - f) \tag{35}$$

The coordinates of the point $x_0$ in FIG. 54 are obtained as a value of x when y=0 in equation (35), with is represented by equation (36) shown below.

$$x_0 = \frac{P_3}{2\pi} \cos^{-1}\left(\frac{a-f}{a}\right) \tag{36}$$

Accordingly, the cell area A is obtained by the equation (37), as follows.

$$
\begin{aligned}
A &= 4 * \int_0^{x_0} \left\{ a * \cos \frac{2\pi x}{P_3} - (a-f) \right\} dx \\
&= \frac{2aP_3}{\pi} \left\{ \sqrt{\frac{2f}{a} - \left(\frac{f}{a}\right)^2} - \left(1 - \frac{f}{a}\right) \cos^{-1}\left(1 - \frac{f}{a}\right) \right\}
\end{aligned}
\tag{37}
$$

The area A of a cell with a certain cell width W (=2f) is obtained by equation (37). Since the cell width W is determined by the tone γ, the cell area A can be determined by the tone γ.

4. Calculation of Increment ΔA of area per unit tone

If the maximum cell area is taken as $A_{MAX}$ and the minimum cell area as $A_{MIN}$, then an increment Δ of area per unit tone is obtained by equation (38), which follows.

$$\Delta A = \frac{A_{MAX} - A_{MIN}}{199} \tag{38}$$

In equation (38), the maximum cell area $A_{MAX}$ is obtained by equation (39) shown below by substituting $f = f_{MAX} = 2A$, for f in equation (37).

$$A_{MAX} = 2 \times P_3 \times a/\pi = \omega \quad (39)$$

The minimum cell area $A_{MIN}$ is obtained by the equation (40) below by substituting $f = f_{MIN}$ for f in the equation (37).

$$A_{MIN} = \frac{2aP_3}{\pi} \left\{ \sqrt{\frac{2f_{MIN}}{a} - \left(\frac{f_{MIN}}{a}\right)^2} - \left(1 - \frac{f_{MIN}}{a}\right)\cos^{-1}\left(1 - \frac{f_{MIN}}{a}\right) \right\} \quad (40)$$

In equation (40), $f_{MIN}/a$ is obtained by the equation (41).

$$f_{MIN}/a = W_{MIN}/W_{MAX} \quad (41)$$

As mentioned above, in the Step S502, the sine wave amplitude "a" of the carrier signal, the certain value ω, the calculation equation of the cell area A, and the increment ΔA of area per unit tone are obtained.

Next, the data generator 201 produces a data conversion table for placing the tone of original data and the cell area in a linear relation (Step S503). The operation of producing the data conversion table will now be described with specific numerals shown below are shown only by way of example, and the present invention is not restricted to these numerals.

As shown in FIG. 31, the tone of the original data (data captured from the reader 202 or the other image system 203) varies in 199 levels, i.e., 29–228. Accordingly, (if the cell area is in proportion to almost a square of the width of the cell), the cell area varies in the range of 841 (=$29^2$) to 51984 (=$229^2$). Hence, if the cell area increases/decreases per unit tone by (51984−841)/199=257, then, as shown in FIG. 32, the cell area ideally varies, i.e., in linear proportion, with respect to the tone of the original data. For example, if the tone of the original data is 100, then the ideal cell area is

841+257 (100−29)=19088.

A tone of the original data for this ideal area 19088 is 138, as shown in the above-described FIG. 33. A table for making such conversion is created in Step S503.

In Step S503, the data generator 201 first calculates cell areas A (29) to A(228) with respect to the tones of original data γ=29 to 228 by using equation (37), obtained in the above-described Step S502 to create a first list as shown in FIG. 34(a). Next, the data generator 201 calculates ideal cell areas A' (29) to A' (228) with respect to the tones of original data γ−29 to 228 using equation (42), which follows, to create a second list as shown in FIG. 34(b).

$$A' = \Delta A(\gamma - 29) + A_{MIN} \quad (42)$$

The data generator 201 then retrieves the first list, tone values of original data corresponding to respective ideal cell areas on the second list to create a conversion table of tone data, as shown in FIG. 34(c).

Next, the data generator 201 converts tones of original data using the data conversion table (refer to FIG. 34(c)) created in Step S503 (Step S504). The converted tone data is temporarily stored in the internal memory of the data generator 201.

Figure 53:
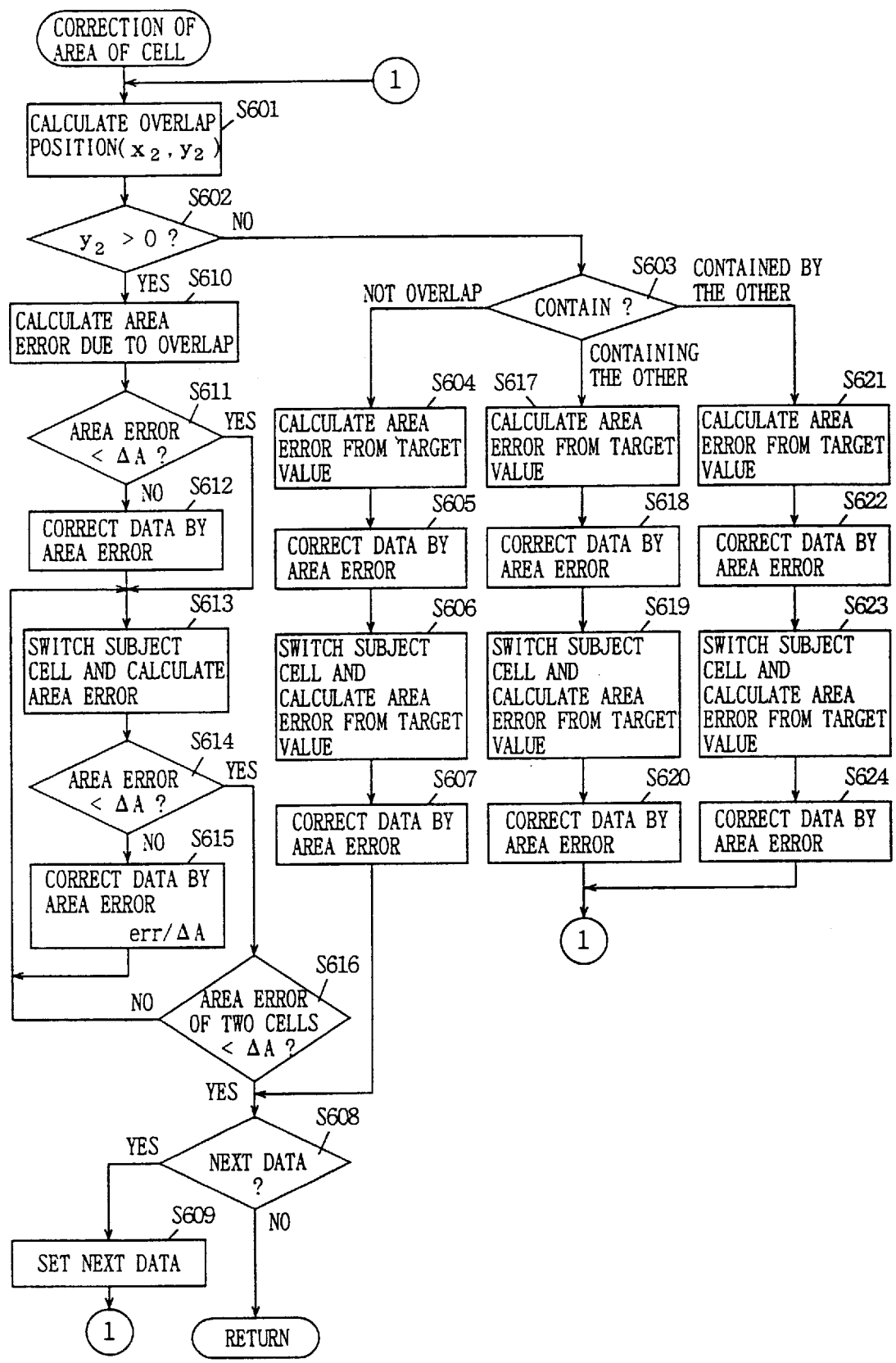
FIG. 53 is a flow chart showing details of the subroutine step S505 of FIG. 52.

The data generator 201 next corrects an area of each cell which will be engraved (Step S505). Details in the subroutine of Step S505 are shown in FIG. 53. In FIG. 53, the data generator 201 first selects one cell to be subject to correction (hereinafter referred to as a subject cell) from among a plurality of cells arranged in the main scanning direction and calculates an overlap position ($x_2$, $y_2$) of the subject cell and a cell adjacent to the subject cell in the main scanning direction (hereinafter referred to as an adjacent cell; Step S601). A figure model as shown in FIG. 62 is supposed to calculate the overlap position ($x_2$, $y_2$).

Figure 62:
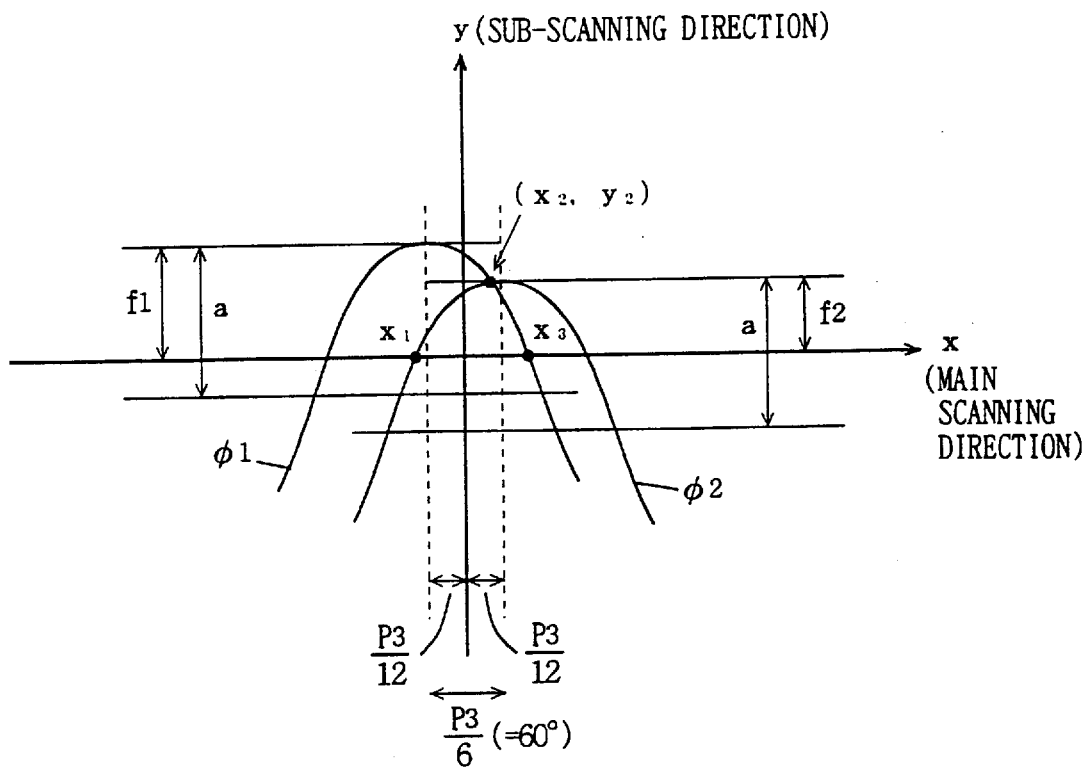
FIG. 62 is a diagram showing a model for calculating an overlapping position ($x_2$, $y_2$) of cells adjacent in the main scanning direction.

In FIG. 62, it is suppose that an equation of the external form curve $\Phi_1$ of the subject cell is represented by equation (43), shown below, and an equation of the external form curve $\Phi_2$ of the adjacent cell is represented by the equation (44), also shown below. It is also supposed that the two external form curves $\Phi_1$ and $\Phi_2$ have a preferred phase difference of 60° as obtained using FIG. 48 in the fourth embodiment.

$$y = a * \cos\left\{\frac{2\pi}{P_3}\left(x + \frac{P_3}{12}\right)\right\} - (a - f_1) \quad (43)$$

$$y = a * \cos\left\{\frac{2\pi}{P_3}\left(x - \frac{P_3}{12}\right)\right\} - (a - f_2) \quad (44)$$

If the equations (43) and (44) above are regarded as simultaneous equations, a solution thereof ($x_2$, $y_x$) can be obtained as the equations (45) and (46) shown below.

$$x_2 = \frac{P_3}{2\pi} \sin^{-1} \frac{f_1 - f_2}{2} \quad (45)$$

$$y_2 = \frac{\sqrt{3}}{2} a \sqrt{1 - \left(\frac{f_1 - f_2}{2}\right)^2} - \frac{f_1 - f_2}{2} - a + f_1 \quad (46)$$

Note that $f_1$ is ½ of the cell width of the subject cell, which is obtained by the equation (47), which follows.

$$f_1 = \{\Delta W (\gamma_1 - 29) + W_{MIN}\}/2 \quad (47)$$

Also, $f_2$ is ½ of the cell width of the adjacent cell, which is obtained by the equation (48), as follows.

$$f_2 = \{\Delta W (\gamma_2 - 29) + W_{MIN}\}/2 \quad (48)$$

Further, ΔW is obtained by the equation (49), as follows.

$$\Delta W = (W_{MAX} - W_{MIN})/199 \quad (49)$$

Next, the data generator 201 determines if the y-coordinate $y_2$ of the overlap position obtained in the Step S601 is positive (Step S602), and if $y_2$ is not positive, it further makes a determination on the basis of the value of the x-coordinate $x_2$ (Step S603). The determinations made in these Steps S602 and S603 classifies the relation between the subject cell and the adjacent cell as follows.

Figure 55:
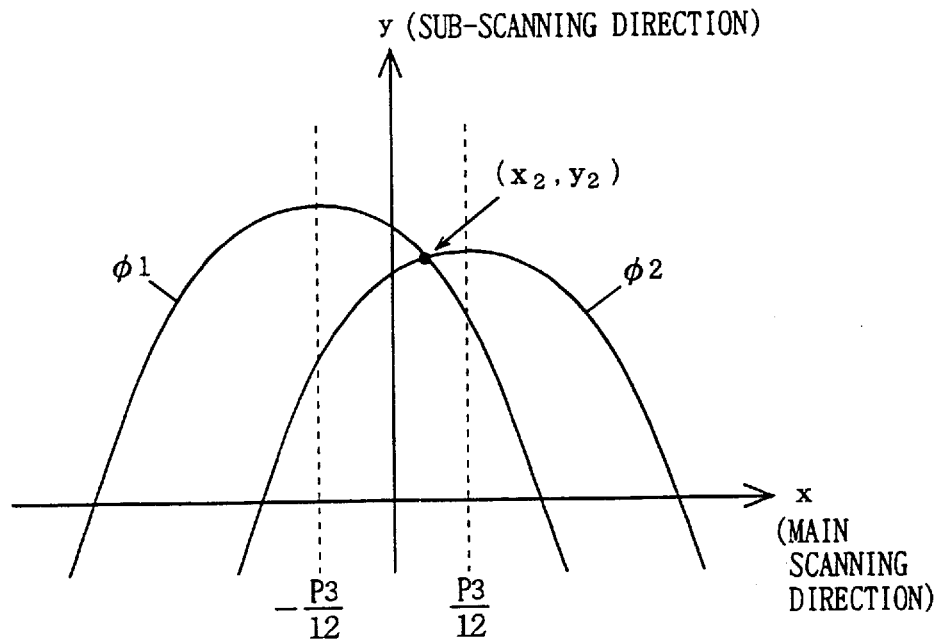
FIG. 55 is a waveform diagram of the engraving signal in the case where cells adjacent in the main scanning direction overlap.
Figure 59A:
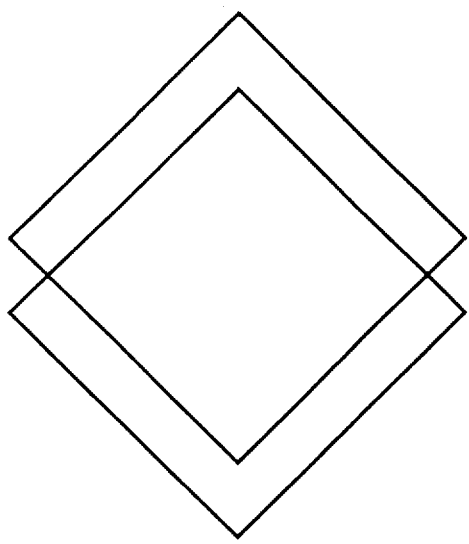
FIGS. 59(a) through 59(d) are diagrams showing various relations of a cell pair arranged in the main scanning direction.

(Case 1) As shown in FIG. 55, in the case of $y_2 > 0$, the subject cell and the adjacent cell overlap with each other (refer to FIG. 59(a)).

Figure 56:
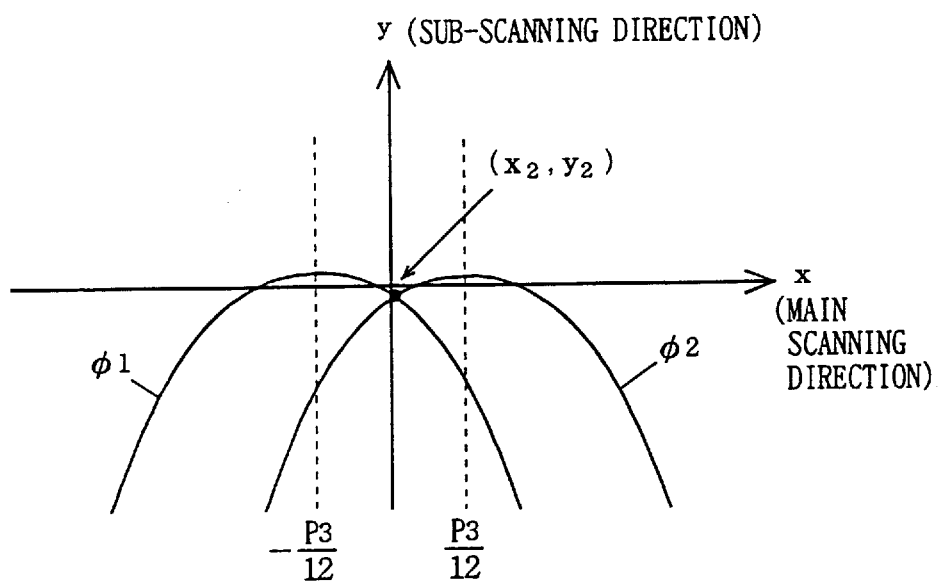
FIG. 56 is a waveform diagram of the engraving signal in the case where cells adjacent in the main scanning direction do not overlap.
Figure 59B:
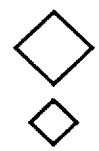

(Case 2) As shown in FIG. 56, when $y_2 \leq 0$ and $-P_3/12 < x_2 < P_3/12$, then the subject cell and the adjacent cell do not overlap (refer to FIG. 59(b)).

Figure 57:
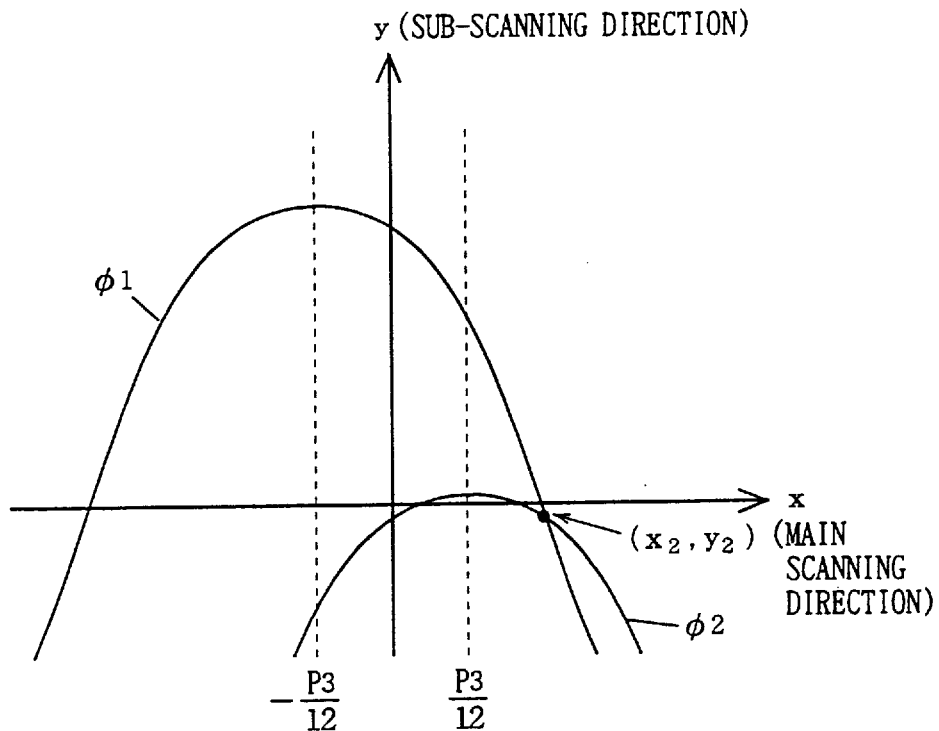
FIG. 57 is a waveform diagram of the engraving signal in the case where one cell in a cell pair, arranged in the main scanning direction, contains the other cell.
Figure 58:
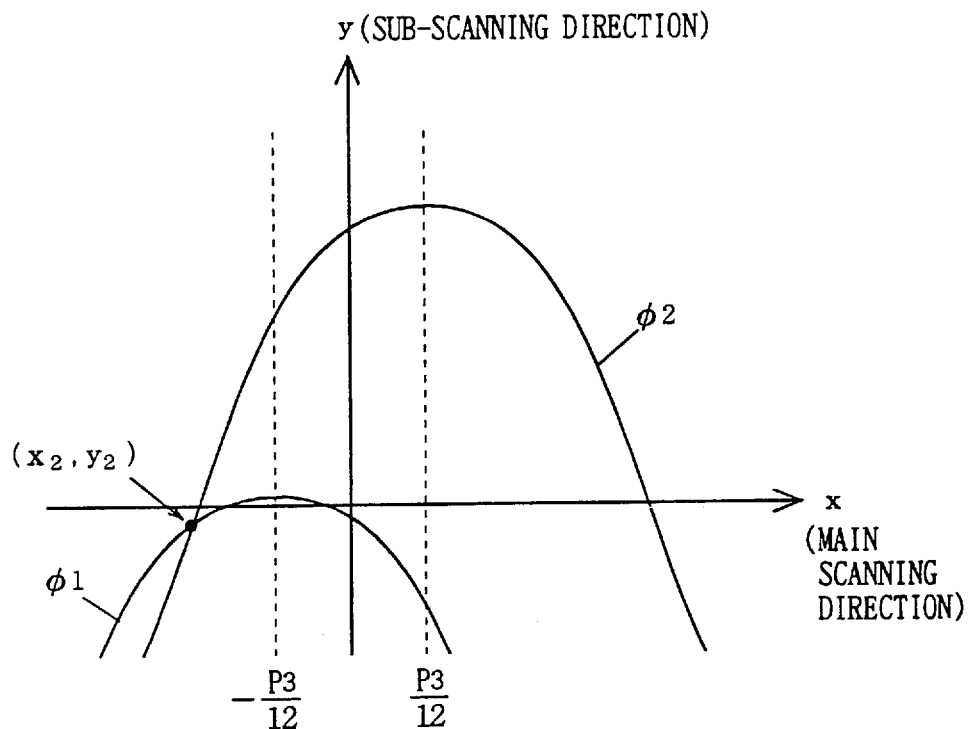
FIG. 58 is a waveform diagram of the engraving signal in the case where one cell in a cell pair, arranged in the main scanning direction, is contained in the other cell.
Figure 59C:
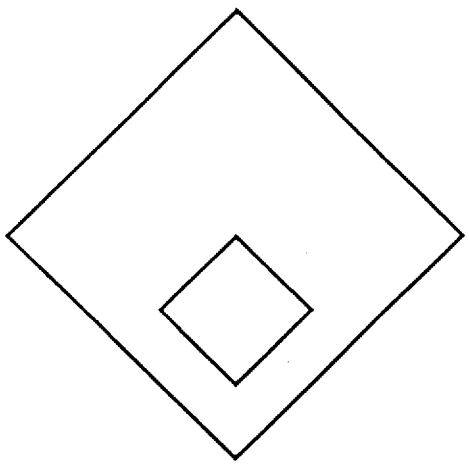

(Case 3) As shown in FIG. 57, if $y_2 \leq 0$ and $x_2 > P_3/12$, then the subject cell contains the adjacent cell (refer to FIG. 59(c)).

Figure 59D:
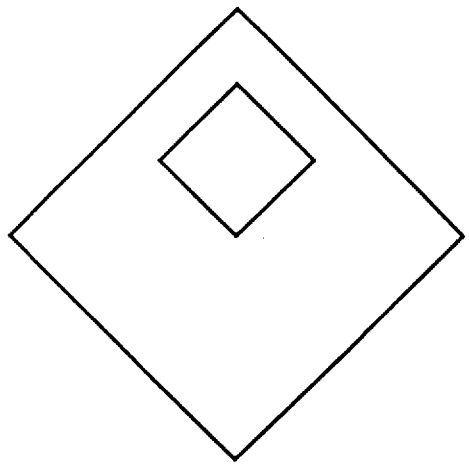

(Case 4) As shown in FIG. 55, if $y_2 \leq 0$ and $x_2 < -P_3/12$, then the subject cell is contained in the adjacent cell (refer to FIG. 59(d)).

Firth, the operation will be described in the case in which the subject cell and the adjacent cell do not overlap (Case 2). In this situation, the date generator 201 calculates an area A of the subject cell using the above-described equation (37), and calculates an error Err between the cell area A obtained by this calculation and the ideal area target value q of the subject cell (Step S604).

$$Err = q - A$$

When the error Err is obtained, $f_1$ obtained by the equation (47) is substituted for f in the equation (37). As $Y_1$ in equation (47), the tone date converted in the above-described Step S504 (refer to FIG. 52; which is stored in the internal memory of the data generator 201) is used.

Figure 60A:
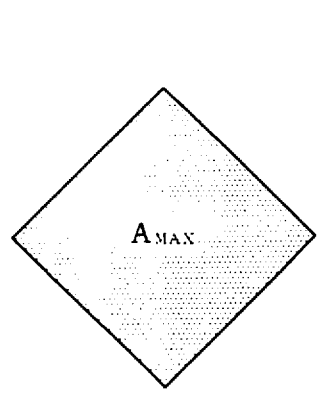
Figure 60B:
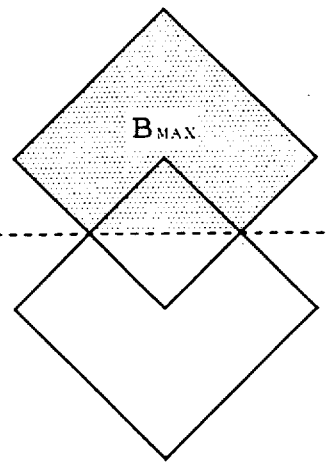
Figure 61:
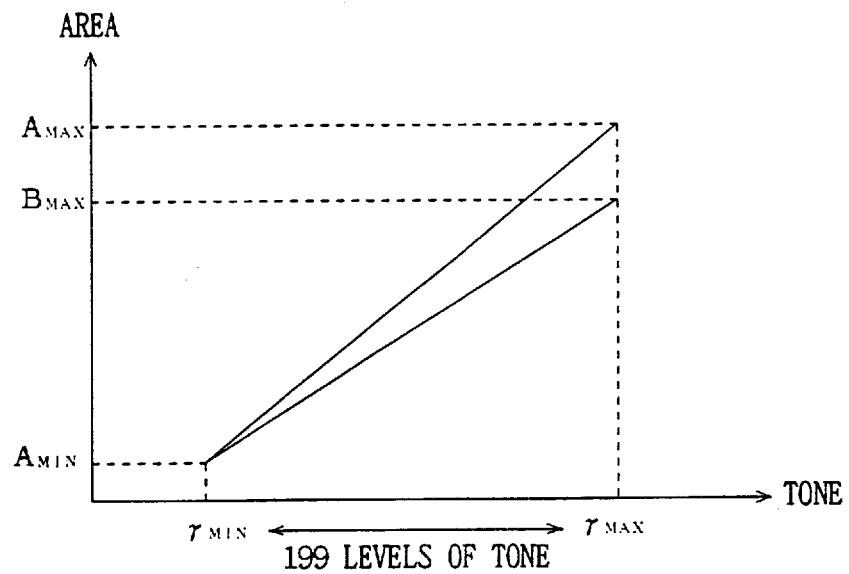
FIG. 61 is a diagram showing the inclination of a line of change of a cell area in relation to the tone of image data in the fifth embodiment.

Referring to FIGS. 60(a) and 60(b) and FIG. 36, a method of obtaining the area target value q for a cell with a tone Y is subsequently described. The maximum area of each cell is restricted under a certain value to secure the cell wall 300' of FIG. 50, i.e., to prevent coupling between different cell pairs. If this maximum area is set on the basis of a maximum area for a cell which does not overlap with an adjacent cell, a problem arises are discussed below. As shown in FIG. 60(a), a maximum area of a cell which can be engraved when it does not overlap with an adjacent cell is taken as $A_{MAX}$. In the case where it overlaps with the adjacent cell, and if a cell having the same size as that in FIG. 60(a) is engrave, its effective area (the region with dots) is decreased due to the overlap (refer to FIG. 60(b)). Accordingly, a difference occurs in the effective area between the case where it overlaps with the adjacent cell and the case where it does not. The effective tone differs between the case of overlap with the adjacent cell and the case of non-overlap, producing a problem whereby the tone of the original image date is not faithfully reproduced. Accordingly, in the fifth embodiment, the effective area $B_{MAX}$ of one of two cells with the area $A_{MAX}$ engraved being overlapped is taken as a maximum area of a cell which does not overlap with an adjacent cell (refer to FIG. 61). Accordingly, the area target value q for a cell with a tone Y is obtained by the equation (5), as follows.

$$q = A_{MIN} + \frac{B_{MAX} - A_{MIN}}{199} \times \gamma \qquad (50)$$

The data generator 201 corrects tone date of the subject cell by Err/ΔA (Step S60). The ΔA is the increment ΔA of the area per unit tone obtained in the Step S502 above, which is calculated by using the equation (38). Thus, the area of the subject cell becomes almost equal to the area target value q for the tone $Y_1$. The date generator 201 then switches the subject cell to a cell adjacent in the main scanning direction, and applies area correction to this switched subject cell (steps S606 and S609) the same as in Steps S604 and S605.

Next, the data generator 201 determines whether there exists any uncorrected cells (Step S608), and if there is any, it sets next date (date for the next cell pair in the main scanning direction; Step S609), and then it returns to the operation in the above-described Step S601.

Figure 63:
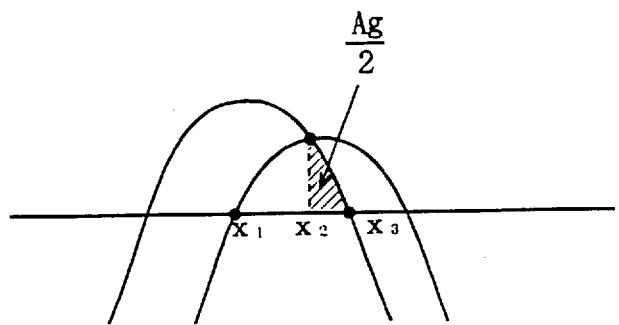
FIG. 63 is a diagram relative to a cell of a decreased area caused by overlap with an adjacent cell.

Operation in the case in which the subject cell and the adjacent cell are overlapping (the case 1 above) is subsequently described. In this case, the date generator 201 calculates an area error for the subject cell caused by the overlap with the adjacent cell (Step S610). To calculate the area error, the data generator 201 first calculates an area Ag which is subtracted by the overlap. This decreased area Ag is twice the shadowed portion (the region from $x_2$ to $x_3$) in FIG. 63. In the figure model of FIG. 62, $x_2$ is represented by the equation (45) and $x_3$ is represented by the following equation (51).

$$x_3 = \frac{P_3}{2\pi} \cos^{-1}\left(\frac{a - f_1}{a}\right) - \frac{P_3}{12} \qquad (51)$$

The decreased area Ag can be obtained from the figure mode of FIG. 62 by the equation (52) below $$Ag = 2 \times \int_{x_2}^{x_3} \left\{ a * \cos\frac{2\pi\left(x + \frac{P_3}{12}\right)}{P_3} - (a - f_1) \right\} dx \qquad (52)$$

$$= \frac{aP_3}{\pi} \sqrt{1 - \left(\frac{a - f_1}{a}\right)} - \frac{P_3}{\pi}(a - f_1)\left\{\frac{1}{4} + \cos^{-1}\left(\frac{a - f_1}{a}\right)\right\} +$$

$$\frac{P_3}{6}(a - f_1) - \frac{\sqrt{3} \, P_3}{2\pi}(f_1 - f_2) - \frac{aP_3}{2\pi}\sqrt{1 - \left(\frac{f_1 - f_2}{2}\right)^2} +$$

$$(a - f_1)\frac{P_3}{\pi} * \sin^{-1}\left(\frac{f_1 - f_2}{a}\right)$$

If the area of the cell before area correction is taken as A, the actual area Az can be obtained by the equation (53), as follows.

$$Az = A - Ag \qquad (53)$$

The data generator 201 next calculates an error Err' about the subject cell between the ideal area target value q and the actual area Az when it overlaps obtained by the equation (53). The area target value q is calculated by using equation (5).

$$Err' = q - Az$$

Next, the data generator 201 determines whether the area error Err' obtained in Step S610 is smaller than the ΔA (step S611). The ΔA is the increment ΔA of area per unit tone obtained in Step S502, which is calculated using the equation (38).

If the area error Err' is not less than the increment ΔA of area per unit tone (if Err'≧ΔA) as a result of the determination made in the Step S611, the data generator 201 corrects the tone data of the subject cell by Err'/ΔA (Step S612). Thus, the area of the subject cell becomes almost equal to the area target value q for the tone $Y_1$. Subsequently, the data generator 201 proceeds to the operation in Step S613. If it is determined in Step S611 that the area error Err' is smaller than the increment ΔA of area per unit tone (if Err'≦ΔA), then the data generator 201 proceeds directly to the operation in Step S613 without performing correction processing in Step S612.

In Step S613, the data generator 201 switches the subject cell to a cell adjacent in the main scanning direction, and calculates an area error Err' obtained in Step S613 is smaller than ΔA (Step S614). As a result of the determination made in Step S614, if the area error Err' is not less than the increment ΔA of area per unit tone, the data generator 201 corrects the tone data of the subject cell by Err'/ΔA (Step (S615), and repeats the correcting operation in and after Step S613. This is due to the fact that if an area of one cell of a cell pair is corrected, an area of the overlapping portion of the other cell changes, thereby changing the effective area of the other cell, thus correction may be required again.

If a determination is made in Step S614 that the area error Err' is smaller than the increment ΔA of area per unit tone (if Err<ΔA), then the data generator 201 determines whether the area error Err' of the other cell adjacent tot he present subject cell is smaller than ΔA (Step S616). When the area error Err' of the other cell is ΔA or more, the data generator 201 repeats the operations in and after Step S613.

If it is determined in Step S616 that the area errors Err' of the subject cell and the other cell are smaller than ΔA, that is, if area errors Err' of the two cells of the cell pair are both smaller than ΔA, the data generator 210 finishes correction of the cell pair and proceeds to the operation in Step S608. Then, if there remain any uncorrected cell data, the data generator 201 sets date of the next cell pair to be subject to the correction (Step S609), and returns to the operation in Step S601.

The operation in the case where it is determined that one cell contains the other cell (Case 3 or Case 4) will be described referring to FIGS. 64(a) through 64(d). In this situation, the data generator 201 regards an area of the contained cell J2 and 0.

Figure 64A:
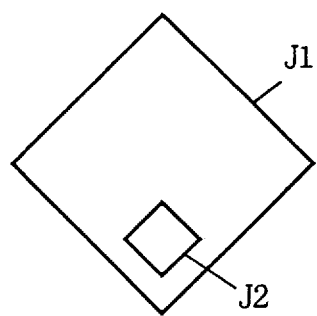
FIGS. 64(a) through 64(d) are diagrams showing correction of areas of two cells when one cell in a cell pair contains the other cell.
Figure 64B:
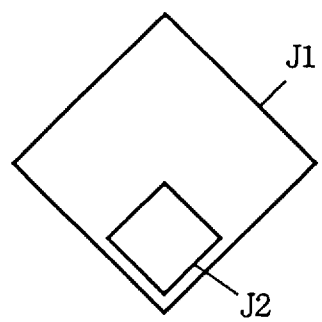
Figure 64C:
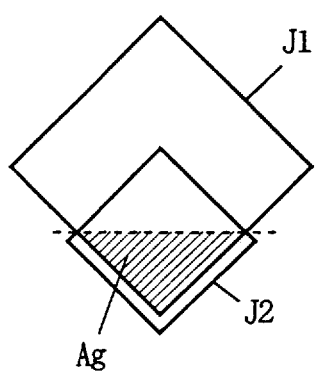

If the subject cell is the containing cell J1 (Case 3), the data generator 201 calculates an error Err from the ideal area target value q for the subject cell J1 in the same way as described in Steps S604 and S605 (Step S617), and corrects tone date of the subject cell J1 by the error Err (Err/ΔA; Step S618). Suppose that this resulted in the relation between the subject cell J1 and the adjacent cell J2 as shown in FIG. 64(a).

Next, the data generator 201 switches the subject cell to the cell J2 adjacent in the main scanning direction, and calculates an area error Err for this switched subject cell J2 from the target value q (Step S619). Since the area of the current subject cell J2 is regarded as 0, the area error Err is obtained as Err=q The data generator 201 next corrects tone data of the subject cell J2 by the area error Err (Err/ΔA; Step S620). Thus, the area of the subject cell J2 becomes almost twice (refer to FIG. 64(b)) the original area (the area in FIG. 64(a)). In the examples of FIGS. 64(a) through 64(d), it is assumed that the cell J2 is still contained in the cell J1. Subsequently, the data generator 201 returns to the operation of Step S601.

At this point the object of the correction is still cell, pair J1 and J2, with the subject cell being J2. Accordingly, this corresponds to Case 4 and the data generator 201 determines that the subject cell J2 is contained in the adjacent cell J1 in Steps S602 and S603. As a result, the data generator 201 goes to Step S621 to calculate an area error Err of the subject cell J2 from the target value q. Then, in the example of FIGS. 64(a) through 64(d), as the subject cell J2 is still contained in the adjacent cell J1, its area is regarded as 0. Hence, the area error Err is Err=q Next, the data generator 201 corrects the tone data of the subject cell J2 by the area error Err (Err/ΔA) (Step 622). Thus, the area of the subject cell J2 becomes almost three times (refer to FIG. 64(c)) the original area (the area in FIG. 64(a)). In the example of FIGS. 64(a) through 64(d), the cell J2 protrudes from the cell J1 at this time.

The data generator 201 next switches the subject cell to the cell J1 adjacent in the main scanning direction and calculates an area error Err from the target value q for this switched subject cell J1 (Step S623) and corrects the tone data of the subject cell J1 by this area error Err (Step S624). Since the area of the subject cell J1 has already attained the target value q in Step S618, however, the area error Err is 0 and correction is not substantially made.

Figure 64D:
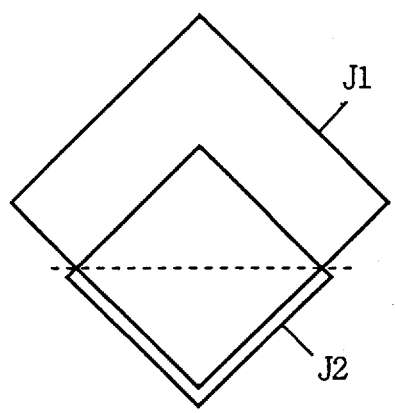

Next, the data generator 201 returns to the operation in Step S601. At this time, as the cell J2 is protruding from the cell J1, it corresponds to Case 2 described above. Accordingly, the data generator 201 corrects areas of cell J1 and cell J2 in Steps S610 to S616 in the same way as the correction in Case 2. At this time, as the decreased area Ag due to overlap appears about the cell J1, it is corrected again. Similarly, as the decrease area Ag due to overlap also appears about the cell J2, it is corrected again. As a result, cells J1 and J2 become as shown in FIG. 64(d).

When determining that correction processing has been finished for all cells (Step S608), the data generator 201 then terminates its operation.

The cell J2 may protrude from the cell J1 in the first correction. In any case, when one cell is contained in the other cell, the area of the one cell is gradually enlarged to protrude from the other cell, and it is finally processed as Case 2. If the cell J2 is the first subject cell, the correcting process starts from Step S612, and it is substantially the same as the operations described above.

The cell J2, though it exists as tone data, is contained in the cell J1 to be absorbed in the cell J1, and it is meaningless on the surface of the gravure cylinder 14. Accordingly, in the embodiment above, the cell J2 is forced to protrude from the cell J1 to become meaningful as tone data, so that resolution in the main scanning direction is substantially increased.

Although the tone of image data is corrected on the basis of the area, so that the united area of cells resulting from overlap almost corresponds to the original area of the cells in the fifth embodiment, the present invention is not restricted to the same, and the tone of image data may be likewise corrected on the basis of the volume so that a united volume of cells resulting from overlap almost corresponds to an original volume of the cells

(6) Sixth Embodiment

Although the primary objectives aforementioned are satisfactorily met according to the preceding fourth and fifth embodiments described above, cases may occur in which the following question is recognized as further technological deficiency or insufficiency in the printing density and the resolution depending upon the level or degree required in the industry.

Figure 65:
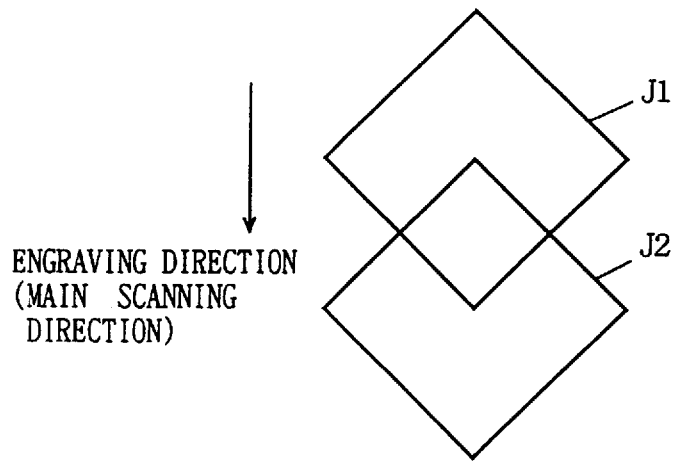
FIG. 65 is a diagram for illustrating the order of engraving two cells overlapping in the main scanning direction in the fourth and fifth embodiments.
Figure 66:
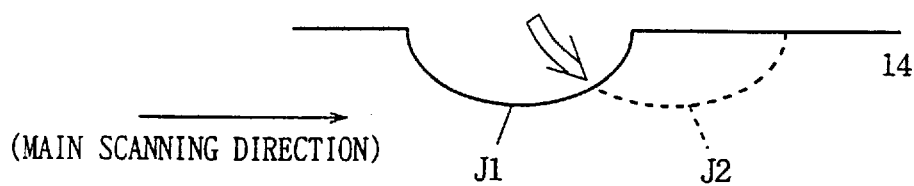
FIG. 66 is a diagram showing a sectional structure when a second cell is engraved in the case where two cells are engraved overlapping in the main scanning direction relative to the fourth and fifth embodiments.

More specifically, in the fourth and fifth embodiments, when two cells are engraved so that they will overlap in the main scanning direction, they are engraved in the order of arrangement in the main scanning direction, i.e., in the order of cell J1 and cell J2, as shown in FIG. 65. Accordingly, as shown in FIG. 66, as the diamond bit 32 engraves the cell J2 after passing the already engraved portion of the cell J1 (the space where nothing exists), resistance at the beginning of the second engraving is decreased and the cell J2 is over engraved.

Figure 67:
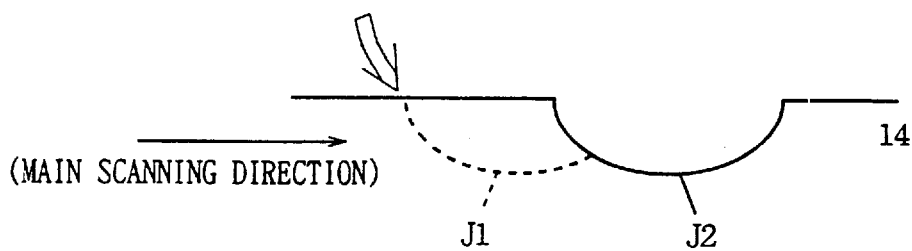
FIG. 67 is a diagram showing a sectional structure when a second cell is engraved in the case where two cells are engraved overlapping in the main scanning direction in a sixth embodiment of the present invention.

Accordingly, in the sixth embodiment, when two cells are engraved overlapping in the main scanning direction, they are engraved in the reverse order to that in the fourth and fifth embodiments. That is to say, in the sixth embodiment, as shown in FIG. 67, they are engraved in the order of first cell J2 and then cell J1 on the surface of the gravure cylinder 14. Thus, the resistance exerted on the diamond bite 32 when engraving is started becomes equal to the cells J1 and J2, and the two cells can be engraved under the same conditions.

As a specific example of a structure of the sixth embodiment, it is supposed to change the phase shift amount of the carrier signal from +60° to −60° in Step S407 of FIG. 49 in the fourth embodiment.

While the invention has been described in detail, the foregoing description is in all aspects illustrative and not restrictive. It is understood that numerous other modifications and variations can be devised without departing from the scope of the invention.

What is claimed is:

1. A method of engraving a plurality of cells on a surface of a gravure cylinder, comprising:

superposing a density signal on a carrier signal to generate an engraving signal;

causing a stylus to vibrate in accordance with said engraving signal to engrave cells in the gravure cylinder rotating in a main scanning direction; and moving said stylus in a sub-scanning direction perpendicular to the main scanning direction;

an amplitude of said carrier signal and a level of said density signal are adjusted in a prescribed relation so that said stylus engraves said gravure cylinder according to a signal corresponding to a portion of a full amplitude of said engraving signal, and in said step of causing a stylus to vibrate, a first engraving signal set to a reference phase is applied to said stylus to form a first cell group in the main scanning direction of said gravure cylinder and subsequently a second engraving signal having its phase shifted by a prescribed amount from the reference phase is applied to said stylus to form a second cell group having a prescribed relation with the first cell group on the same line in the main scanning direction, thereby forming cells for one line arranged in the main scanning direction by two interleaved scans.

2. A gravure engraving system for engraving a plurality of cells on a surface of a gravure cylinder to manufacture an intaglio for gravure printing, the gravure engraving system comprising:

rotating means rotating said gravure cylinder in a main scanning direction;

carrier signal generating means generating a carrier signal in the form of a sine wave having a prescribed frequency and a prescribed amplitude;

density signal generating means generating a density signal having its level varying in accordance with a tone of provided image data;

engraving signal generating means generating an engraving signal by superposing said density signal on said carrier signal;

a stylus vibrating in accordance with said engraving signal to engrave cells in the gravure cylinder rotating in the main scanning direction;

stylus moving means moving said stylus in a sub-scanning direction perpendicular to the main scanning direction;

the amplitude of said carrier signal and the level of said density signal are adjusted in a prescribed relation so that said stylus engraves said gravure cylinder according to a signal corresponding to a portion of a full amplitude of said engraving signal; and double engraving control means for applying a first engraving signal set to a reference phase to said stylus to form a first cell group in the main scanning direction of said gravure cylinder, and subsequently applying a second engraving signal having its phase shifted by a prescribed amount from the reference phase to said stylus to form a second cell group having a prescribed relation with the first cell group on the same line in the main scanning direction, thereby forming cells for one line arranged in the main scanning direction by two interleaved scans.

3. The gravure engraving system according to claim 2, wherein two adjacent cells in the main scanning direction in said first and second cell groups are engraved on the basis of the same image data.

4. The gravure engraving system according to claim 3, wherein the prescribed relation between said first cell group and said second cell group includes, a first relation in which one cell of two adjacent cells in the main scanning direction and another cell do not overlap, and a second relation in which one cell of two adjacent cells in the main scanning direction and another cell partially overlap.

5. The gravure engraving system according to claim 2, wherein two cells adjacent in the main scanning direction in said first and second cell groups are engraved on the basis of different image data.

6. The gravure engraving system, according to claim 5, wherein the prescribed relation between said first cell group and said second cell group includes, a first relation in which one cell of two adjacent cells in the main scanning direction and another cell do not overlap, a second relation in which one cell of two adjacent cells in the main scanning direction and another cell partially overlap, and a third relation in which one cell of two adjacent cells in the main scanning direction contains another cell.

7. The gravure engraving system according to claim 6, further comprising first correcting means correcting tone of said image data corresponding to the two cells, when the two cells in said second or third relation are engaged, said correcting being in accordance with a decrease in cell area caused by the overlap of the two cells or one cell containing the other cell.

8. The gravure engraving system according to claim 7, wherein said correcting means, when correcting two cells in said third relation, causes said other cell to protrude from said one cell, thereby the two cells being in said second relation.

9. The gravure engraving system according to claim 6, further comprising first correcting means correcting tone of said image data corresponding to the two cells, when the two cells in said second or third relation are engaged, said correcting being in accordance with a decrease in cell volume caused by overlap of the two cells or one cell containing the other cell.

10. The gravure engraving system according to claim 2, wherein the amplitude of said carrier signal and a level for a maximum density of said density signal are adjusted in a prescribed relation so that said stylus engraves said gravure cylinder according to a signal corresponding to an amplitude of said engraving signal when engraving a cell with the maximum printing density and said second engraving signal has its phase shifted by +60° from that of said first engraving signal.

11. The gravure engraving system according to claim 2, wherein the amplitude of said carrier signal and a level for a maximum density of said density signal are adjusted in a prescribed relation so that said stylus engraves said gravure cylinder according to a signal corresponding to a portion of an amplitude of said engraving signal when engraving a cell with the maximum printing density and said second engraving signal has its phase shifted by −60° from that of said first engraving signal.

12. The gravure engraving system according to claim 2, further comprising second correcting means correcting tone of original image data so that an area of a cell is in linear proportion to a tone change of the original image data.

* * * * *